US012735825B2

(12) United States Patent
Suemasu et al.

(10) Patent No.: US 12,735,825 B2
(45) **Date of Patent: *Sep. 15, 2026**

(54) INFORMATION PROCESSING METHOD FOR GENERATING AND MODIFYING AN APPLICATION FOR DRIVING AT LEAST ONE OF ACTUATOR AND A HEATER

(71) Applicant: Panasonic Intellectual Property Corporation of America, Torrance, CA (US)

(72) Inventors: Satoshi Suemasu, Osaka (JP); Tatsuhiro Kishi, Kanagawa (JP); Kenta Murakami, Osaka (JP); Kazuki Sakamoto, Shiga (JP); Hayato Naruse, Shiga (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 754 days.

This patent is subject to a terminal disclaimer.

(21) Appl. No.: 18/077,732

(22) Filed: Dec. 8, 2022

(65) Prior Publication Data

US 2023/0103842 A1 Apr. 6, 2023

Related U.S. Application Data

(63) Continuation of application No. PCT/JP2021/022834, filed on Jun. 16, 2021.

(30) Foreign Application Priority Data

Jun. 19, 2020 (JP) ................................ 2020-106608
Dec. 25, 2020 (JP) ................................ 2020-217669

(51) Int. Cl.
*D06F 34/28* (2020.01)
*D06F 33/32* (2020.01)
*G05B 15/00* (2006.01)

(52) U.S. Cl.
CPC ............. *D06F 34/28* (2020.02); *D06F 33/32* (2020.02); *G05B 15/00* (2013.01)

(58) Field of Classification Search
None
See application file for complete search history.

(56) References Cited

U.S. PATENT DOCUMENTS 6,148,306 A 11/2000 Seidl
7,477,948 B1 1/2009 Jain
(Continued)

FOREIGN PATENT DOCUMENTS

EP 1 081 568 3/2001
EP 2 819 346 12/2014
(Continued)

OTHER PUBLICATIONS

Office Action issued Jun. 17, 2025 in U.S. Appl. No. 18/081,091.
(Continued)

*Primary Examiner* — Howard Cortes
(74) *Attorney, Agent, or Firm* — Wenderoth, Lind & Ponack, L.L.P.

(57) ABSTRACT

An information processing method includes: selecting M blocks as M selected blocks from among N blocks for driving at least one of an actuator or a heater included in an apparatus, in accordance with an input operation performed by an operator; generating an application by setting, in accordance with an input operation performed by the operator, a parameter for driving the actuator or the heater in each of the M selected blocks; consulting a rule defining a parameter range within which the above-described driving is
(Continued)

not permitted, and modifying the application by changing at least one of the M selected blocks, the at least one of the M selected blocks including a parameter included in the parameter range; and outputting the modified application.

20 Claims, 53 Drawing Sheets

(56) References Cited

U.S. PATENT DOCUMENTS

| | | | | |
|---|---|---|---|---|
| 7,847,675 | B1 | 12/2010 | Thyen | |
| 9,021,376 | B2 | 4/2015 | Deluca | |
| 9,953,546 | B1 | 4/2018 | Goldstein | |
| 2005/0223725 | A1* | 10/2005 | Crane | F25B 49/02 62/183 |
| 2007/0214173 | A1 | 9/2007 | Ohashi et al. | |
| 2008/0047023 | A1 | 2/2008 | Lam | |
| 2010/0120416 | A1 | 5/2010 | Huber | |
| 2010/0305721 | A1* | 12/2010 | Kostadinov | G05B 19/0426 700/86 |
| 2010/0309526 | A1 | 12/2010 | Kulkarni | |
| 2013/0247117 | A1 | 9/2013 | Yamada | |
| 2014/0245900 | A1 | 9/2014 | Conti | |
| 2015/0261416 | A1 | 9/2015 | Thomas | |
| 2020/0400370 | A1* | 12/2020 | Godbole | F25D 29/003 |
| 2023/0113522 | A1 | 4/2023 | Murakami | |

FOREIGN PATENT DOCUMENTS

| | | |
|---|---|---|
| JP | 2001-075619 | 3/2001 |
| JP | 2001-147704 | 5/2001 |
| JP | 2003-284889 | 10/2003 |
| JP | 2008-142788 | 6/2008 |
| JP | 2008-212651 | 9/2008 |
| JP | 2010-102362 | 5/2010 |
| JP | 2020-042679 | 3/2020 |
| WO | 2006/033159 | 3/2006 |

OTHER PUBLICATIONS

International Search Report issued Jul. 20, 2021 in International (PCT) Application No. PCT/JP2021/022834.

International Search Report issued Aug. 31, 2021 in International (PCT) Application No. PCT/JP2021/022839.

Office Action issued Oct. 31, 2025 in U.S. Appl. No. 18/081,091.

Office Action issued Sep. 19, 2025 in Chinese Application No. 202180042898.7 with English translation of Search Report.

Notice of Allowance issued Mar. 10, 2026 in U.S. Appl. No. 18/081,091.

* cited by examiner

FIG. 5

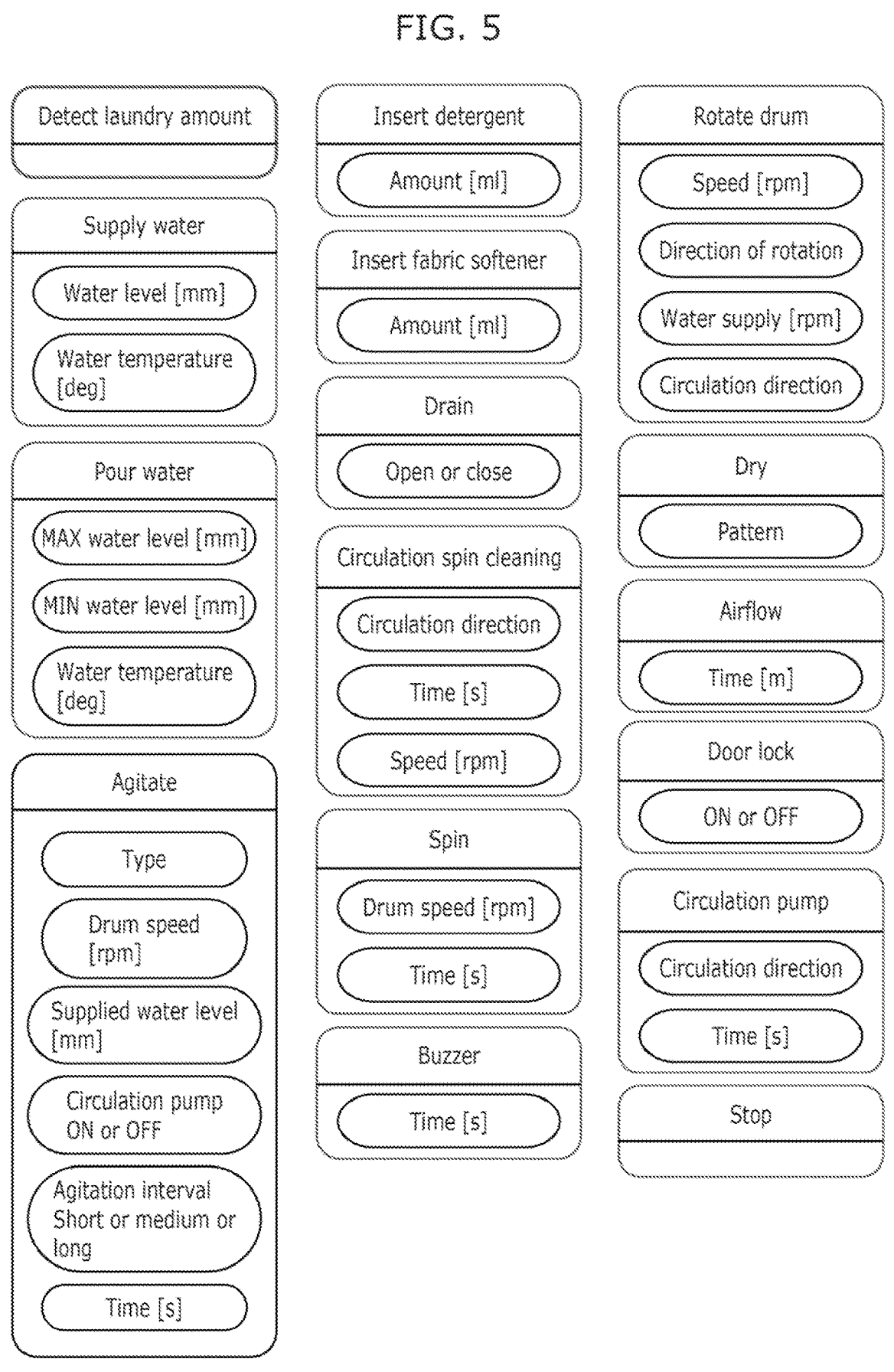

Detect laundry amount

Supply water
- Water level [mm]
- Water temperature [deg]

Pour water
- MAX water level [mm]
- MIN water level [mm]
- Water temperature [deg]

Agitate
- Type
- Drum speed [rpm]
- Supplied water level [mm]
- Circulation pump ON or OFF
- Agitation interval Short or medium or long
- Time [s]

Insert detergent
- Amount [ml]

Insert fabric softener
- Amount [ml]

Drain
- Open or close

Circulation spin cleaning
- Circulation direction
- Time [s]
- Speed [rpm]

Spin
- Drum speed [rpm]
- Time [s]

Buzzer
- Time [s]

Rotate drum
- Speed [rpm]
- Direction of rotation
- Water supply [rpm]
- Circulation direction Dry
- Pattern Airflow
- Time [m]

Door lock
- ON or OFF

Circulation pump
- Circulation direction
- Time [s]

Stop

| Device ID | Address | Type | Manufacturer name | Model number | Actuator / heater | Degradation level |
|---|---|---|---|---|---|---|
| DEV001 | xxx.xxx.xxx.xxx | Washing machine | Company A | WM-0001 | Motor MM0001<br>Motor MM0002 | 0 |
| DEV002 | xxx.xxx.xxx.xxx | Microwave oven | Company A | MO-0001 | ... | 1 |
| DEV003 | xxx.xxx.xxx.xxx | Rice cooker | Company B | RC-0001 | ... | 2 |
| ... | ... | ... | ... | ... | ... | ... |

| Type | Manufacturer name | Model number | Actuator / heater | Parameter range |
|---|---|---|---|---|
| Washing machine | Company A | WM-0001 | Motor MM0001 | (1000 rpm, +∞) |
| Washing machine | Company A | WM-0001 | Motor MM0002 | (500 rpm, +∞) |
| ... | ... | ... | ... | ... |

| Type | Manufacturer name | Model number | Actuator / heater | Degradation level | Parameter range |
|---|---|---|---|---|---|
| Washing machine | Company A | WM-0001 | Motor MM0001 | 0 | (1000 rpm, +∞) |
| Washing machine | Company A | WM-0001 | Motor MM0001 | 1 | (800 rpm, +∞) |
| Washing machine | Company A | WM-0001 | Motor MM0002 | 0 | (500 rpm, +∞) |
| Washing machine | Company A | WM-0001 | Motor MM0002 | 1 | (400 rpm, +∞) |
| ... | ... | ... | ... | ... | ... |

1301C
1302C
1303C
1304C

41
Block DB
App provision server 60
42
Rule DB
Communication network
Sequence manager 100
50
Development tool
51
Processor
52
Memory
53
Display
54
Input unit
20
Apparatus
30
Terminal
2000

FIG. 21

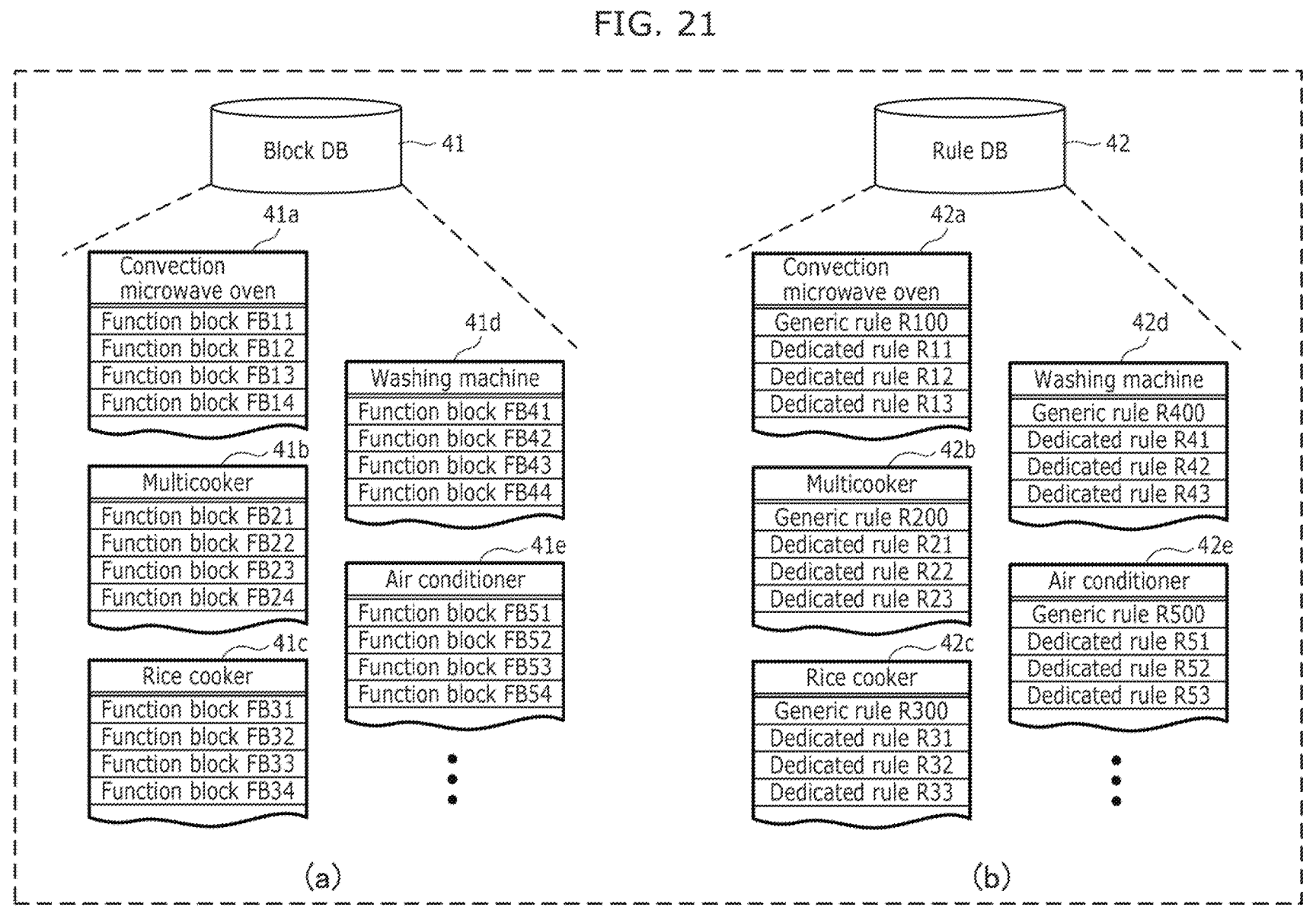

Block DB
41

41a
Convection microwave oven
Function block FB11
Function block FB12
Function block FB13
Function block FB14

41b
Multicooker
Function block FB21
Function block FB22
Function block FB23
Function block FB24

41c
Rice cooker
Function block FB31
Function block FB32
Function block FB33
Function block FB34

41d
Washing machine
Function block FB41
Function block FB42
Function block FB43
Function block FB44

41e
Air conditioner
Function block FB51
Function block FB52
Function block FB53
Function block FB54

• • •

(a)

Rule DB
42

42a
Convection microwave oven
Generic rule R100
Dedicated rule R11
Dedicated rule R12
Dedicated rule R13

42b
Multicooker
Generic rule R200
Dedicated rule R21
Dedicated rule R22
Dedicated rule R23

42c
Rice cooker
Generic rule R300
Dedicated rule R31
Dedicated rule R32
Dedicated rule R33

42d
Washing machine
Generic rule R400
Dedicated rule R41
Dedicated rule R42
Dedicated rule R43

42e
Air conditioner
Generic rule R500
Dedicated rule R51
Dedicated rule R52
Dedicated rule R53

• • •

(b)

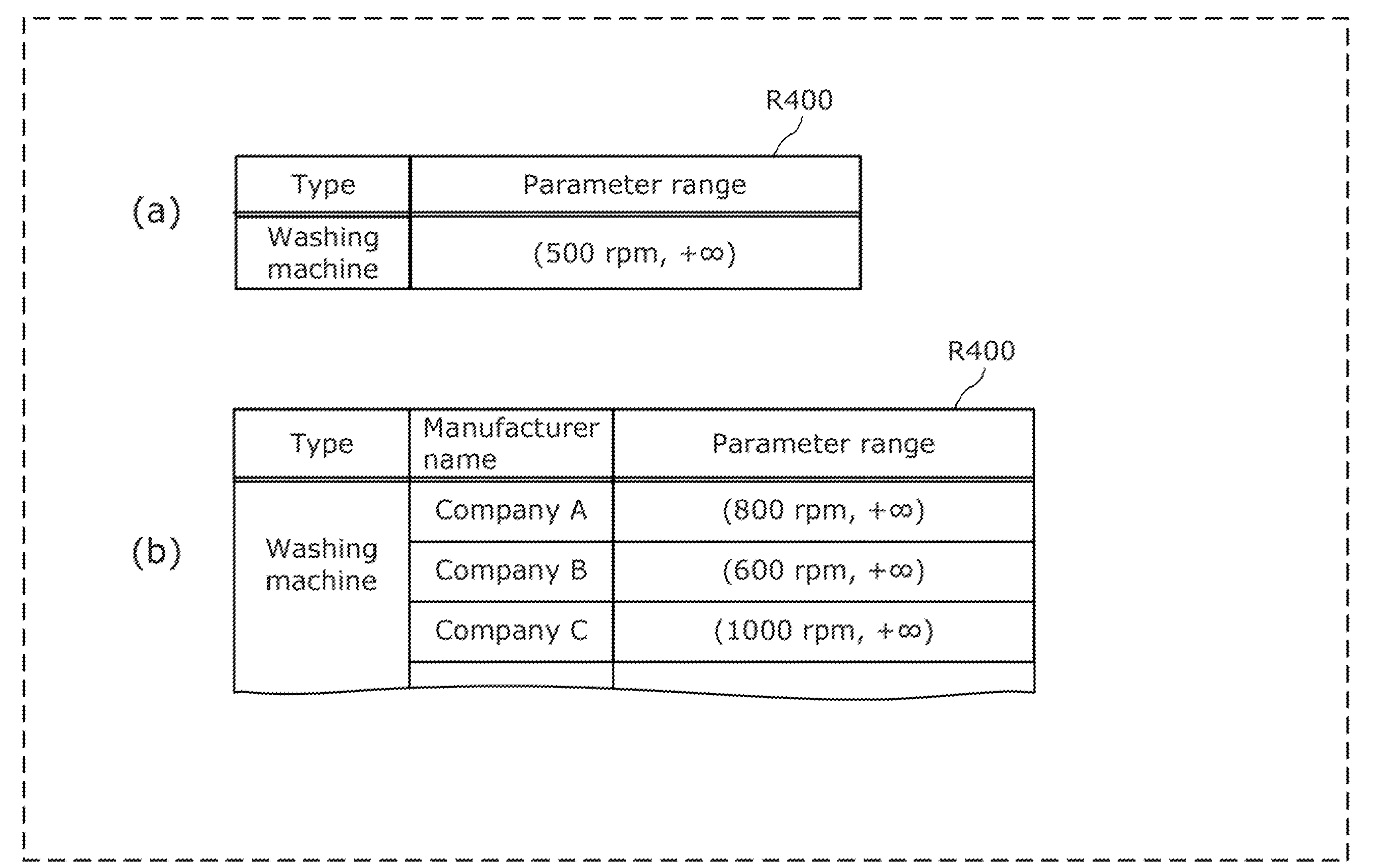
(a)
| Type | Parameter range |
|---|---|
| Washing machine | (500 rpm, +∞) |
(b)
| Type | Manufacturer name | Parameter range |
|---|---|---|
| Washing machine | Company A | (800 rpm, +∞) |
| | Company B | (600 rpm, +∞) |
| | Company C | (1000 rpm, +∞) |

FIG. 28

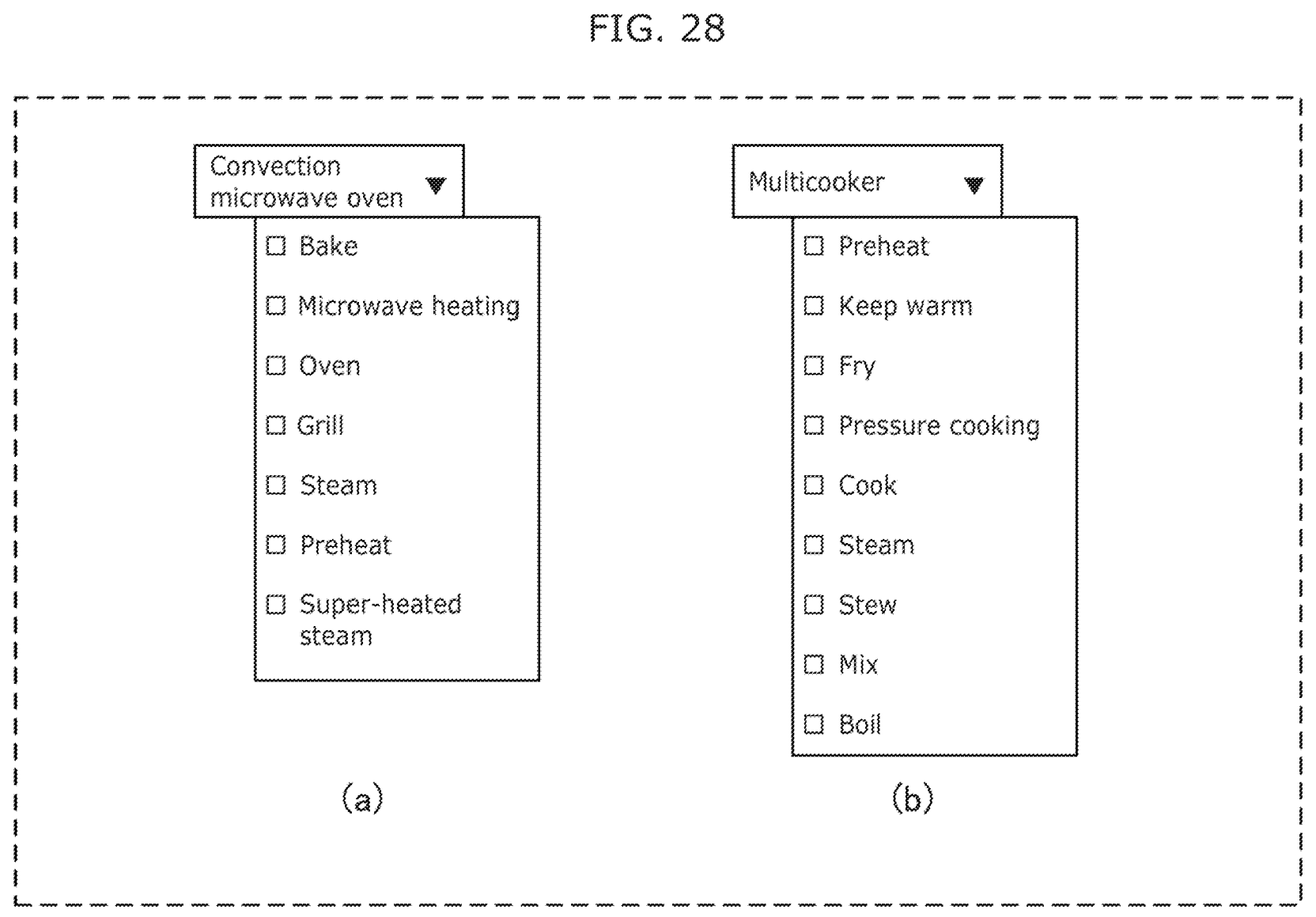

Convection microwave oven ▼

☐ Bake
☐ Microwave heating
☐ Oven
☐ Grill
☐ Steam
☐ Preheat
☐ Super-heated steam (a)

Multicooker ▼

☐ Preheat
☐ Keep warm
☐ Fry
☐ Pressure cooking
☐ Cook
☐ Steam
☐ Stew
☐ Mix
☐ Boil (b)

Figure 30A:
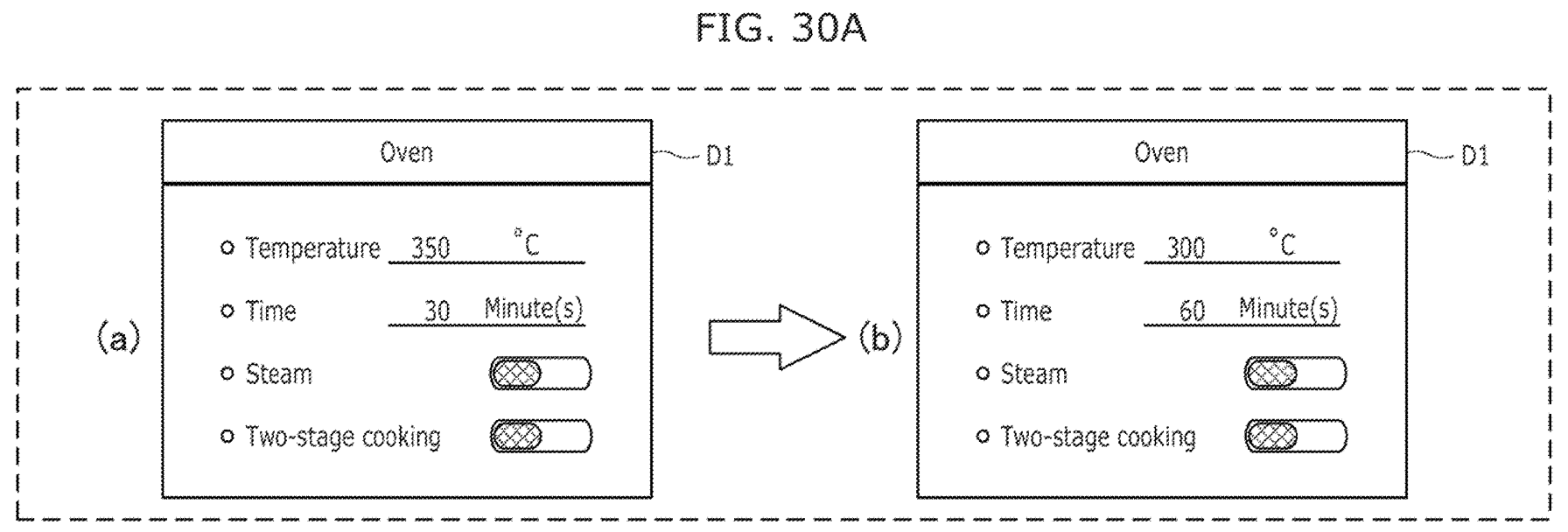

Oven

Temperature 350 °C

Time 30 Minute(s)

Steam

Two-stage cooking (b)

D1

Oven

Temperature 300 °C

Time 60 Minute(s)

Steam

Two-stage cooking

| Type | Manufacturer name | Model number | First block | Second block | Third block |
|---|---|---|---|---|---|
| Washing machine | Company A | WM-0001 | Drain | Spin | — |
| Washing machine | Company A | WM-0001 | — | Dry | Airflow |
| ... | ... | ... | ... | ... | ... |

| Type | First block | Second block | Third block |
|---|---|---|---|
| Washing machine | Drain | Spin | — |
| | — | Dry | Airflow |
| | ... | ... | ... |

(a)

R400

Manufacturer: Company C

Manufacturer: Company B

Manufacturer: Company A

| Type | First block | Second block | Third block |
|---|---|---|---|
| Washing machine | Drain | Spin | — |
| | — | Dry | Airflow |
| | ... | ... | ... |

(b)

INFORMATION PROCESSING METHOD FOR GENERATING AND MODIFYING AN APPLICATION FOR DRIVING AT LEAST ONE OF ACTUATOR AND A HEATER

CROSS REFERENCE TO RELATED APPLICATIONS

This is a continuation application of PCT International Application No. PCT/JP2021/022834 filed on Jun. 16, 2021, designating the United States of America, which is based on and claims priority of Japanese Patent Application No. 2020-106608 filed on Jun. 19, 2020, and Japanese Patent Application No. 2020-217669 filed on Dec. 25, 2020. The entire disclosures of the above-identified applications, including the specifications, drawings, and claims are incorporated herein by reference in their entirety.

FIELD

The present disclosure relates to an information processing method and the like for generating a control program for an apparatus including an actuator and/or a heater.

BACKGROUND

Conventionally, home appliances and housing equipment are controlled according to operating conditions (a control program) prepared in advance by, for example, the manufacturer. Patent literature (PTL) 1 discloses a washing machine that allows the user to set operating conditions for a washing operation that he/she wishes to perform.

CITATION LIST

Patent Literature

PTL 1: Japanese Unexamined Patent Application Publication No. 2003-284889

SUMMARY

Technical Problem

Unfortunately, with the conventional technology described above, the control program must be developed in advance by the product manufacturer and stored in the product in advance, making it difficult to generate, customize, and update a wide variety of safe control programs.

In view of this, the present disclosure provides an information processing method and the like capable of easily generating a wide variety of safe control programs.

Solution to Problem

An information processing method according to one aspect of the present disclosure is executed by a computer system, and includes: (a) selecting M blocks as M selected blocks from among N blocks for driving at least one of an actuator or a heater included in a device to be controlled, in accordance with an input operation performed by an operator, where N is an integer greater than or equal to two, and M is an integer greater than or equal to one and less than or equal to N; (b) generating an application including at least the M selected blocks by setting, in accordance with an input operation performed by the operator, a parameter for driving the actuator or the heater in each of the M selected blocks; (c) consulting a rule defining a parameter range within which the at least one of the actuator or the heater is not permitted to be driven, and modifying the application by changing at least one of the M selected blocks, the at least one of the M selected blocks including a parameter included in the parameter range; and (d) outputting the application modified.

General or specific aspects of the present disclosure may be realized as a system, method, integrated circuit, computer program, computer readable medium such as a CD-ROM, or any given combination thereof.

Advantageous Effects

The information processing method according to one aspect of the present disclosure can easily generate a wide variety of safe control programs.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 illustrates a plurality of blocks for a washing machine according to Embodiment 1.

FIG. 6 illustrates a plurality of blocks for a microwave oven according to Embodiment 1.

FIG. 9 illustrates one example of a device database according to Embodiment 1.

FIG. 12 illustrates one example of a rule database according to Embodiment 1.

FIG. 19 illustrates one example of a rule database according to Embodiment 4.

FIG. 21 illustrates one example of information stored in each of a block database and a rule database according to Embodiment 5.

FIG. 22 illustrates examples of a generic rule included in the rule database according to Embodiment 5.

FIG. 28 illustrates examples of how a block list is displayed according to Embodiment 5.

FIG. 30A illustrates one example of the automatic function block correction process according to Embodiment 5.

FIG. 31 illustrates one example of the error presentation process according to Embodiment 5.

FIG. 34 illustrates one example of a rule database according to Embodiment 6.

FIG. 40 illustrates examples of a generic rule included in the rule database according to Embodiment 10.

DESCRIPTION OF EMBODIMENTS

Figure 1:
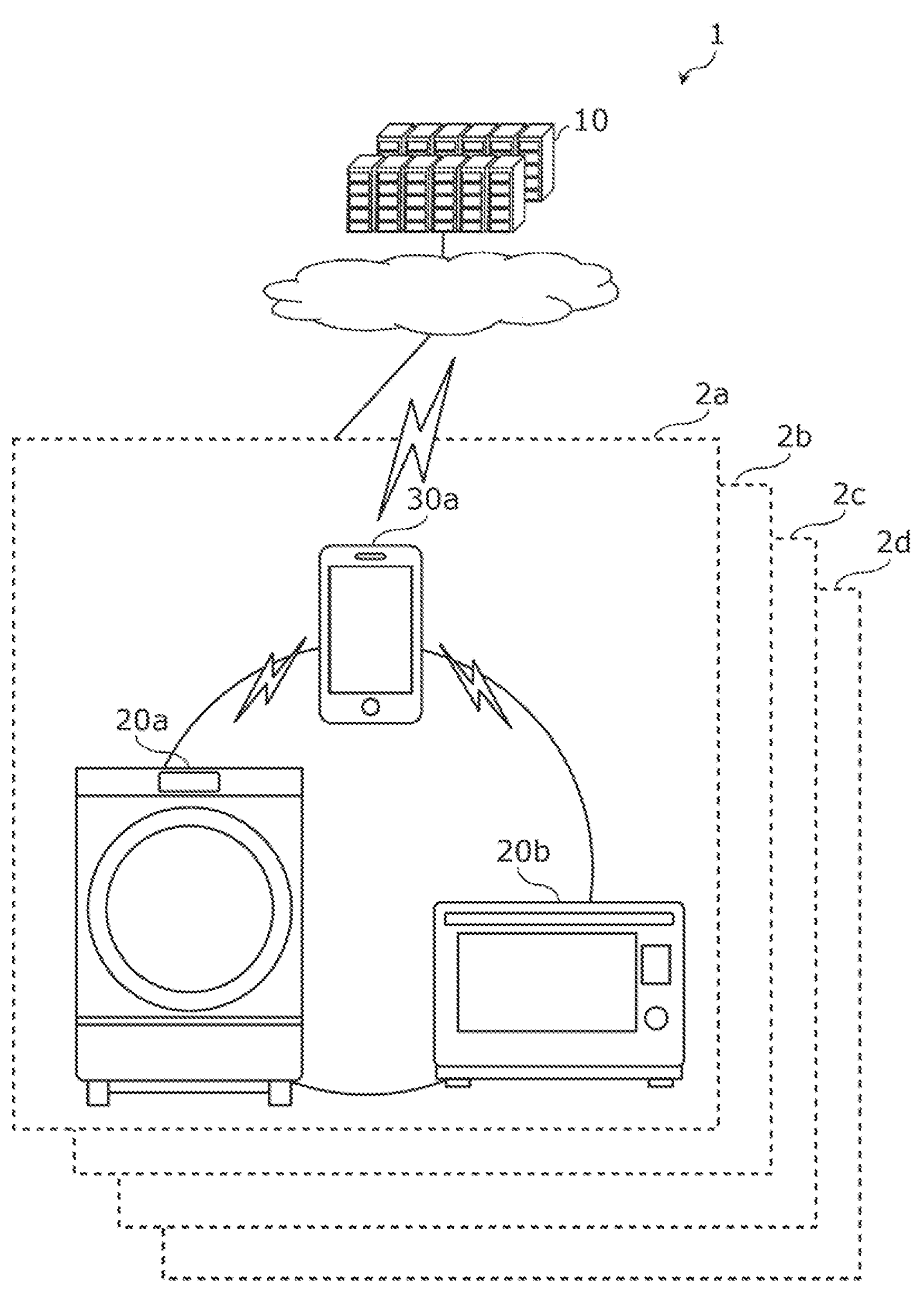
FIG. 1 illustrates the hardware configuration of a system according to Embodiment 1.

Underlying Knowledge Forming the Basis of the Present Disclosure

First, the process by which the inventors arrived at the present disclosure will be described. For home appliances or other products that include an actuator and/or a heater, there is a need for an open development environment to develop control programs that meet the desires of a variety of users. Stated differently, there is a need for an environment in which the difficulty of developing control programs is reduced and third parties can easily participate in the development of control programs. In such an environment, it would be possible, for example, for an apparel company to develop a control program for a washing machine to launder the clothes it sells.

In view of this, the inventors of the present application considered the creation of an environment in which control programs can be developed while maintaining safety assurance by using function blocks that abstract the control of actuators and/or heaters included in the product, and a system in which a control program consisting of a combination of a plurality of function blocks can be packaged and distributed as an application. This enables the distribution of a wide variety of applications and allows products to be customized and updated to meet the desires of a wider range of users. Unfortunately, in such an environment, dangerous applications (i.e., applications that cannot be safely controlled by the product) may be distributed, diminishing the safety of the product.

For example, it is envisioned that programs included in home appliances or other products would be incorporated into devices for direct control of actuators and/or heaters and would include a mixture of programs developed by the manufacturer and programs developed by third parties. In such cases, the manufacturer will likely not disclose to third parties all information on the home appliances or other products, including privy knowledge. For example, the parameters or timing of driving actuators and/or heaters is privy knowledge related to the performance of home appliances or other products made by the manufacturer. Manufacturers are therefore unlikely to divulge their privy knowledge to third parties so that they can freely drive their home appliances or other products, as this could cause them to lose their competitive edge.

The third parties may therefore create an application that includes a combination of controls or parameter ranges not anticipated by the manufacturer, i.e., an application with which safety cannot be guaranteed, due to lack of information about the home appliance or other product. From the perspective of the user, it is undesirable for such applications to be provided to users.

Manufacturers of home appliances or other products may attempt to improve users' lives by providing new control programs. However, the development of a wide variety of new control programs requires a great amount of man-hours to adjust parameters or evaluate hardware performance. Since the hardware of home appliances or other products is physically driven by actuators and/or heaters, one can easily expect that programs for home appliances or other products will require more man-hours for performance evaluation, etc., than programs for smartphones. However, in an age when on-demand development, rather than mass production, is required to meet the needs of each individual user's life, there is a need to develop a wide variety of control programs for home appliances or other products, similar to programs for smartphones. Manufacturers must therefore create a wide variety of applications that ensure the safety of their products with a reduction in the great amount of man-hours.

In addition, manufacturers may wish to ensure that their home appliances or other products operate safely even when operated using applications provided by third parties. In such cases, it is desirable to reduce the amount of work required to verify safety by actually driving home appliances or other products with a wide variety of applications.

In view of the above, the present disclosure provides an information processing method and the like that can easily generate a wide variety of safe applications defined by a plurality of function blocks that drive an actuator and/or a heater.

Hereinafter, embodiments will be described in detail with reference to the drawings.

Each of the exemplary embodiments described below shows a general or specific example. The numerical values, shapes, materials, elements, the arrangement and connection of the elements, steps, the processing order of the steps, etc., shown in the following exemplary embodiments are mere examples, and do not intend to limit the scope of claims.

The appended drawings are not necessarily precise depictions. In the drawings, elements that are essentially the same share like reference signs. Accordingly, duplicate description is omitted or simplified.

Embodiment 1

1.1 Hardware Configuration

Figure 2A:
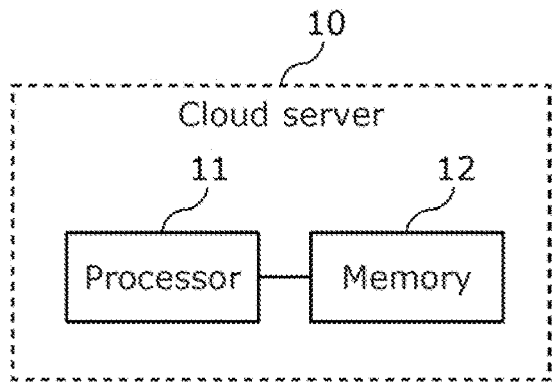
FIG. 2A illustrates the hardware configuration of a cloud server according to Embodiment 1.
Figure 2B:
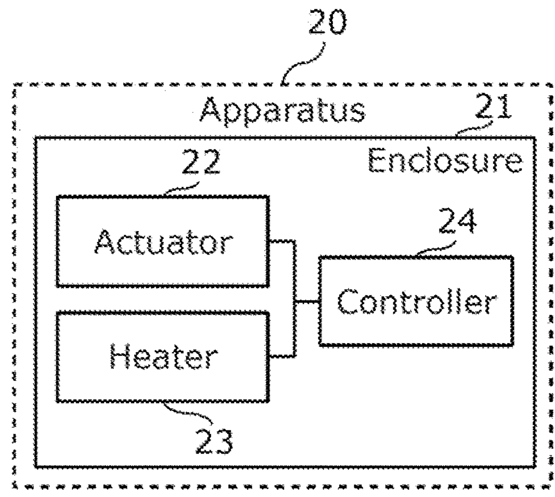
FIG. 2B illustrates the hardware configuration of an apparatus according to Embodiment 1.
Figure 2C:
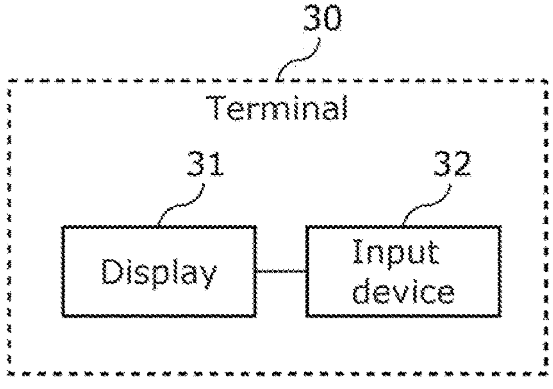
FIG. 2C illustrates the hardware configuration of a terminal according to Embodiment 1.

The hardware configuration of system 1 according to the present embodiment will be described with reference to FIG. 1 through FIG. 2C. FIG. 1 illustrates the hardware configuration of system 1 according to Embodiment 1. FIG. 2A illustrates the hardware configuration of cloud server 10 according to Embodiment 1. FIG. 2B illustrates the hardware configuration of apparatus 20 according to Embodiment 1. FIG. 2C illustrates the hardware configuration of terminal 30 according to Embodiment 1.

As illustrated in FIG. 1, system 1 according to the present embodiment includes cloud server 10, and apparatuses 20*a* through 20*h* and terminals 30*a* through 30*d* used in facilities 2*a* through 2*d*. For example, facilities 2*a* through 2*d* are, but not limited to, residences. For example, facilities 2*a* through 2*d* may be apartments, stores, offices, etc.

Cloud server 10 is a virtual server provided via a computer network (for example, the internet). Cloud server 10 is connected to apparatuses 20*a* through 20*h* and terminals 30*a* through 30*d* via the computer network. A physical server may be used instead of cloud server 10.

As illustrated in FIG. 2A, cloud server 10 includes, virtually, processor 11 and memory 12 connected to processor 11. Processor 11 functions as a sequence manager and a device manager, which will be described below, when instructions or a software program stored in memory 12 are executed.

Apparatuses 20*a* through 20*h* are electromechanical devices used in facilities 2*a* through 2*d*. Note that FIG. 1 omits the illustration of apparatuses 20*c* through 20*h* used in facilities 2*b* through 2*d*. Hereinafter, when it is not necessary to distinguish between apparatuses 20*a* through 20*h*, they will be referred to as apparatuses 20 or in the singular as apparatus 20.

Home appliances and housing equipment can be used as apparatuses 20. Home appliances and housing equipment are not limited to devices used in residences, and also include devices used in businesses. In the present disclosure, "home appliances and housing equipment or other products" may be shortened to "home appliances or other products". Home appliances include, for example, microwave ovens, rice cookers, blenders, electric ovens, electric toasters, electric hot water servers, hot plates, induction heating (IH) cookers, roasters, bread makers, electric pressure cookers, electric waterless cookers, multi-cookers, coffee makers, refrigerators, washing machines, dishwashers, vacuum cleaners, air conditioners, air purifiers, humidifiers, hair dryers, electric fans, and ion generators. Housing equipment include, for example, electric shutters, electronic locks, and electric water heaters for bathtubs. However, apparatuses 20 are not limited to these examples.

As illustrated in FIG. 2B, apparatus 20 includes enclosure 21, actuator 22, heater 23, and controller 24. Apparatus 20 need only include at least one of actuator 22 or heater 23, and need not include both actuator 22 and heater 23.

Enclosure 21 houses actuator 22, heater 23, and controller 24. Enclosure 21 may include an interior space for processing a target. For example, the drum of a washing machine, the cooking compartment of a microwave oven, and the inner pot of a rice cooker correspond to the interior space for processing a target.

Actuator 22 is a mechanical element that converts input energy into physical motion based on electrical signals. For example, electric motors, hydraulic cylinders, and pneumatic actuators can be used as actuator 22, but examples are not limited thereto.

Heater 23 is an electric heater that converts electrical energy into thermal energy. Heater 23 heats the target by, for example, Joule heating, induction heating, and/or dielectric heating. For example, nichrome wires, coils, and magnetrons can be used as heater 23.

Next, one example of why apparatus 20 according to the present disclosure includes actuator 22 and/or heater 23 will be given. Consider a case in which a manufacturer of home appliances or other products provides a third party with a development environment that allows free control of all parameters and combinations of drives for actuator 22 and heater 23. In such a case, the third party would be able to create a program to control actuator 22 and/or heater 23 so as to operate outside of the range of parameters anticipated by the manufacturer at which actuator 22 and/or heater 23 can be safely driven or outside the drive limits of actuator 22 and/or heater 23. In particular, the driving of actuator 22, which physically moves, or heater 23, which outputs thermal energy, in a manner unanticipated by the manufacturer poses significant safety assurance issues. Examples of driving in a manner unanticipated by the manufacturer include the high-speed rotation of an electric motor, which is one example of the actuator, and the supply of excessive current to heater 23. The inventors of the present application aimed to ensure that excessive safety considerations would not inhibit the creation of an environment that could provide users with a wide variety of applications. Apparatus 20 according to the present disclosure therefore is specific to actuators 22, which physically move, or heaters 23, output thermal energy, with an eye to ensuring safety.

Controller 24 is a controller that controls actuator 22 and/or heater 23 and functions as a device, which will be described later. Controller 24 is configured as, for example, an integrated circuit.

Terminals 30*a* through 30*d* are used at facilities 2*a* through 2*d*, respectively, and function as user interfaces. Note that FIG. 1 omits the illustration of terminals 30*b* through 30*d* used in facilities 2*b* through 2*d*. Hereinafter, when it is not necessary to distinguish between terminals 30*a* through 30*d*, they will be referred to as terminals 30 or in the singular as terminal 30.

Terminals 30 are connected to cloud server 10 and apparatuses 20 via the computer network and function as a user interface (UI), which will be described later. Portable information terminals such as smartphones and tablet computers can be used as terminals 30. Terminals 30 may be fixed to the wall, floor, or ceiling of facilities 2*a* through 2*d*. Terminals 30 may be included in apparatuses 20. For example, terminals 30 may be realized as a display terminal including a display built into apparatuses 20*a* through 20*h*.

As illustrated in FIG. 2C, terminal 30 includes display 31 and input device 32. For example, a liquid crystal display and an organic electroluminescent display can be used as display 31. For example, a touch panel, a keyboard, a mouse, and a mechanical button can be used as input device 32. A voice input device may be used as input device 32. Display 31 and input device 32 may be integrally implemented as a touch screen. Alternatively, a gesture input device may be used as input device 32. A gesture input device includes, for example, a camera and a recognition unit. The camera captures images containing gestures, and the recognition unit recognizes the gestures using the images.

1.2 Functional Configuration

Figure 3:
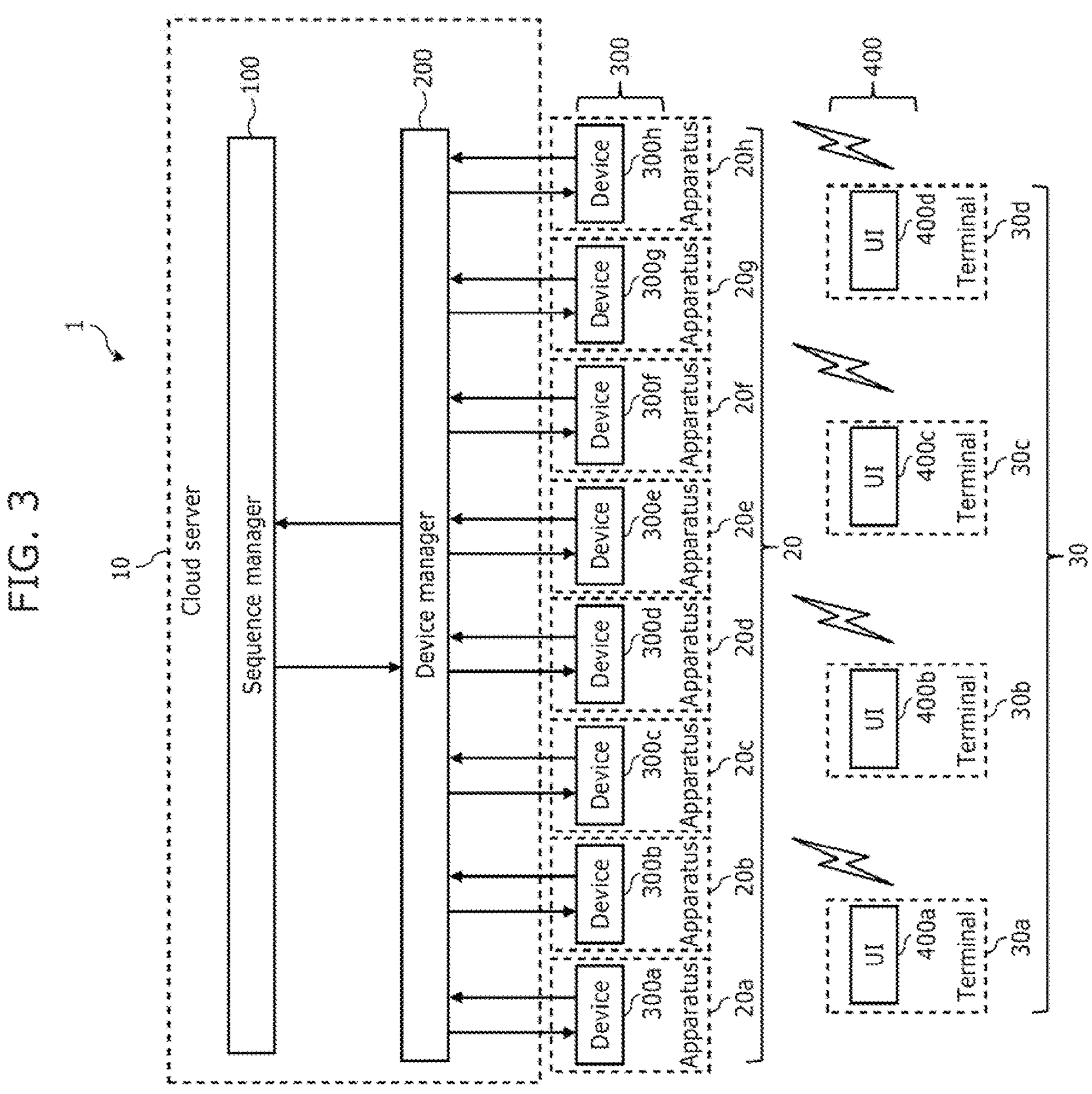
FIG. 3 illustrates the functional configuration of a system according to Embodiment 1.

Next, the functional configuration of system 1 according to the present embodiment will be described with reference to FIG. 3. FIG. 3 illustrates the functional configuration of system 1 according to Embodiment 1.

Cloud server 10 includes sequence manager 100 and device manager 200. Apparatuses 20*a* through 20*h* include devices 300*a* through 300*h*, respectively. Terminals 30*a* through 30*d* include UIs 400*a* through 400*d*, respectively.

Hereinafter, when it is not necessary to distinguish between devices 300*a* through 300*h*, they will be referred to as devices 300 or in the singular as device 300. Similarly, when it is not necessary to distinguish between UIs 400*a* through 400*d*, they will be referred to as UIs 400 or in the singular as UI 400.

Sequence Manager 100 manages a plurality of applications. The plurality of applications are downloaded to sequence manager 100 from an application delivery platform by, for example, user interaction. Alternatively, applications included in the application delivery platform may not be downloaded to sequence manager 100. In such cases, information indicating that the applications included in the application delivery platform are associated with it may be recorded in the database of sequence manager 100. The applications will be described in greater detail later.

Device Manager 200 includes a database for managing facilities 2*a* through 2*d*, as well as devices 300 and UIs 400 used at the respective facilities 2*a* through 2*d*. Device Manager 200 manages devices 300 and UIs 400 by recording device information and UI information associated with facilities 2*a* through 2*d* in a database. Device information and UI information includes, for example, control functions and drive functions, as well as operating status. For example, device manager 200 can manage the operating statuses of devices 300 and keep track of the operating schedules of devices 300. Device Manager 200 may manage log information for devices 300.

Such a database may be included in sequence manager 100 instead of device manager 200, or included in both sequence manager 100 and device manager 200.

Device 300 includes control functions and drive functions for apparatus 20. Device 300 can drive apparatus 20 according to instructions from device manager 200.

UI 400 provides information to the user and accepts inputs from the user.

Next, the applications will be described. In the present embodiment, an application (hereinafter sometimes abbreviated as "app") means a control program defined by a plurality of function blocks (hereinafter abbreviated as "blocks") that drive actuator 22 and/or heater 23. Each of the blocks can include a parameter for driving actuator 22 or heater 23. More specifically, each of the blocks is an abstraction of the control of actuator 22 or heater 23. In addition to the blocks that drive actuator 22 and/or heater 23, the application may include blocks that do not drive actuator 22 and/or heater 23. Examples of blocks that do not drive actuator 22 and/or heater 23 include the displaying of information using an interface included in device 300, the outputting of sound using a buzzer included in device 300, and the turning on or off of a lamp included in device 300. The block may include a condition to start driving actuator 22 or heater 23. For example, assume an application includes a first block and a second block. Here, when switching to the second block during the execution of the first block, when the start condition included in the second block is met, the second block is switched to from the first block. The block may also contain an end condition rather than a start condition. Here, when switching to the second block during the execution of the first block, when the end condition included in the first block is met, the second block is switched to from the first block.

Figure 4:
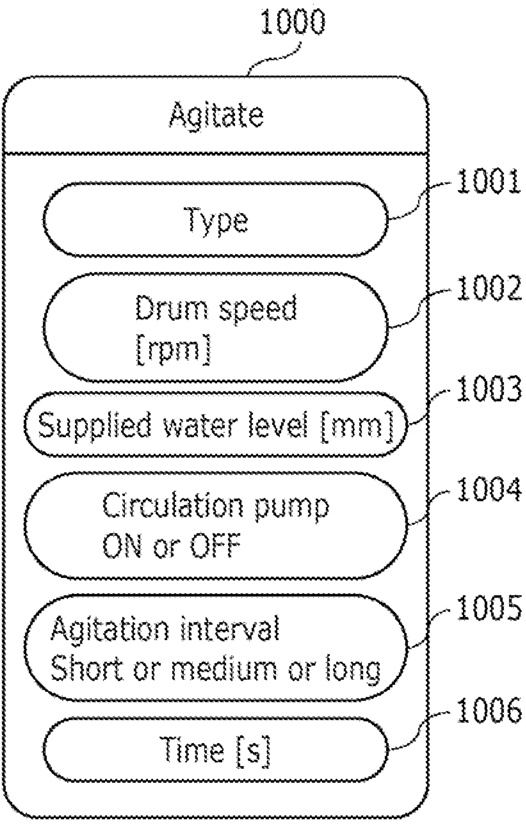
FIG. 4 illustrates one example of a block that defines an application according to Embodiment 1.

FIG. 4 illustrates one example of a block that defines an application according to Embodiment 1. Block 1000 illustrated in FIG. 4 controls the agitation operation of a washing machine and includes parameters 1001 through 1006. Parameter 1001 includes information indicating the type of agitation (for example, normal, "dancing", or rocking). In other words, parameter 1001 can be said to indicate the type of function. Parameter 1002 includes a value indicating the drum speed. In other words, parameter 1002 can be said to indicate the intensity of the driving of actuator 22 and/or heater 23. Parameter 1003 includes a value indicating the amount of water supplied to the drum in terms of the water level after the water has been supplied. In other words, parameter 1003 can be said to indicate the state after the driving of actuator 22 and/or heater 23. Parameter 1004 includes a value indicating whether the circulation pump is on or off. In other words, parameter 1004 can be said to indicate whether to drive actuator 22 and/or heater 23. Parameter 1005 includes information indicating the agitation interval in terms of stages (for example, short, medium, long). Parameter 1006 includes a value indicating the agitation time.

Figure 6:
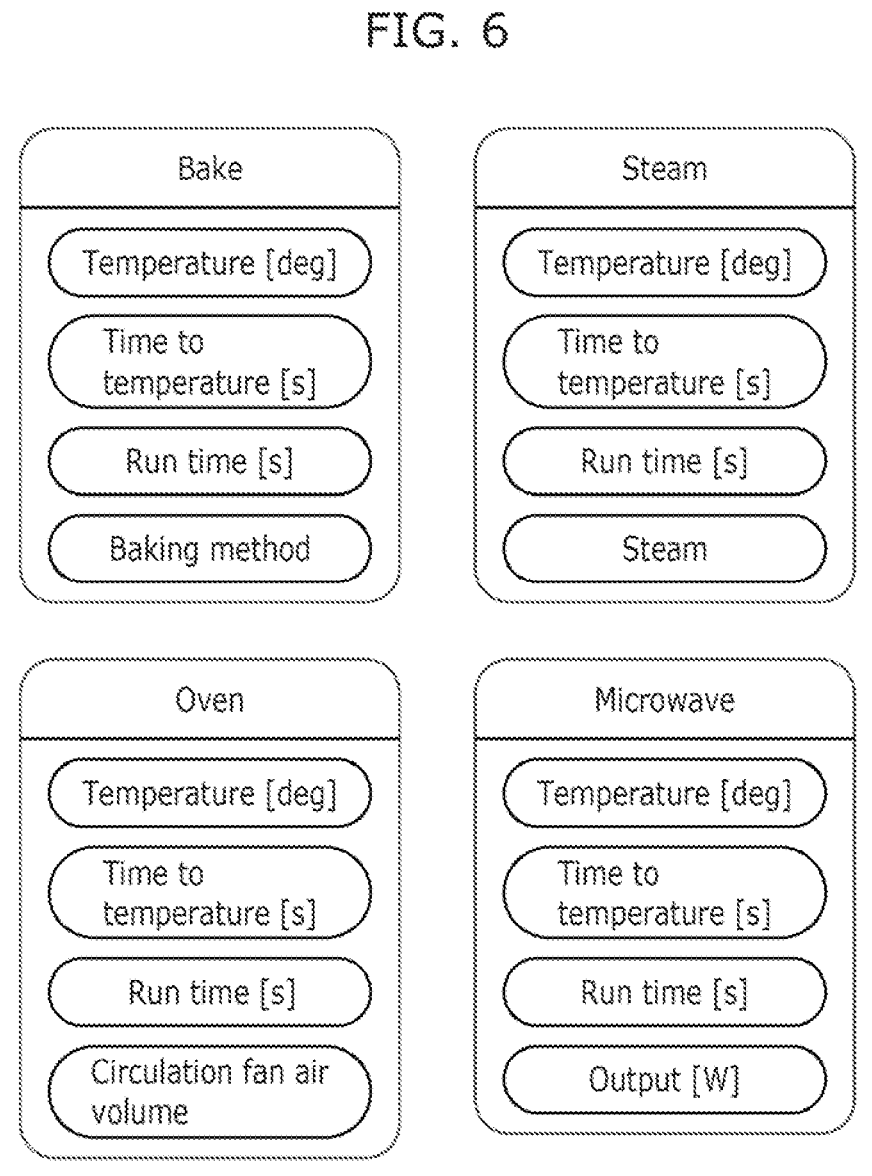
Figure 7:
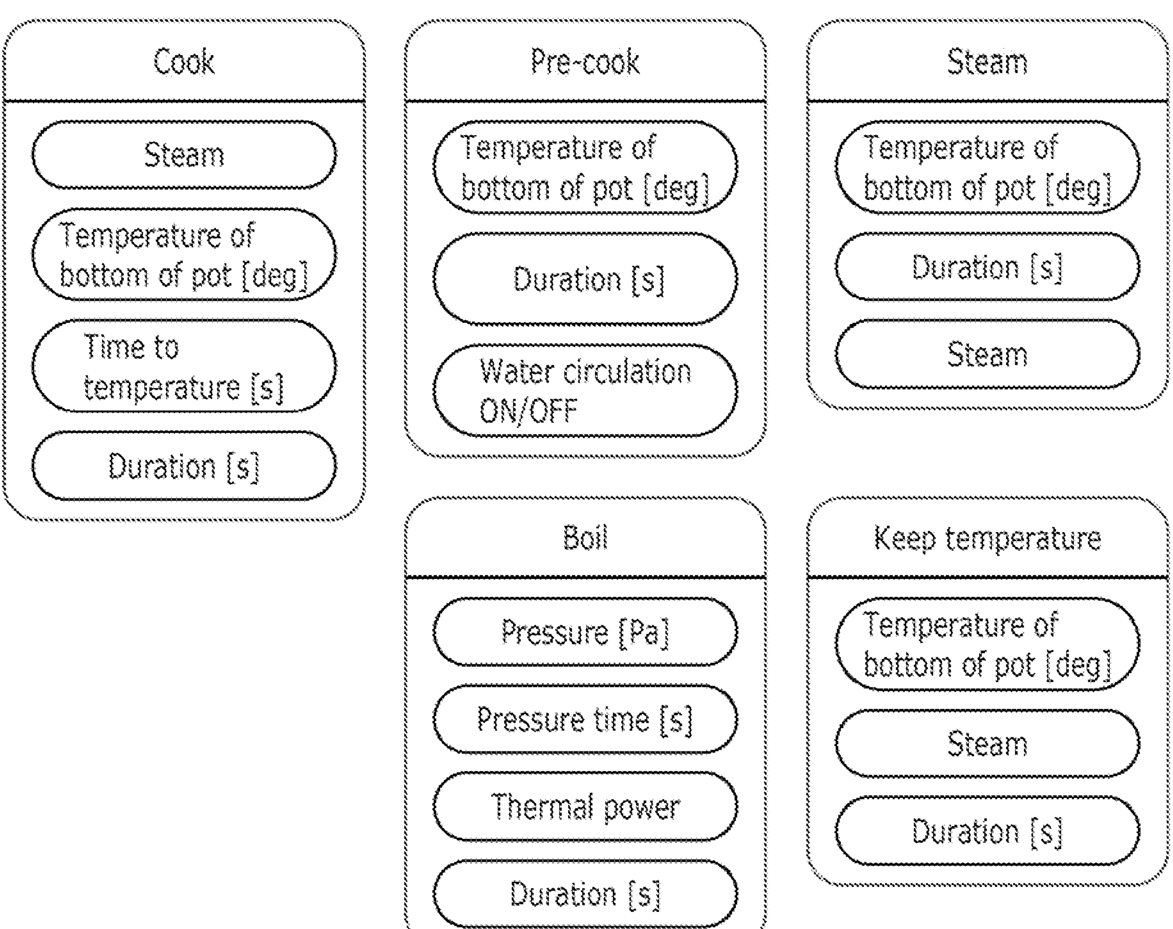
FIG. 7 illustrates a plurality of blocks for a rice cooker according to Embodiment 1.

A plurality of such blocks are used to define the application. For example, a plurality of blocks such as those illustrated in FIG. 5 through FIG. 7 are used.

FIG. 5 illustrates a plurality of blocks for a washing machine according to Embodiment 1. FIG. 6 illustrates a plurality of blocks for a microwave oven according to Embodiment 1. FIG. 7 illustrates a plurality of blocks for a rice cooker according to Embodiment 1. The plurality of blocks illustrated in FIG. 5 through FIG. 7 are merely examples; blocks for a washing machine, a microwave oven, and a rice cooker are not limited to these examples. For example, the plurality of blocks may be hierarchized by abstraction level.

For example, the abstraction level may be changed between a level for manufacturers and a level for non-manufacturers. Examples of a level for non-manufacturers include a level for other manufacturers and a level for third parties.

Here, the level for manufacturers is less abstract than the level for non-manufacturers. A low level of abstraction means that the control content is close to the parameters that drive the actuator and the heater.

On the other hand, for non-manufacturers, the manufacturer provides blocks with the minimum level of abstraction that ensures privy knowledge stays privy and guarantees safety, thereby enabling non-manufacturers to develop applications. The manufacturer can provide blocks with an even higher level of abstraction to ordinary users to enable even more people to develop applications. For example, a higher level of abstraction corresponds to blocks defined in terms that can be understood by ordinary users without specialized knowledge. Terms that can be understood without specialized knowledge are those that correspond to the functionality of the home appliance or other product, for example. More specifically, if "plenty" is selected as the parameter for water amount in the "wash" block in a washing machine, in one low-abstraction layer, the water level parameter in the water supply block is increased from 60 mm to 100 mm, the rotation amount parameter in the agitate block is decreased from 120 rpm to 100 rpm, and so on. With this, rearranging blocks and changing parameters at a higher level of abstraction can be achieved with lower level of abstraction blocks. A plurality of blocks may be defined just like in FIG. 5 through FIG. 7 for apparatuses other than washing machines, microwave ovens, and rice cookers as well. These blocks allow for free development of applications by reconfiguring and adjusting parameters while ensuring the safety and confidentiality of the driving of the actuator and the heater drive.

For example, in apparatus 20 according to the present embodiment, the application may include information on the plurality of blocks and information on the order in which each of the plurality of blocks is executed, and when the rule includes information indicating at least one block among the plurality of blocks cannot be executed, the rule may present, to a developer as error information, that the application cannot be developed or information on the block that cannot be executed.

1.3 Processes

Figure 8:
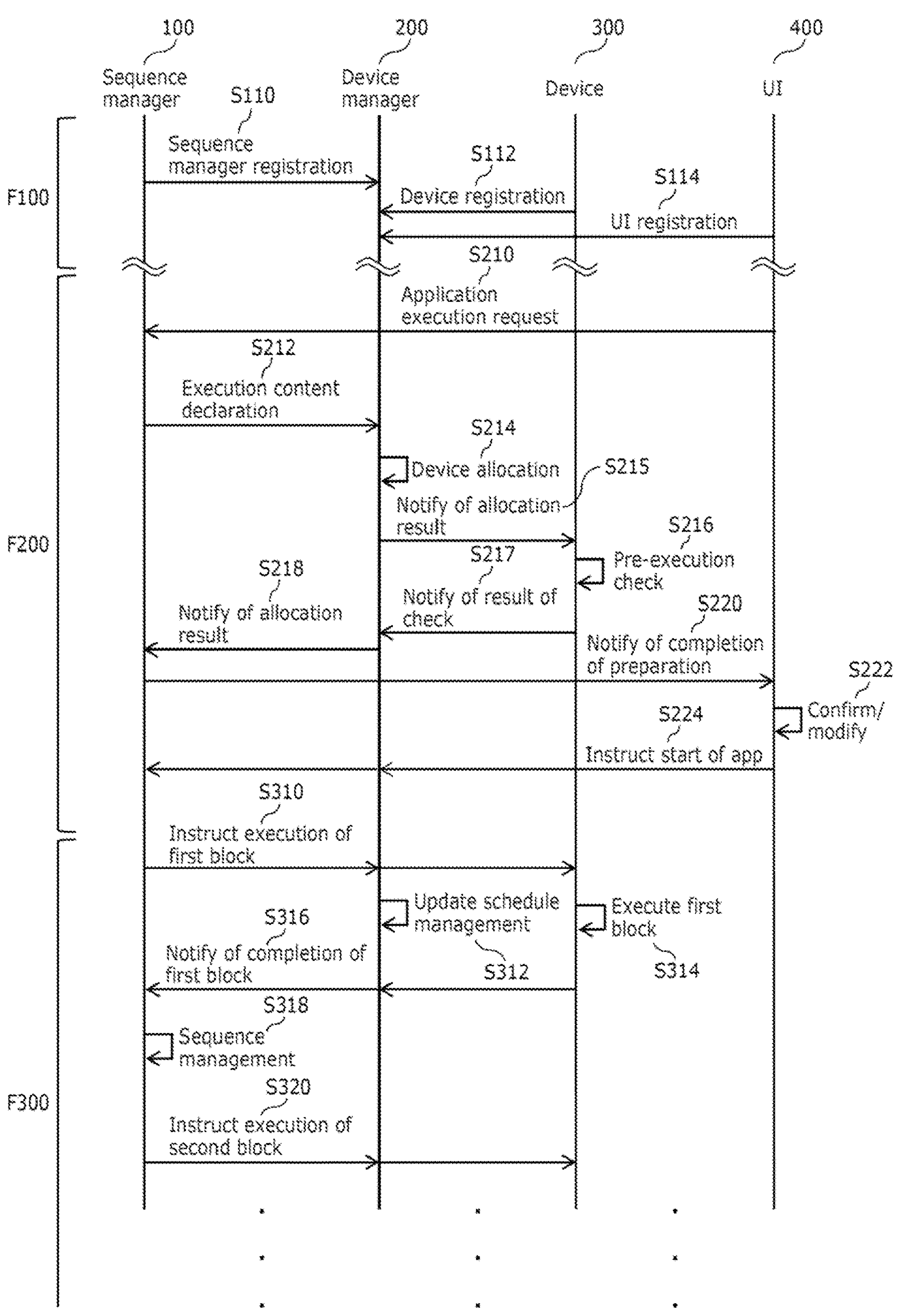
FIG. 8 is a sequence diagram of a system according to Embodiment 1.

Next, processes performed by system 1 configured as described above will be described with reference to FIG. 8. FIG. 8 is a sequence diagram of system 1 according to Embodiment 1.

1.3.1 Preparation Phase F100

First, preparation phase F100 will be described.

Step S110

Sequence manager 100 transmits sequence manager information to device manager 200. This transmission of sequence manager information is performed, for example, by instruction of the system administrator. Device manager 200 registers the received sequence manager information in a sequence manager database, for example. This step may be skipped if the sequence manager information is already registered in the sequence manager database.

The sequence manager information includes, for example, an identifier and/or an address of sequence manager 100 (for example, the uniform resource locator (URL) or internet protocol (IP) address or the like). Sequence manager information may further include any sort of information.

Step S112

Device 300 transmits device information 1101 to device manager 200. This transmission of device information 1101 is done, for example, when device 300 is connected to a computer network. Device Manager 200 registers the received device information 1101 in device database 1100. This step may be skipped if device information 1101 is already registered in device database 1100.

Device information 1101 may be sent to UI 400 and then registered in device manager 200 via UI 400.

Device information 1101 includes an identifier and/or an address of device 300. Device information 1101 may further include any sort of information. FIG. 9 illustrates one example of a device database according to Embodiment 1. A plurality of items of device information, including device information 1101, are registered in device database 1100 in FIG. 9. Each item of device information includes a device ID, an address, a type, a manufacturer name, a model number, actuator/heater, and a degradation level. Actuator/heater is information identifying actuator 22 and/or heater 23 included in device 300. The degradation level is one example of degradation information that indicates whether actuator 22 and/or heater 23 included in device 300 has degraded or not. Here, a higher degradation level indicates more degradation. Device information 1101 may include information about executable blocks. Information about executable blocks may be information that specifies blocks in the database as executable or non-executable, or it may be information about executable blocks only. Whether a block is executable or not can be prepared in advance based on information such as the actuator/heater information included in device information 1101.

Device information 1101 may include information that can identify facilities 2*a* through 2*d*.

Step S114

UI 400 transmits UI information to device manager 200. This UI information is transmitted, for example, by user instruction. Device manager 200 registers the received UI information in a UI database, for example. This step may be skipped if the UI information is already registered in the UI database.

UI information 1101 includes an identifier and/or an address of UI 400, for example. The UI information may further include any sort of information.

The UI information may include information that can identify facilities 2*a* through 2*d*.

Through the above processes, sequence manager 100, device manager 200, device 300, and UI 400 can be associated with each other and establish a connection with each other. This completes preparation phase F100.

1.3.2 App Pre-Execution Phase F200

Next, app pre-execution phase F200 will be described. Prior to app pre-execution phase F200, the application is downloaded from the application delivery platform to sequence manager 100 in accordance with instructions from the user received via UI 400. With the application downloaded to sequence manager 100, the following processes are performed.

Step S210

UI 400 accepts an app execution request from the user and transmits the app execution request including information identifying the application to sequence manager 100. For example, the user selects an application from among several applications downloaded to sequence manager 100 via UI 400, and instructs the execution of the selected application.

The app execution request transmitted from UI 400 to sequence manager 100 is transmitted as a set with information that can identify facilities 2*a* through 2*d*.

The app execution request does not have to be explicitly accepted from the user. For example, the user's behavior or state may be detected and an app execution request may be automatically transmitted to sequence manager 100 based on the detection results.

Step S212

Sequence manager 100 transmits the execution content declaration of the application identified by the app execution request to device manager 200. The execution content declaration includes information on the plurality of blocks that define the application to be executed and information that can identify facilities 2*a* through 2*d*.

Figure 10:
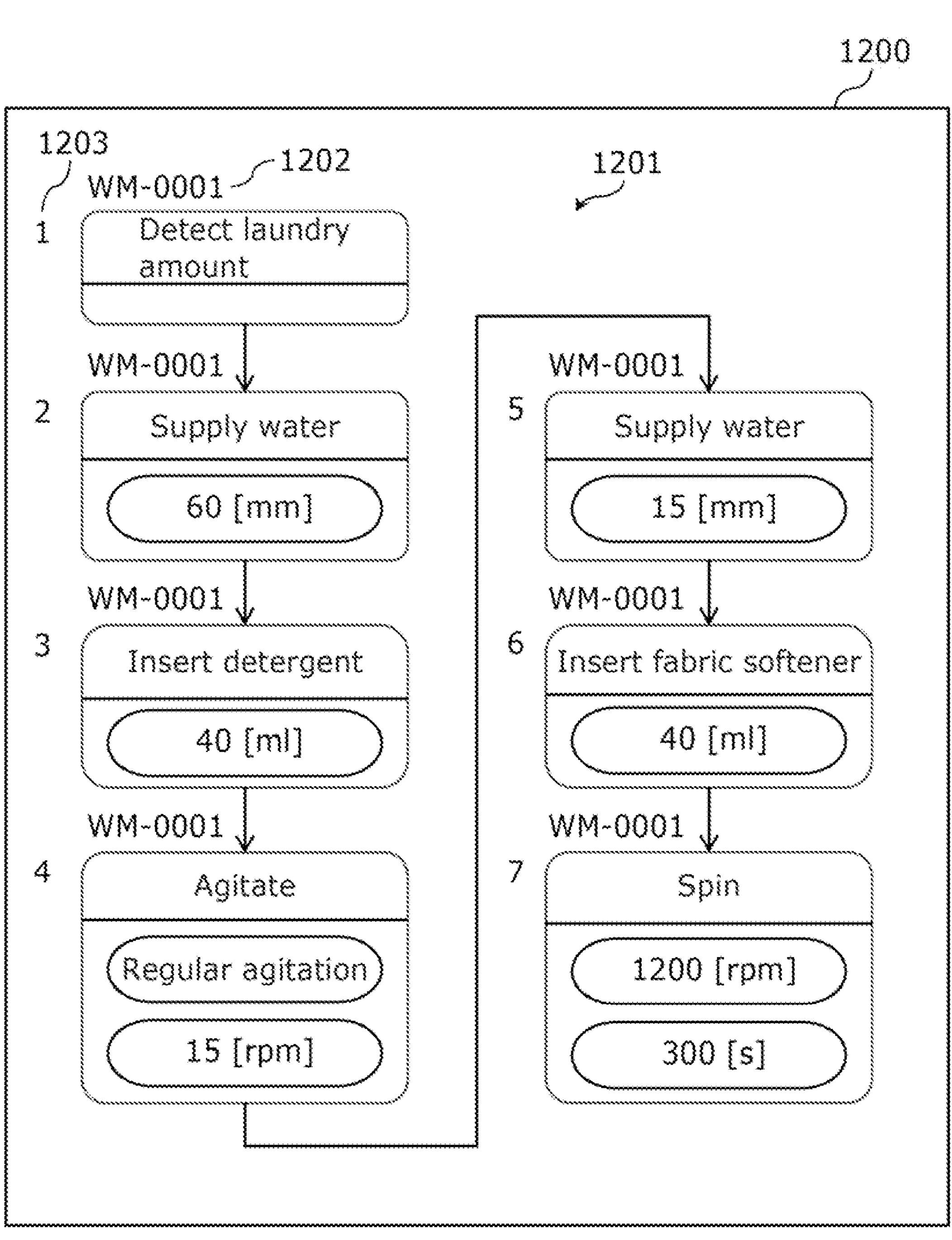
FIG. 10 illustrates one example of an execution content declaration according to Embodiment 1.

FIG. 10 illustrates one example of an execution content declaration according to Embodiment 1. FIG. 10 illustrates execution content declaration 1200 for the application defined by combining a plurality of blocks for the washing machine illustrated in FIG. 5. Execution content declaration 1200 includes a plurality of blocks 1201, information 1202 about the device required to execute each block 1201, and information 1203 on the order in which blocks 1201 are to be executed.

Execution content declaration 1200 does not need to include information 1202 about the device. In such cases, device manager 200 needs to search for a device that can execute the relevant block at the facility indicated by the received facility information from information about the plurality of blocks 1201 and perform device allocation.

In FIG. 10, information 1202 about the device indicates the model number of device 300, but information 1202 is not limited to this example. Information 1202 about the device may be any information that can indicate a condition for device 300 that can be assigned to the block. For example, information 1202 about the device may include a plurality of model numbers, or may include only the type of device, intended use, device location, or any combination of these.

Step S214

Device manager 200 allocates device 300 associated with device manager 200 to each block in the execution content declaration, based on information that can identify facilities 2*a* through 2*d*. For example, device manager 200 allocates, to each of the plurality of blocks 1201 illustrated in FIG. 10, device DEV001 having a model number of WM-0001, which is registered in device database 1100 in FIG. 9 as being connected to the facility indicated by the received facility information. If the operational status of device 300 or its connection to the cloud is managed, the allocation of a device 300 that is in operation may be prohibited.

For example, if the plurality of blocks illustrated in FIG. 10 are not registered as being connected to the facility indicated by the received facility information, i.e., if the target device does not exist at this facility, device manager 200 notifies sequence manager 100 of whether the application corresponding to the execution content declaration is executable or not.

Step S215

Device manager 200 notifies devices 300 of the result of the device allocation. This transmits the respective blocks included in the application to the respective allocated devices 300.

Step S216

Device 300 checks a block before it is executed. Stated differently, before executing a block, device 300 checks to see if any problems will arise in device 300 if the block is executed. For example, device 300 checks for safety and/or efficiency issues.

Device 300 then changes the block based on the result of the check. This corrects the blocks so that problems do not arise.

Figure 11:
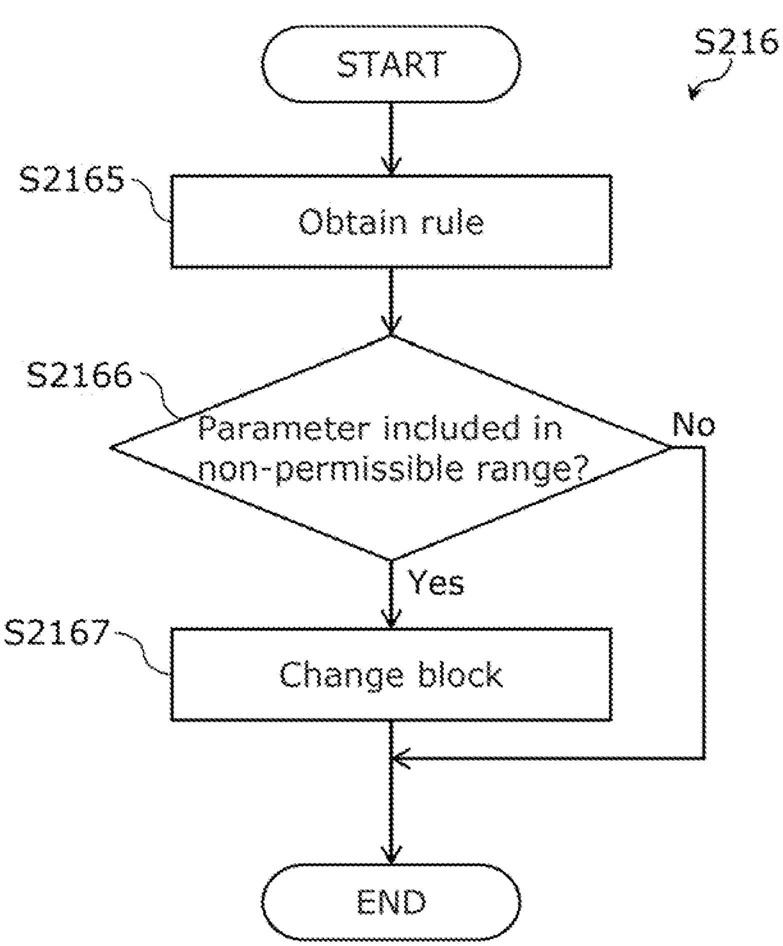
FIG. 11 illustrates a flowchart of a pre-execution check process according to Embodiment 1.

This pre-execution check process will be described in greater detail with reference to FIG. 11. FIG. 11 illustrates a flowchart of the pre-execution check process according to Embodiment 1.

Step S2165

Device 300 obtains a rule corresponding to a block. The rule defines a parameter range within which at least one of actuator 22 or heater 23 is not permitted to be driven (hereafter referred to as a non-permissible range). For example, device 300 consults the rule database to obtain a parameter range corresponding to actuator 22 or heater 23 that the block drives. For example, the rule database may be included in device 300, and may be included in sequence manager 100 or device manager 200.

FIG. 12 illustrates one example of a rule database according to Embodiment 1. Rules 1301 and 1302 are registered in rule database 1300 in FIG. 12. Each of rules 1301 and 1302 includes a parameter range that defines a non-permissible range. For example, rule 1301 includes a range greater than 1000 rpm as a non-permissible range.

For example, a parameter range that allows the interior space of enclosure 21, allows actuator 22, or allows heater 23 to reach its maximum withstand temperature is predefined as such a non-permissible range. A maximum withstand temperature refers to the rated temperature and indicates the maximum tolerable temperature. Therefore, if actuator 22 or heater 23 is driven with a parameter in the non-permissible range, the temperature of the interior space of enclosure 21, the temperature of actuator 22, or the temperature of heater 23 will reach an unacceptable temperature.

In FIG. 12, each of rules 1301 and 1302 includes a non-permissible range as a parameter range, but this example is non-limiting. For example, each of rules 1301 and 1302 may include, as the parameter range, a parameter range within which actuator 22 or heater 23 is permitted to be driven (hereafter referred to as a permissible range). Even in this case, each of rules 1301 and 1302 may define, as the non-permissible range, a range excluding the permissible range. The permissible range is defined as a range within which actuator 22 or heater 23 can be safely driven. Furthermore, the permissible range is defined such that a wide range of parameters can be used for the development of a wide variety of applications.

For example, the parameters by which actuator 22 or heater 23 can be safely driven may vary depending on the environment of device 300, such as the interior space of enclosure 21, and the permissible range may not depend solely on the performance of actuator 22 or heater 23 itself. Therefore, in order to ensure safe driving in any environment, the permissible range is heavily weighted in favor of safety, which reduces the freedom for development of a wide variety of applications. The rules may therefore be independent of the application and may be associated with information on, for example, device 300. The use of such rules allows for both safety and the development of a wide variety of applications.

The rules relate to the range within which actuator 22 or heater 23 can be safely driven. The range within which actuator 22 or heater 23 can be safely driven may be a range that takes into account the start condition or the end condition of the block. Consider an example including a first block and a second block that is executed after the first block. A rule (a permissible range) could be set for a case in which the first block is to be executed until the start condition of the second block is reached, whereby actuator 22 or heater 23 is loaded with a load that affects safety. Stated differently, the permissible range depends on the performance of actuator 22 or heater 23, the start condition or the end condition of the block, etc.

For example, the permissible range or the non-permissible range may be defined by a combination of a plurality of parameters. More specifically, the permissible range or the non-permissible range may be a range of output values of a plurality of parameter functions. For example, if device 300 is a washing machine, the permissible range or non-permissible range may be a range of output values of a function of a first parameter indicating water level and a second function indicating motor speed. The function can be predetermined empirically and/or experimentally. Instead of a function, a permissible range or non-permissible range may be defined by a collection of a plurality of combinations of parameter values.

Each of rules 1301 and 1302 further includes the type, the manufacturer name, and actuator/heater. This allows device 300 to obtain, from rule database 1300, rules corresponding to actuator 22 or heater 23 that is driven by the block. For example, device 300 consults rule database 1300 in FIG. 12, and obtains rules 1301 for the spin block in FIG. 10.

Step S2166

Device 300 determines if the parameters included in the block are within the non-permissible range. If device 300 determines that the parameters are not within the non-permissible range (No in S2166), device 300 skips the subsequent step S2167 and ends the pre-execution check process. However, if device 300 determines that the parameters are within the non-permissible range (Yes in S2166), device 300 proceeds to the next step S2167.

Step S2167

Device 300 changes the block and ends the pre-execution check process. Changing a block means changing the contents of the block, removing the block, adding a new block before or after the block, or any combination thereof.

For example, device 300 can change a block by changing the parameters of the block to parameters that are within the permissible range. A specific example of such a change to a block will be described with reference to FIG. 13.

Figure 13:
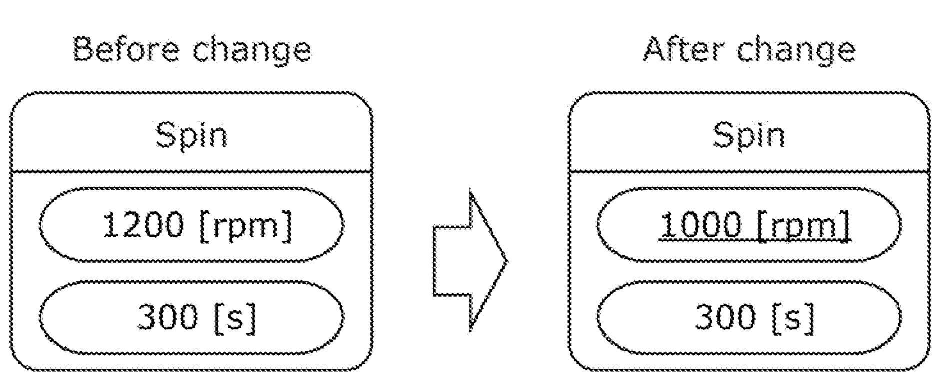
FIG. 13 illustrates one example of changing a block according to Embodiment 1.

FIG. 13 illustrates one example of changing a block according to Embodiment 1. In FIG. 13, since the speed parameter in the spin block is included in the non-permissible range, it is changed to a parameter that is included in the permissible range (from 1200 rpm to 1000 rpm).

For example, device 300 can also change a block by changing the parameters of the block to parameters that are within the permissible range and adding a new block. A specific example of such a change to a block will be described with reference to FIG. 14.

Figure 14:
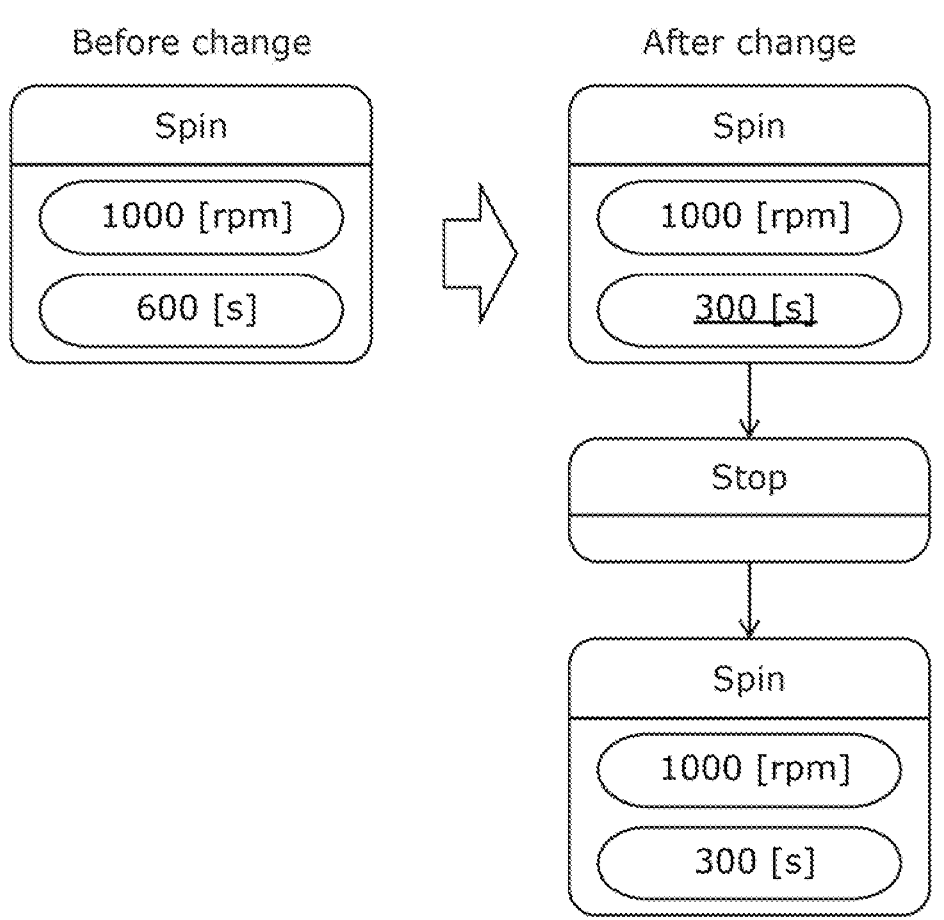
FIG. 14 illustrates one example of changing a block according to Embodiment 1.

FIG. 14 illustrates one example of changing a block according to Embodiment 1. In FIG. 14, since the time parameter in the spin block is included in the non-permissible range, it is changed to a parameter included in the permissible range (from 600 s to 300 s), and a stop block and spin block are added after the spin block. For example, by changing a block that unintentionally places a load on device 300 by spinning the wash tank at high speed for a long time during the spin operation, the load can be reduced, a stop added, and the spin block performed again, allowing the application to safely perform the functions defined in the application before the change.

For example, device 300 can also change a block by removing it.

Although the changing of a block for a washing machine is described here, a block can be changed for other apparatuses in the same manner as well.

For example, in a microwave oven, if a temperature parameter is in the non-permissible range, the temperature parameter may be changed to a temperature parameter that is in the permissible range. If a run time parameter is in the non-permissible range, the run time parameter may be changed to a run time parameter that is in the permissible range and a new block may be added.

In a rice cooker, if the parameter for the temperature of the bottom of the pot is included in the non-permissible range, the parameter for the temperature of the bottom of the pot may be changed to a parameter that is included in the permissible range. If a duration parameter is in the non-permissible range, the duration parameter may be changed to a duration parameter that is in the permissible range and a new block may be added.

Step S217

Device 300 transmits the result of the pre-execution check to device manager 200. If a block has been modified, the modified block may be transmitted to device manager 200.

Step S218

Device manager 200 responds to sequence manager 100 with the result of the device allocation. If the block has been modified in the pre-execution check, the application including the modified block may be transmitted to sequence manager 100.

Step S220

Sequence manager 100 receives a notification of the allocation result from device manager 200 and notifies the user that execution preparation is complete via UI 400.

Step S222

UI 400 displays a list of devices on which the application will be executed and a graphical user interface (GUI) for accepting input from the user to confirm execution of the application. UI 400 may accept device allocation changes from the user. Moreover, UI 400 does not need to display a list of devices.

Step S224

UI 400 receives execution confirmation input from the user and transmits an instruction to start the app to device manager 200. Device manager 200 forwards the instruction to start the app to sequence manager 100.

Steps S220, S222, and S224, which again provide information to the user before the application is executed, may be omitted because they may increase the user's workload.

This completes app pre-execution phase F200.

1.3.3 App Execution Phase F300

Next, app execution phase F300 will be described.

Step S310

Sequence manager 100 receives the instruction to start the app and selects the initial block (the first block) from among the plurality of blocks included in the application. Sequence manager 100 then transmits an instruction to execute the selected first block to device manager 200.

When a plurality of blocks operate consecutively, sequence manager 100 may send instructions to execute the plurality of blocks together to device manager 200.

Device manager 200 transmits the instruction to execute the first block to device 300 allocated to the first block, based on the instruction to execute the first block received from sequence manager 100.

Step S312

Device manager 200 receives the instruction to execute the first block, and updates the schedule (scheduled time of use) for each device.

Step S314

Device 300 receives the instruction to execute the first block, and executes the first block.

Step S316

Device 300 transmits a notification of completion to device manager 200 when the execution of the first block is complete. If an error occurs during the execution of the first block, device 300 may send error information to device manager 200. Device 300 may send event information to device manager 200 during the execution of the first block. For example, sensor output values or device operations can be used as event information, but examples are not limited thereto. Device manager 200 forwards the notification of completion and/or the various information received from device 300 to sequence manager 100.

Step S318

Upon receiving the notification of completion of the first block, sequence manager 100 updates the application progress, and selects the next block (the second block). If sequence manager 100 receives error information, it executes a process corresponding to the error information (for example, return to the previous block, return to the first block, wait, etc.). Information on the process corresponding to the error information, for example, may be held in advance in sequence manager 100 or accepted from the user via UI 400. If sequence manager 100 receives event information, it executes a process corresponding to the event information. For example, if the event information includes the output value of the water level sensor, sequence manager 100 updates the water level parameter for indicating water level in the block being executed.

Step S320

Sequence manager 100 then transmits an instruction to execute the selected second block to device manager 200.

The instruction to execute the second block may be an instruction to the same device as the instruction to execute the first block (S310), or to a different device.

The instruction to execute the second block may be transmitted to device manager 200 in the same manner as the execution instructions for the first block—by transmitting instructions to execute a plurality of blocks together.

Subsequent processing is the same as for the first block (S312 through S318), so repeated illustration in the figures and explanation in the description are omitted. The blocks included in the application are executed in sequence, and when the execution of the last block is completed, app execution phase F300 ends.

Although the execution of blocks is exemplified as being instructed one by one in sequence, the execution of blocks is not limited to this example. For example, the execution of a plurality of blocks allocated with the same device may be instructed together. In such cases, it may be checked in advance whether each block satisfies the parameter range for executing its function, or a block corresponding to the change may be downloaded to the device before execution. For example, instructions to execute each of the blocks may be given to a plurality of devices.

1.4 Advantageous Effects, Etc.

As described above, the application including one or more blocks and the rule database provide an environment in which a wide variety of applications can be developed, and for applications freely developed in that environment, actuator 22 that physically moves or heater 23 that outputs thermal energy can be safely driven. Stated differently, the application including one or more blocks and the rule database can provide an environment in which applications can be freely developed, while at the same time providing functions to ensure safety independent of the application. As a result, for example, the development of a wide variety of applications with a high degree of freedom and the development of a rule database to ensure safety can be created in parallel, enabling the early development of a wide variety of applications.

Even after the application is provided, the rule database can be modified to make the application more secure. In addition, even if a manufacturer needs to improve a situation that was not anticipated beforehand, the rule database is defined independently from the applications, so all applications can be supported by updating the rule database, without having to change a wide variety of applications themselves.

One conceivable measure is to store a rule base for error handling by detecting the state of the application when it is executed, without modifying the application itself. However, this measure invariably means dealing with the error condition after it has occurred, allowing a situation where the home appliance is overloaded or a situation where safety cannot be guaranteed. It is therefore possible to include a rule database independent of the applications, and to guarantee safety by modifying the application content by consulting the rule data.

Apparatus 20 according to the present embodiment includes: at least one of actuator 22 or heater 23, and controller 24 that controls the at least one of actuator 22 or heater 23. Controller 24 obtains an application defined by a plurality of blocks that drive the at least one of actuator 22 or heater 23. Each of the blocks includes a parameter for driving actuator 22 or heater 23. Controller 24 consults a first rule that defines a first parameter range in which the at least one of actuator 22 or heater 23 is not permitted to be driven, and modifies the application by changing at least one of the plurality of blocks. The at least one of the plurality of blocks includes a parameter included in the first parameter range. Controller 24 drives the at least one of actuator 22 or heater 23 based on the modified application.

This allows actuator 22 and/or heater 23 to be driven based on an application defined by a plurality of blocks. It is therefore is possible to develop applications using blocks that abstract the control of apparatus 20, allowing a wide variety of applications to be developed not only by the manufacturer but also by third parties, and these applications can be easily executed on apparatus 20. Furthermore, before actuator 22 and/or heater 23 is/are driven based on the application, a block including a parameter in the first parameter range that is not permitted can be changed. Thus, it is possible to inhibit actuator 22 and/or heater 23 from being driven at a non-permissible parameter. Stated differently, if an application developer mistakenly instructs the driving of actuator 22 and/or heater 23 at a non-permissible parameter, it is still possible to inhibit the execution of an application that cannot safely control apparatus 20. Thus, the application developer can improve the safety of apparatus 20 controlled by the application, even if the application is created with an emphasis on suitability for the user rather than ensuring the safety of actuator 22 and/or heater 23.

For example, in apparatus 20 according to the present embodiment, controller 24 may consult the first rule, and modify the application by changing a parameter included in the first parameter range to a parameter included in a range in which the at least one of actuator 22 or heater 23 is permitted to be driven.

With this, since a parameter included in the non-permissible first parameter range can be changed to a parameter included in the permissible range, for example, the application developer can lower the priority that takes into consideration the safe driving of actuator 22 and heater 23 to more freely develop the application, and furthermore, the developer of the software that is incorporated in apparatus 20 that controls actuator 22 and heater 23 can allow the execution of blocks without having to check the safety of each and every application every time, whereby actuator 22 and/or heater 23 can be prevented from being driven with non-permissible parameters.

For example, in apparatus 20 according to the present embodiment, controller 24 may consult the first rule, and modify the application by changing a parameter included in the first parameter range to a parameter included in a range in which the at least one of actuator 22 or heater 23 is permitted to be driven, and adding a new block to the plurality of blocks.

With this, since a parameter included in the non-permissible first parameter range can be changed to a parameter included in the permissible range, actuator 22 and/or heater 23 can be prevented from being driven with non-permissible parameters. Furthermore, since a new block can be added, it is possible to supplement a function degraded by a parameter change with a new block.

For example, in apparatus 20 according to the present embodiment, controller 24 may modify the application by removing the at least one block including a parameter included in the first parameter range.

With this, since a block including a parameter included in the non-permissible first parameter range can be removed, actuator 22 and/or heater 23 can be prevented from being driven with non-permissible parameters. For example, if actuator 22 and heater 23 are unable to execute the parameter specified by the application developer in the first place, the removal allows the device to be controlled without confusion. On the other hand, the user may be notified of the removal.

For example, in apparatus 20 according to the present embodiment, controller 24 may consult the first rule, determine, for each of a plurality of parameters included in the plurality of blocks, whether the parameter is included in the first parameter range, and when controller 24 determines that the parameter is included in the first parameter range, may change the block including the parameter.

This makes it possible to more reliably change a block including a parameter included in the non-permissible first parameter range.

For example, in apparatus 20 according to the present embodiment, the application may include information on the order in which each of the plurality of blocks is executed and information on the timing of execution of each of the plurality of blocks. The information on the timing for each of the blocks indicates, for example, the amount of time between the start of the block and the start or end of another block (for example, the block that is first in order).

This enables the application to include order and timing information, and to make decisions and execute them sequentially while checking the parameter ranges of each block.

For example, in apparatus 20 according to the present embodiment, the application may include information on the plurality of blocks and information on the order in which each of the plurality of blocks is executed, and when the rule includes information indicating at least one block among the plurality of blocks cannot be executed, the rule may present, to a developer as error information, that the application cannot be developed or information on the block that cannot be executed.

With this, a new block can be added, the order of blocks can be changed, or a block can be removed before the application is executed to ensure that the third block is executed after the second block. Accordingly, the application developer can lower the priority that takes into consideration the safe driving of actuator 22 and heater 23 to more freely develop the application. Furthermore, the developer of the software that is incorporated in apparatus 20 that controls actuator 22 and heater 23 can allow the execution of blocks without having to check the safety of each and every application every time.

For example, in apparatus 20 according to the present embodiment, the first parameter range may be a range of parameters that allow the at least one of actuator 22 or heater 23 to reach its maximum withstand temperature.

This makes it possible to inhibit actuator 22 and/or heater 23 from reaching its maximum withstand temperature when the application is executed, which makes it possible to improve the safety of apparatus 20 controlled by the application.

For example, apparatus 20 according to the present embodiment may include enclosure 21 including an interior space, and the first parameter range may be a range of parameters that allow the interior space to reach its maximum withstand temperature.

This makes it possible to inhibit the interior space of enclosure 21 from reaching its maximum withstand temperature when the application is executed, which makes it possible to improve the safety of apparatus 20 controlled by the application.

Variations of Embodiment 1

In Embodiment 1, processes performed by system 1 are described with reference to FIG. 8, but the flow of processes is not limited to this example. In particular, regarding the pre-execution check (S216) described in detail, the timing and the main module in which the pre-execution check are performed are not limited to this example. Next, a number of variations of the sequence diagram for system 1 will be described in detail with reference to FIG. 15A through FIG. 15E.

Figure 15A:
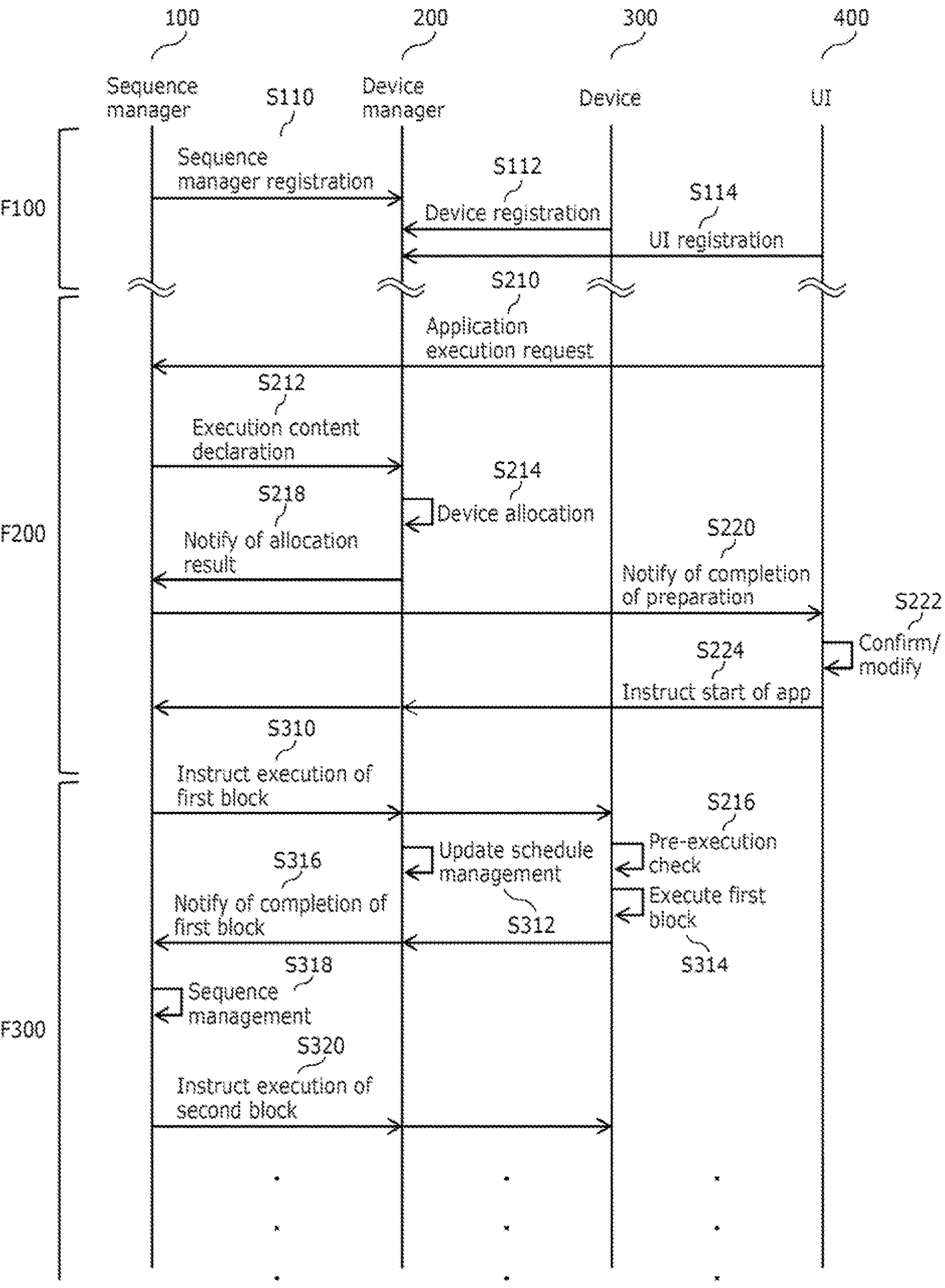
FIG. 15A illustrates a sequence diagram for a system according to Variation 1 of Embodiment 1.

FIG. 15A illustrates a sequence diagram for system 1 according to Variation 1 of Embodiment 1. In FIG. 15A, the pre-execution check (S216) is performed by device 300 just before device 300 receives the execution instruction (S310) to execute the block (S314).

This allows the software incorporated in device 300 to be simply configured to perform a pre-execution check just before the execution of a block. Stated differently, steps S215 and S217 can be omitted. As a result, it is no longer necessary to incorporate functions and a communication API for these processes into device 300, and it is therefore possible to reduce memory used by the microcontroller in device 300.

The result of the pre-execution check may be notified to device manager 200 and/or UI 400. For example, device manager 200 or UI 400 may be notified of the result of the check when a parameter change or an instruction to stop execution of a block is made as a result of the pre-execution check.

Figure 15B:
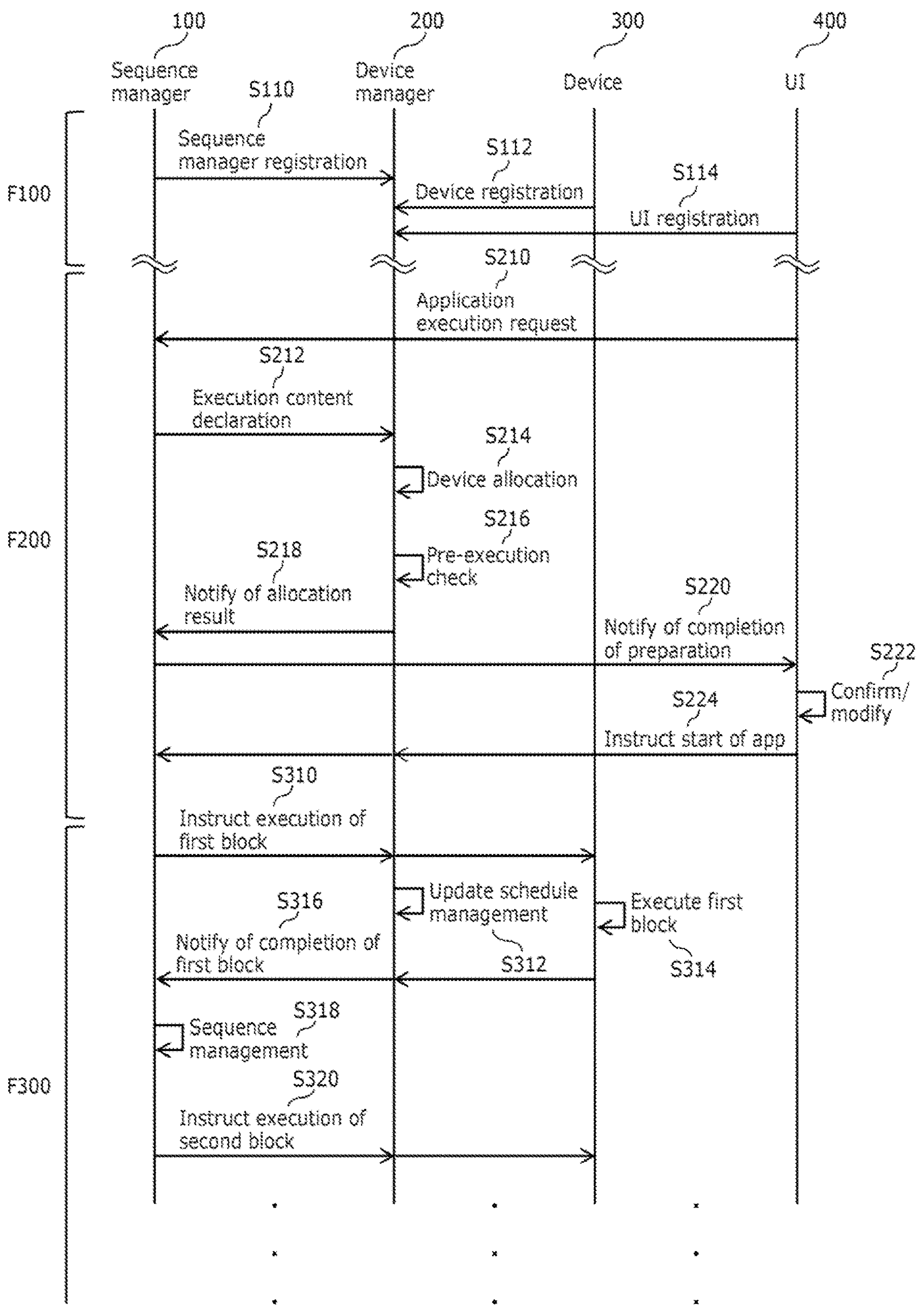
FIG. 15B illustrates a sequence diagram for a system according to Variation 2 of Embodiment 1.

FIG. 15B illustrates a sequence diagram for system 1 according to Variation 2 of Embodiment 1. In FIG. 15B, the pre-execution check (S216) is performed by device manager 200 as it performs the allocation result notification (S218).

With this, the software incorporated in device 300 does not need to include the function for performing the pre-execution check (S216). Thus, the use of memory included in device 300 can be reduced, leading to a cost reduction of device 300.

In Embodiment 1, regarding the block execution (S314) by device 300, the flow of processes performed by instructions from sequence manager 100 implemented in cloud server 10 is described, but the aspect in which the block execution (S314) is performed is also not limited to this example.

For example, the content of the notification from sequence manager 100 may be stored in memory in device 300, and the block may be executed by direct instruction from the user through the UI included in apparatus 20 or UI 400 included in terminal 30. Stated differently, the application may be downloaded to the device and the user may execute the application at any time.

Figure 15C:
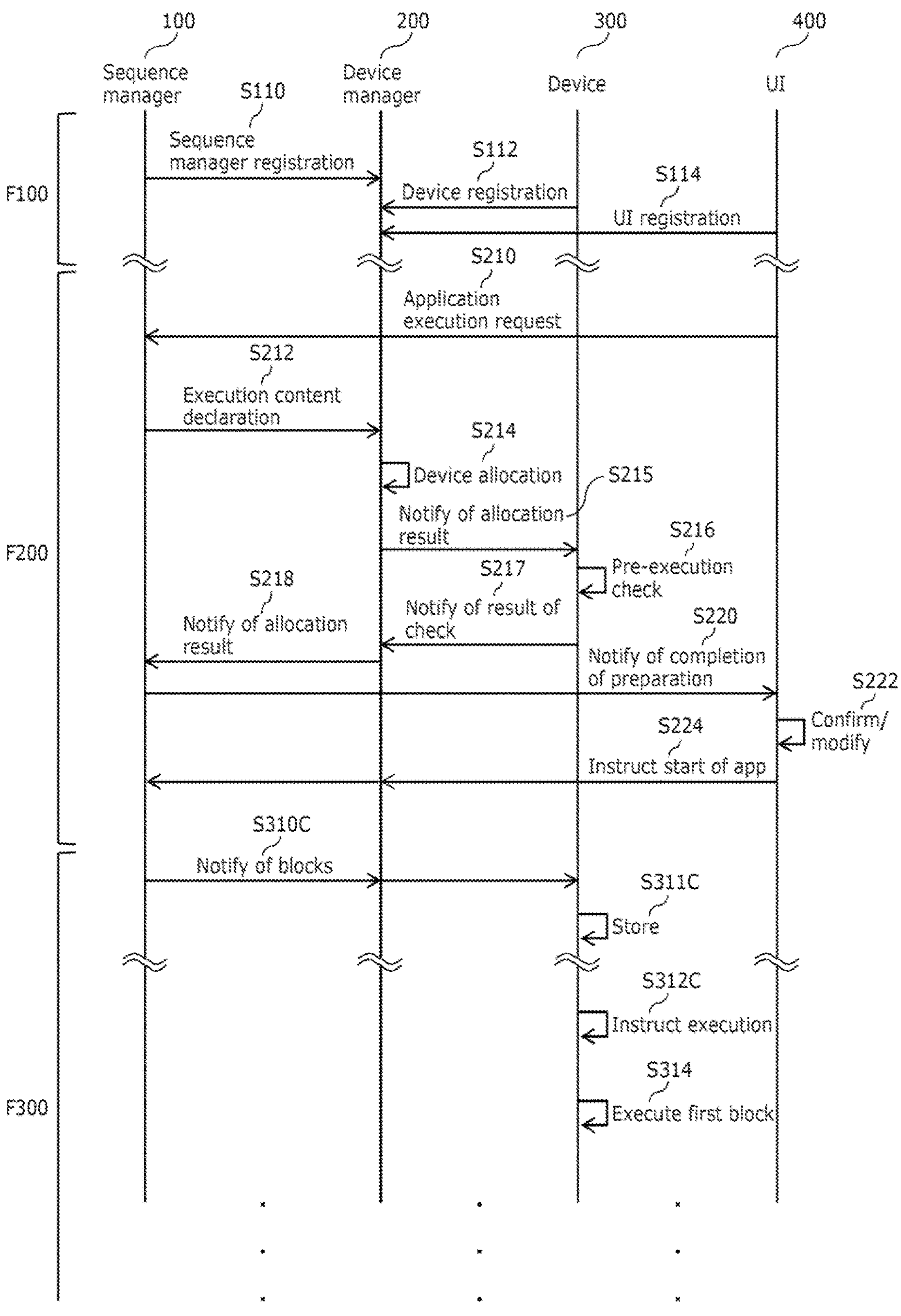
FIG. 15C illustrates a sequence diagram for a system according to Variation 3 of Embodiment 1.

FIG. 15C illustrates a sequence diagram for system 1 according to Variation 3 of Embodiment 1. In FIG. 15C, in app execution phase F300, sequence manager 100 notifies device 300 of one or more blocks to be executed on device 300 (S310C). Device 300 then stores the notified one or more blocks in memory (S311C).

Device 300 then accepts instructions from the user to execute the stored one or more blocks (S312C) and executes the one or more blocks in order starting with the first block (S314).

As described above, by storing the one or more blocks in device 300, device 300 can be controlled without communication between device manager 200 and device 300, thus reducing the risk of device 300 outage or delay due to unstable communication between cloud server 10 and apparatus 20. Therefore, this variation is more effective in environments where communication with cloud server 10 is unreliable and/or in device 300 where device outages or delays during application execution are not tolerated.

In Variation 3, as in Embodiment 1, the pre-execution check (S216) is also important, but the timing and the main module in which the pre-execution check (S216) is performed are not limited to FIG. 15C. In other words, Variation 3 may be combined with Variation 1 or 2.

Figure 15D:
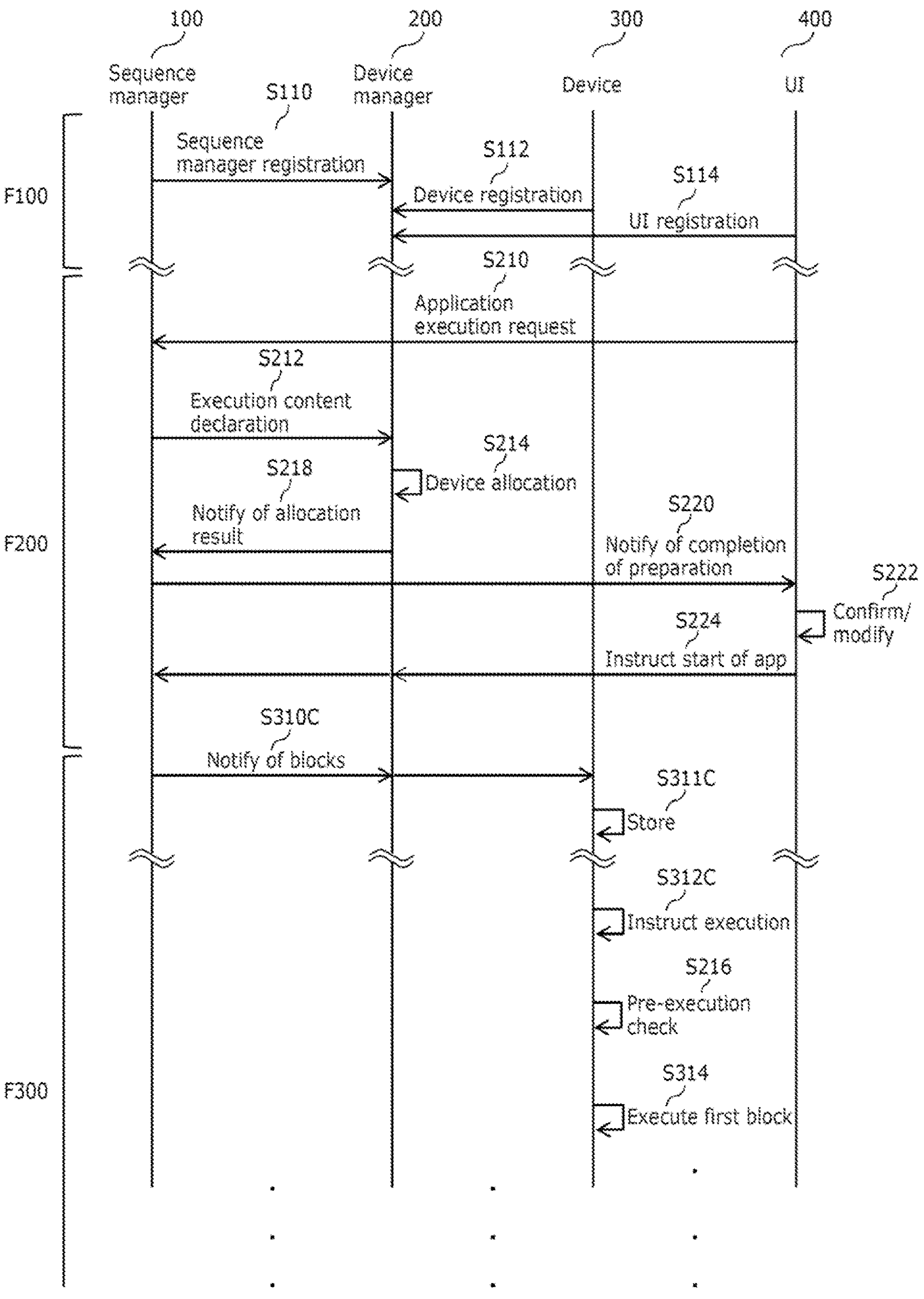
FIG. 15D illustrates a sequence diagram for a system according to Variation 4 of Embodiment 1.

FIG. 15D illustrates a sequence diagram for system 1 according to Variation 4 of Embodiment 1. Variation 4 corresponds to a combination of Variation 1 and Variation 3. In Variation 4, as illustrated in FIG. 15D, the pre-execution check (S216) is performed by device 300 just after device 300 receives the execution instruction (S312C) and just before device 300 executes the block (S314).

Figure 15E:
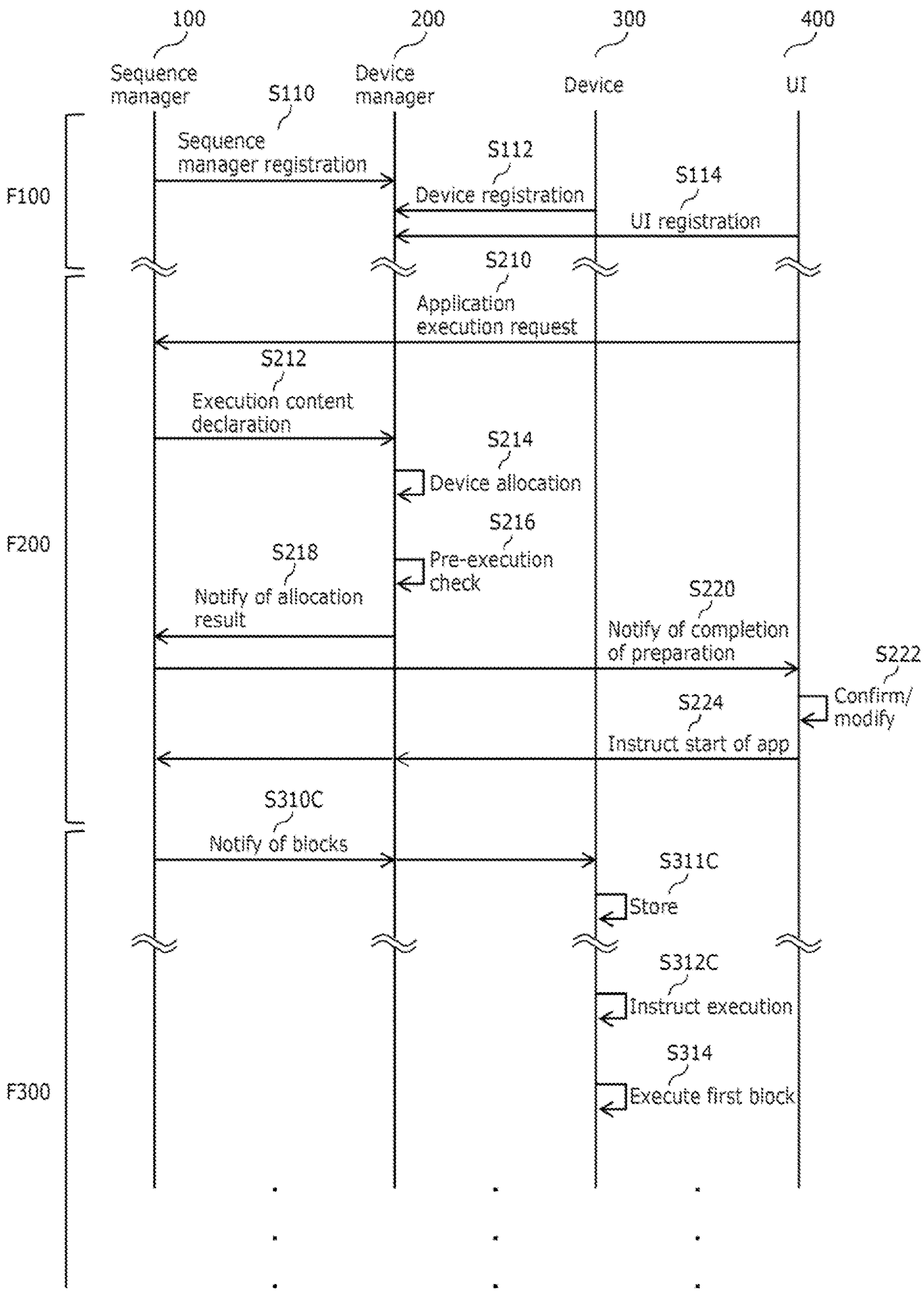
FIG. 15E illustrates a sequence diagram for a system according to Variation 5 of Embodiment 1.

If a block is downloaded to device 300 and the user executes the block at any given time, the possibility of a significant discrepancy between when the block is downloaded and when it is executed increases. Stated differently, the block may be executed, for example, days, months, or years after the block is downloaded to device 300. In such cases, the degradation level, etc., of device 300 may change between the time the block is downloaded and the time the block is executed. Therefore, in device 300—the degradation level of which affects the execution of a block—a pre-execution check is performed by device 300 just before the block is executed, which allows for pre-execution check that is dependent on degradation level FIG. 15E illustrates a sequence diagram for system 1 according to Variation 5 of Embodiment 1. Variation 5 corresponds to a combination of Variation 2 and Variation 3. In Variation 5, as illustrated in FIG. 15E, the pre-execution check (S216) is performed by device manager 200 as it performs the allocation result notification (S218).

Embodiment 2

Next, Embodiment 2 will be described. The present embodiment differs from Embodiment 1 primarily in that the pre-execution check is skipped when the application is authenticated. Hereinafter, the present embodiment will be described with a focus on the points of difference from Embodiment 1.

The hardware and functional configurations of system 1 according to the present embodiment are the same as in Embodiment 1. Accordingly, repeated illustration in the figures and explanation in the description are omitted.

2.1 Processes

In the present embodiment, the processes are the same as in Embodiment 1 except that step S216 of the pre-execution check in Embodiment 1 is replaced with step S216A. Step S216A of the pre-execution check process will therefore be described with reference to FIG. 16.

Figure 16:
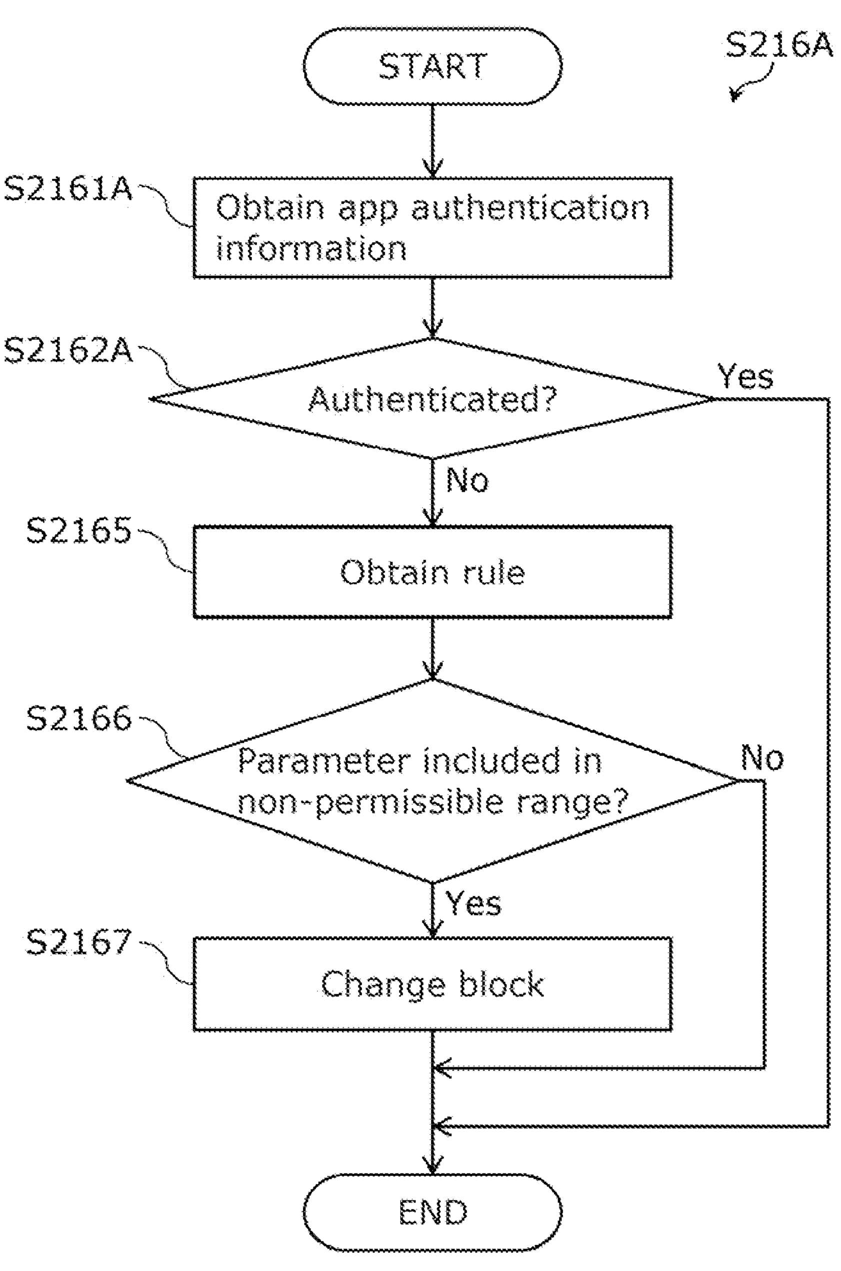
FIG. 16 illustrates a flowchart of a pre-execution check process according to Embodiment 2.

FIG. 16 illustrates a flowchart of the pre-execution check process according to Embodiment 2.

Step S2161A

Device 300 obtains app authentication information. If the application has been authenticated, the app authentication information includes information indicating that the application has been authenticated.

Application authentication is a mechanism for guaranteeing the quality of an application, for example, by enabling confirmation of the application's security and/or identity (i.e., that it has not been tampered with). Next, one example of an application granted with authentication information will be given. If the change history of the application's code indicates that no changes were made to parameter ranges, information indicating that the application has been authenticated is associated with the application.

Step S2162A

Device 300 determines whether the application is authenticated or not based on the retrieved app information. Here, if the application is determined to be authenticated (Yes in S2162A), device 300 skips the subsequent steps S2165 to S2167 and terminates the pre-execution check process. If, however, it is determined that the application is not authenticated (No in S2162A), device 300 proceeds to the next step S2165.

2.2 Advantageous Effects, Etc.

As described above, apparatus 20 according to the present embodiment includes: at least one of actuator 22 or heater 23, and controller 24 that controls the at least one of actuator 22 or heater 23. Controller 24 obtains an application that is defined by a plurality of blocks that drive the at least one of actuator 22 or heater 23 and includes information indicating whether the application has been authenticated. Each of the plurality of blocks includes a parameter for driving actuator 22 or heater 23. When the application does not include information indicating that the application has been authenticated, controller 24 consults a first rule that defines a first parameter range within which the at least one of actuator 22 or heater 23 is not permitted to be driven, and modifies the application by changing at least one of the plurality of blocks. The at least one of the plurality of blocks includes a parameter included in the first parameter range. Controller 24 drives the at least one of actuator 22 or heater 23 based on the modified application.

This allows actuator 22 and/or heater 23 to be driven based on an application defined by a plurality of blocks. It is therefore is possible to develop applications using blocks that abstract the control of apparatus 20, allowing a wide variety of applications developed in this manner to be easily executed on apparatus 20. Furthermore, before actuator 22 and/or heater 23 is/are driven based on the application, a block including a parameter in the first parameter range that is not permitted can be changed. Thus, it is possible to inhibit actuator 22 and/or heater 23 from being driven at a non-permissible parameter. Stated differently, it possible to inhibit the execution of an application that cannot control apparatus 20 safely, which makes it possible to improve the safety of apparatus 20 controlled by the application. Furthermore, when the application is not authenticated, processes that involve application modifications can be performed, which reduces the processing load when the application is authenticated. It is therefore not necessary to perform the determination process for the parameter range for all applications, and management through authentication reduces the processing load and facilitates design standards for the parameter range, making it easier and safer for application developers to design.

For example, in apparatus 20 according to the present embodiment, when the application includes information indicating that the application has been authenticated, controller 24 may not consult the first rule and may not modify the application.

This allows the process for changing the blocks to be skipped if the application has already been authenticated, thus reducing the processing load.

Embodiment 3

Next, Embodiment 3 will be described. The present embodiment differs from Embodiment 1 above primarily in that the pre-execution check is skipped when the creator of the application and the producer of the apparatus are the same. Hereinafter, the present embodiment will be described with a focus on the points of difference from Embodiment 1.

The hardware and functional configurations of system 1 according to the present embodiment are the same as in Embodiment 1. Accordingly, repeated illustration in the figures and explanation in the description are omitted.

3.1 Processes

In the present embodiment, the processes are the same as in Embodiment 1 except that step S216 of the pre-execution check in Embodiment 1 above is replaced with step S216B. Step S216B of the pre-execution check process will therefore be described with reference to FIG. 17.

Figure 17:
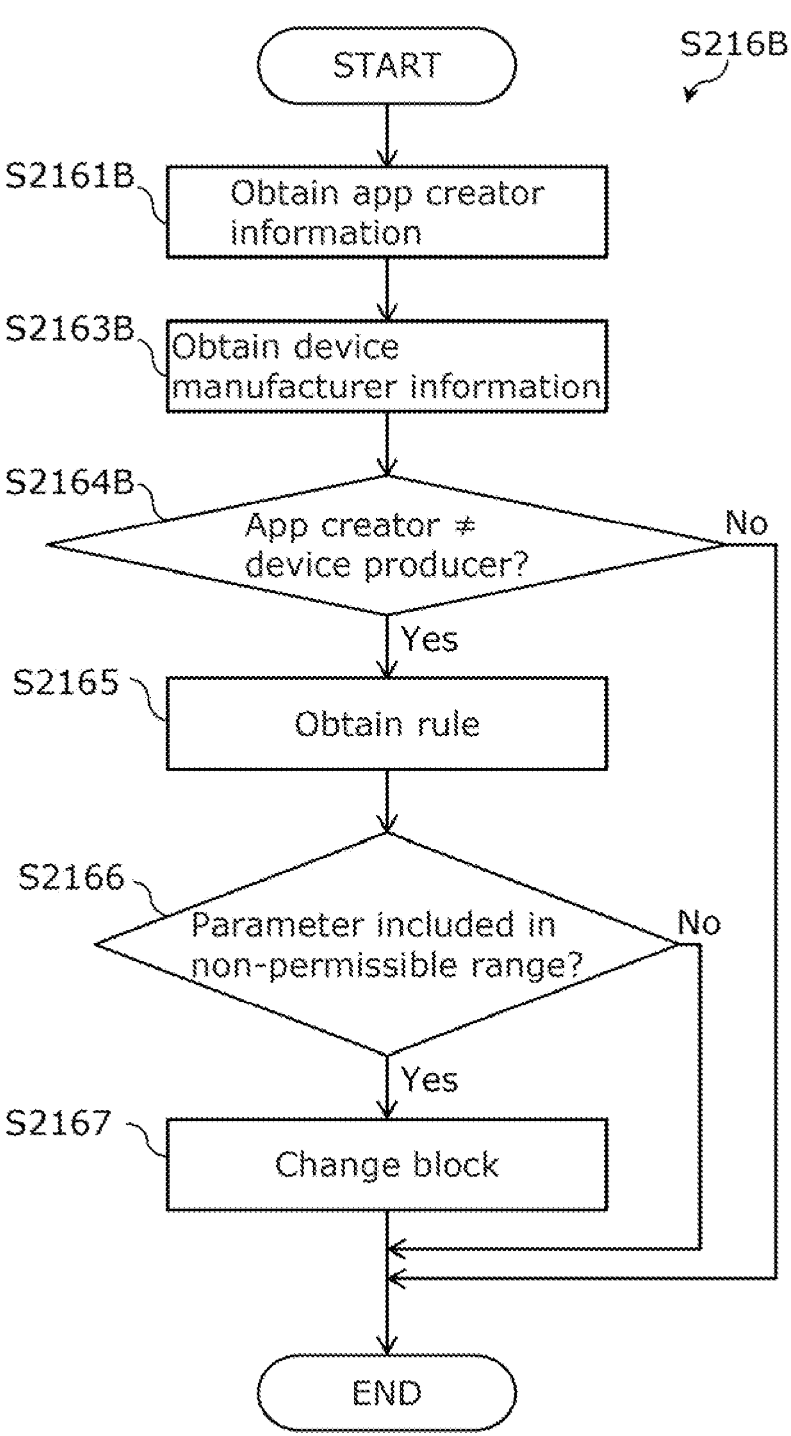
FIG. 17 illustrates a flowchart of a pre-execution check process according to Embodiment 3.

FIG. 17 illustrates a flowchart of the pre-execution check process according to Embodiment 3.

Step S2161B

Device 300 obtains app creator information. The app creator information indicates the creator of the application. Here, "creator" means, for example, the company, individual, or organization that created the application, and may also be referred to as "developer" or "author".

Step S2163B

Device 300 obtains device manufacturer information. The device manufacturer information indicates the producer of the device. Here, "producer" means, for example, the company, individual, or organization that produced device 300 (i.e., apparatus 20), and may also be referred to as "manufacturer".

Step S2164B

Device 300 determines whether the creator of the application is different from the producer of device 300. If the creator of the application is an individual and the producer of device 300 is a company, device 300 may determine that the creator of the application and the producer of device 300 are the same if the company to which the creator of the application belongs and the producer of device 300 match. Device 300 may also determine that the creator of the application and the producer of device 300 are the same if the creator of the application is a development contractor contracted by the producer of device 300.

Here, if the creator of the application and the producer of device 300 are the same (No in S2164B), device 300 skips the subsequent steps S2165 to S2167 and ends the pre-execution check process. If, however, the creator of the application and the producer of device 300 are different (Yes in S2164B), device 300 proceeds to the next step S2165.

3.2 Advantageous Effects, Etc.

As described above, apparatus 20 according to the present embodiment includes controller 24 that controls at least one of actuator 22 or heater 23. Controller 24 obtains an application that is defined by a plurality of blocks that drive the at least one of actuator 22 or heater 23 and includes information indicating a creator of the application. Each of the plurality of blocks includes a parameter for driving actuator 22 or heater 23. Controller 24 obtains the information indicating the producer of apparatus 20, and when the creator of the application and the producer of apparatus 20 are different, controller 24 consults a first rule that defines a first parameter range within which the at least one of actuator 22 or heater 23 is not permitted to be driven, and modifies the application by changing at least one of the plurality of blocks. The at least one of the plurality of blocks includes a parameter included in the first parameter range. Controller 24 drives the at least one of actuator 22 or heater 23 based on the modified application.

This allows the actuator and/or the heater to be driven based on an application defined by a plurality of blocks. It is therefore is possible to develop applications using blocks that abstract the control of apparatus 20, allowing a wide variety of applications developed in this manner to be easily executed on apparatus 20. Furthermore, before actuator 22 and/or heater 23 is/are driven based on the application, a block including a parameter in the first parameter range that is not permitted can be changed. Thus, it is possible to inhibit actuator 22 and/or heater 23 from being driven at a non-permissible parameter. Stated differently, it possible to inhibit the execution of an application that cannot control apparatus 20 safely, which makes it possible to improve the safety of apparatus 20 controlled by the application. Furthermore, when the creator of the application and the manufacturer of apparatus 20 are different, processes that involve application modifications can be performed, which reduces the processing load when the creator of the application and the manufacturer of apparatus 20 are the same.

Embodiment 4

Next, Embodiment 4 will be described. The present embodiment differs from Embodiment 1 primarily in that pre-execution check is performed using a rule corresponding to the degradation level of the apparatus. Hereinafter, the present embodiment will be described with a focus on the points of difference from Embodiment 1.

The hardware and functional configurations of system 1 according to the present embodiment are the same as in Embodiment 1. Accordingly, repeated illustration in the figures and explanation in the description are omitted.

4.1 Processes

In the present embodiment, the processes are the same as in Embodiment 1 except that step S216 of the pre-execution check in Embodiment 1 above is replaced with step S216C. Step S216C of the pre-execution check process will therefore be described with reference to FIG. 18.

Figure 18:
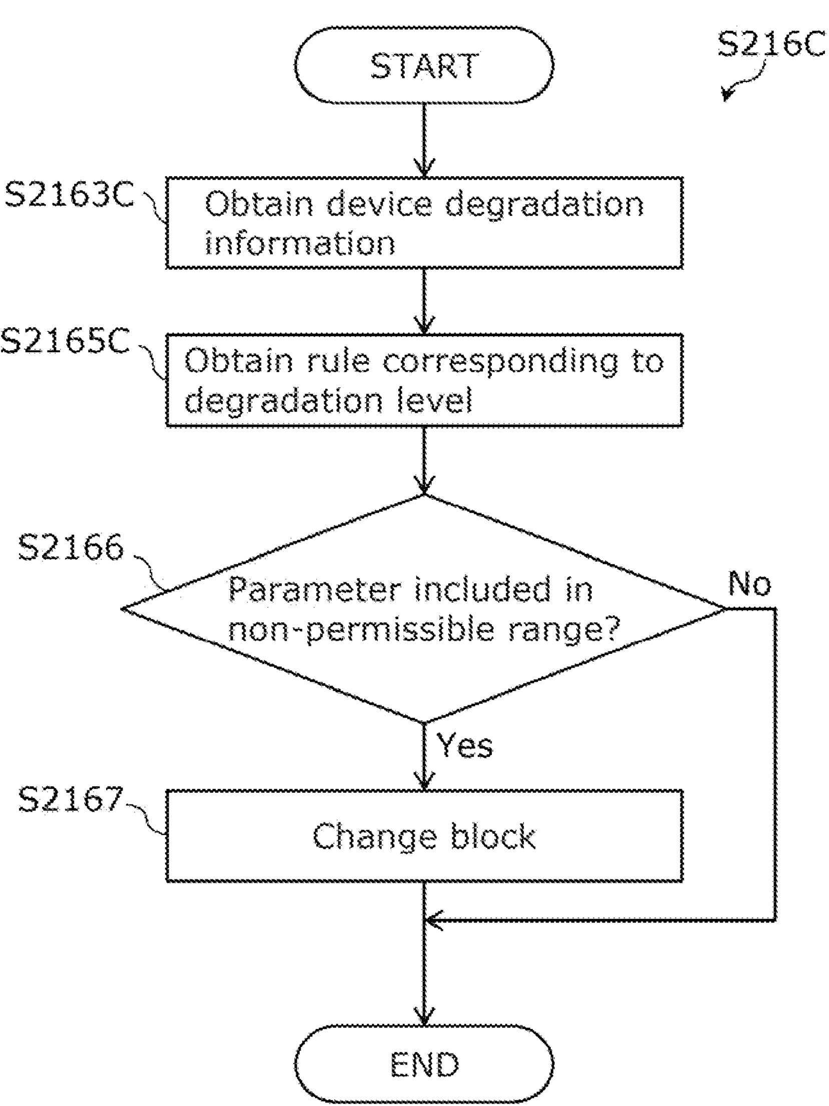
FIG. 18 illustrates a flowchart of a pre-execution check process according to Embodiment 4.

FIG. 18 illustrates a flowchart of the pre-execution check process according to Embodiment 4.

Step S2163C

Device 300 obtains device degradation information. The device degradation information indicates the degradation level of actuator 22 and/or heater 23 included in apparatus 20. The method of detecting the degradation level is not limited, and can be detected using a sensor, for example.

Step S2165C

Device 300 obtains a rule corresponding to the degradation level. For example, device 300 consults the rule database to obtain a parameter range corresponding to the degradation level of actuator 22 or heater 23 that the block drives.

FIG. 19 illustrates one example of a rule database according to Embodiment 4. Rules 1301C through 1304C are registered in rule database 1300C in FIG. 19. Each of rules 1301C through 1304C includes a parameter range that defines a non-permissible range. For example, rule 1301C includes, as a non-permissible range, a range greater than 1000 rpm for motor MM0001 having a degradation level of 0. For example, rule 1302C includes, as a non-permissible range, a range greater than 800 rpm for motor MM0001 having a degradation level of 1. Stated differently, rule 1302C has a wider non-permissible range and a narrower permissible range than rule 1301C.

Each of rules 1301C through 1304C further includes the type, the manufacturer name, actuator/heater, and the degradation level. This allows device 300 to obtain, from rule database 1300, rules corresponding to the degradation level of actuator 22 or heater 23 that is driven by the block. For example, if motor MM0001 driven by the spin block in FIG. 10 has a degradation level of 0, device 300 consults rule database 1300C in FIG. 19 to obtain rule 1301C for the spin block.

An item that determines the degradation level is, for example, the number of times actuator 22 and/or heater 23 included in device 300 has been used, the hours of use, or the number of days used from the start of operation to the present. These items are assumed to increase in an approximately proportional relationship to use by a user. Thus, the rule is defined so that the degradation level increases with each increase in the value corresponding to the item.

Another item that determines the degradation level is, for example, an added value of the temperature of heater 23 or the degree of reproducibility of the input and output of actuator 22 and/or heater 23. The added value of the temperature of heater 23 is the added value of the temperature when heater 23 is driven. For example, the average, intermediate, or maximum temperature of heater 23 during execution of the block is used. The temperature of heater 23 may be the ratio of the execution temperature to the limit temperature of heater 23, or the difference of the execution temperature to the limit temperature of heater 23.

The degree of reproducibility of the input and output of actuator 22 and/or heater 23 is calculated with reference to the relationship between the input value to drive actuator 22 and/or heater 23 and the output of actuator 22 and/or heater 23. The ratio of the actual output value for a given input to the output value specified by the relationship is used.

4.2 Advantageous Effects, Etc.

As described above, apparatus 20 according to the present embodiment includes at least one of actuator 22 or heater 23, and controller 24 that controls the at least one of actuator 22 or heater 23. Controller 24 obtains an application defined by a plurality of blocks that drive the at least one of actuator 22 or heater 23. Each of the plurality of blocks includes a parameter for driving the at least one of actuator 22 or heater 23. Controller 24 obtains degradation information indicating whether the at least one of actuator 22 or heater 23 has degraded. When the degradation information indicates that the at least one of actuator 22 or heater 23 has not degraded, controller 24 consults a first rule that defines a first parameter range within which the at least one of actuator 22 or heater 23 is not permitted to be driven, and modifies the application by changing at least one first block included in the plurality of blocks. The at least one first block includes a parameter included in the first parameter range. When the degradation information indicates that the at least one of actuator 22 or heater 23 has degraded, controller 24 consults a second rule that defines a second parameter range within which the at least one of actuator 22 or heater 23 is not permitted to be driven, and modifies the application by changing at least one second block included in the plurality of blocks. The second parameter range is different from the first parameter range. The at least one second block includes a parameter included in the second parameter range. Controller 24 drives the at least one of actuator 22 or heater 23 based on the modified application.

This allows actuator 22 and/or heater 23 to be driven based on an application defined by a plurality of blocks. It is therefore is possible to develop applications using blocks that abstract the control of apparatus 20, allowing a wide variety of applications developed in this manner to be easily executed on apparatus 20. Furthermore, before actuator 22 and/or heater 23 is/are driven based on the application, a block including a parameter in the first parameter range that is not permitted can be changed. Thus, it is possible to inhibit actuator 22 and/or heater 23 from being driven at a non-permissible parameter. Stated differently, it possible to inhibit the execution of an application that cannot control apparatus 20 safely, which makes it possible to improve the safety of apparatus 20 controlled by the application. Furthermore, different parameter ranges dependent on the degradation information of apparatus 20 can be used, and the block can be used to execute drive instructions from the application side to actuator 22 and/or heater 23 while taking into account the performance of the device as it degrades over time, and apparatus 20 controlled by the application can therefore be made more secure.

Embodiment 5

In Embodiments 1 through 4, a block included in an application that has already been delivered is changed before the application is executed. In the present embodiment, a block included in the application is changed before the application is delivered, i.e., in the development or production stage of the application. In this respect to timing, the present embodiment differs from Embodiments 1 through 4. Hereinafter, the present embodiment will be described in detail with a focus on the points of difference from Embodiments 1 through 4. Excluding the timing of the changing of a block, the present embodiment may be the same as Embodiments 1 through 4. Elements in the present embodiment that are the same as those in Embodiments 1 through 4 are given the same reference signs as in Embodiments 1 through 4, and repeated detailed description thereof will be omitted.

5.1 Configuration

Figure 20:
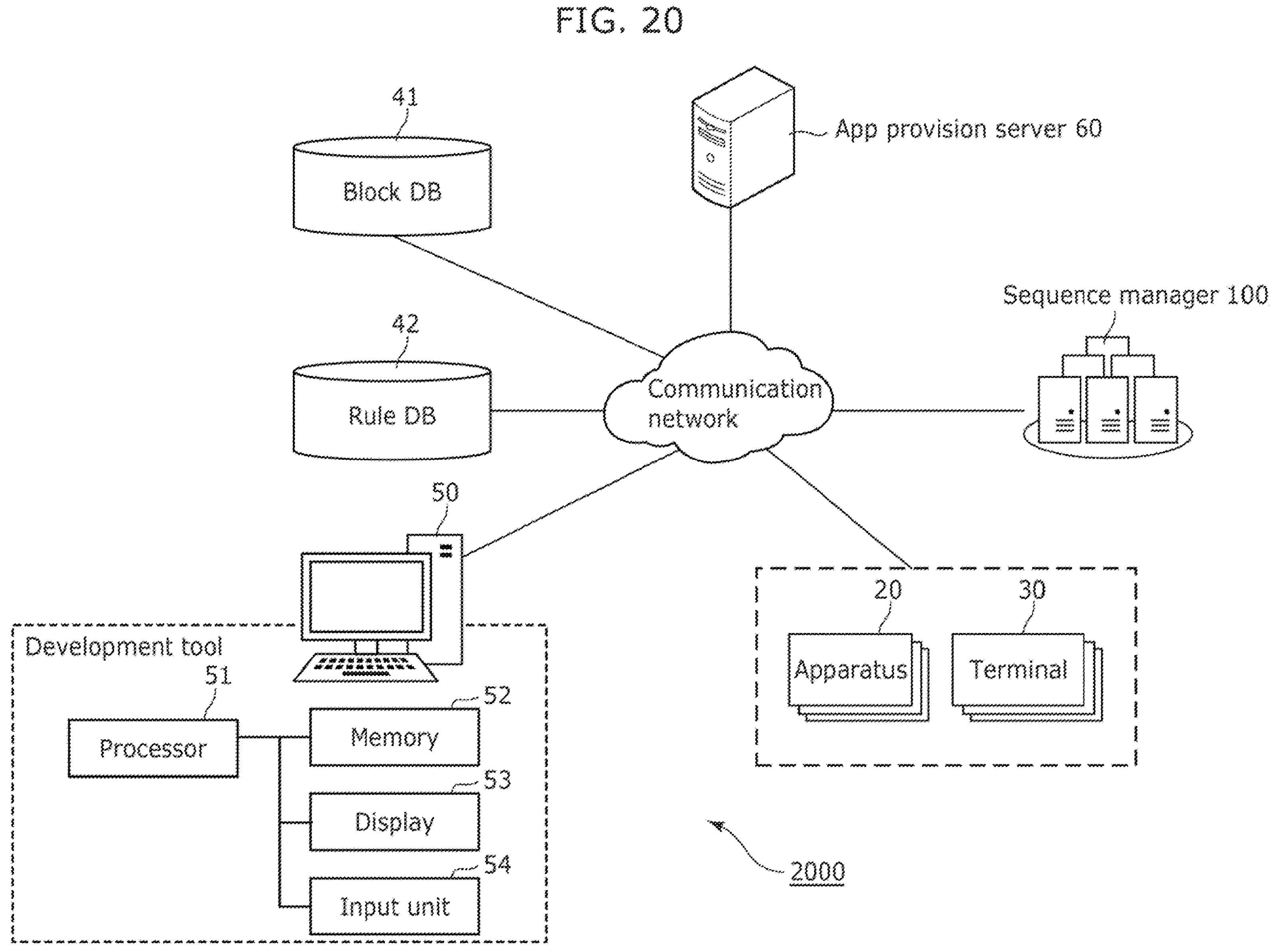
FIG. 20 illustrates a configuration example of an information processing system according to Embodiment 5.

FIG. 20 illustrates a configuration example of an information processing system used in the development of an application.

Information processing system 2000 includes block database 41, rule database 42, development tool 50, a plurality of apparatuses 20 and a plurality of terminals 30, app provision server 60, and sequence manager 100. For example, these components included in information processing system 2000 are connected via a communication network such as the internet.

Block database 41, also referred to as a “block DB”, is a recording medium that stores block lists of a plurality of function blocks. These function blocks are also referred to as “blocks”, just as in Embodiments 1 through 4. Rule database 42, also referred to as a “rule DB”, is a recording medium that stores a plurality of rules. Rule database 42 may be the same as rule database 1300 illustrated in FIG. 12, for example. These recording media can be hard disks, random access memory (RAM), read only memory (ROM), or semiconductor memory. The recording media may be volatile or non-volatile.

Development tool 50 is, for example, a computer system including processor 51, memory 52, display 53, and input unit 54. Processor 51 executes each of the processes described below by executing instructions or a software program stored in memory 52, for example, and displays text or images on display 53. Display 53 is, for example, but not limited to, a liquid crystal display, a plasma display, or an electroluminescent (EL) display. Input unit 54 is configured as, for example, a keyboard, a touch sensor, a touch pad, or a mouse. Such development tool 50 is used, for example, by a developer of the application to generate a sequence or application including a plurality of function blocks. Note that in the present embodiment, development tool 50 is one example of the information processing apparatus.

App provision server 60 obtains and holds applications generated by development tool 50, from that development tool 50 via a communication network. App provision server 60 then downloads the applications it holds to sequence manager 100 in accordance with an instruction from UI 400 included in terminal 30.

FIG. 21 illustrates one example of the information stored in each of block database 41 and rule database 42.

As illustrated in (a) in FIG. 21, block database 41 stores, for each of a plurality of types of apparatuses 20, a list of function blocks for driving that type of apparatus 20, as the above-described block list. For example, block lists 41*a* through 41*e* are stored. Block list 41*a* includes function blocks FB11 through FB14, etc., for driving a convection microwave oven. Block list 41*b* includes function blocks FB21 through FB24, etc., for driving a multicooker. These function blocks may be identical or similar to the blocks in Embodiments 1 through 4.

As illustrated in (b) in FIG. 21, rule database 42 stores, for each type of apparatus 20, a rule group consisting of at least one rule applicable to that type of apparatus 20. For example, rule groups 42*a* through 42*e* are stored. Rule group 42*a* includes rules R100 and R11 through R13, which apply to convection microwave ovens. Rule group 42*b* includes rules R200 and R21 through R23, which apply to multicookers. Rule group 42*d* includes rules R400 and R41 through R43, which apply to washing machines. These rules may be identical or similar to the rules in Embodiments 1 through 4.

Here, each of the convection microwave oven rules R11 through R13 is a dedicated rule that applies, for example, to a given model of convection microwave oven manufactured by a given manufacturer. Similarly, each of the multicooker rules R21 through R23 is a dedicated rule that applies, for example, to a given model of multicooker manufactured by a given manufacturer. Similarly, each of the washing machine rules R41 through R43 is a dedicated rule that applies to a given model of washing machine manufactured by a given manufacturer. More specifically, each of dedicated rules R41 through R43 may be, for example, rule 1301 or 1302 illustrated in FIG. 12.

On the other hand, convection microwave oven rule R100 is a generic rule for convection microwave ovens, applicable to each of a plurality of types of convection microwave ovens, for example. Similarly, multicooker rule R200 is a generic rule for multicookers, applicable to each of a plurality of types of multicookers, for example.

FIG. 22 illustrates examples of a generic rule included in rule database 42.

Rule group 42*d* for washing machines stored in rule database 42 includes, for example, generic rule R400 shown in (a) of FIG. 22. This generic rule R400 indicates a parameter range (500 rpm, $+\infty$) applicable to each of a plurality of types of washing machines. The plurality of types of washing machines include washing machines from a plurality of manufacturers. If each manufacturer offers more than one model of washing machine, the plurality of types of washing machines include those plurality of models of washing machines. Stated differently, the parameter range, i.e., rule indicated in generic rule R400 applies to any washing machine, regardless of manufacturer and model.

The parameter range defines a non-permissible range, just like in Embodiments 1 through 4. For example, generic rule R400 indicates a range greater than 500 rpm as a non-permissible range. Just as in Embodiments 1 through 4, the non-permissible range may be a range of parameters that allow, for example, the interior space of enclosure 21, allows actuator 22, or allows heater 23 to reach its maximum withstand temperature.

Generic rule R400 for washing machines may also indicate a parameter order that applies to each washing machine from a plurality of manufacturers, as illustrated in (b) of FIG. 22. For example, generic rule R400 indicates a parameter range (800 rpm, +∞) applicable to the plurality of models of washing machines provided by the manufacturer "company A", a parameter range (600 rpm, +≅) applicable to the plurality of models of washing machines provided by the manufacturer "company B", and so on.

5.2 Processes

Figure 23:
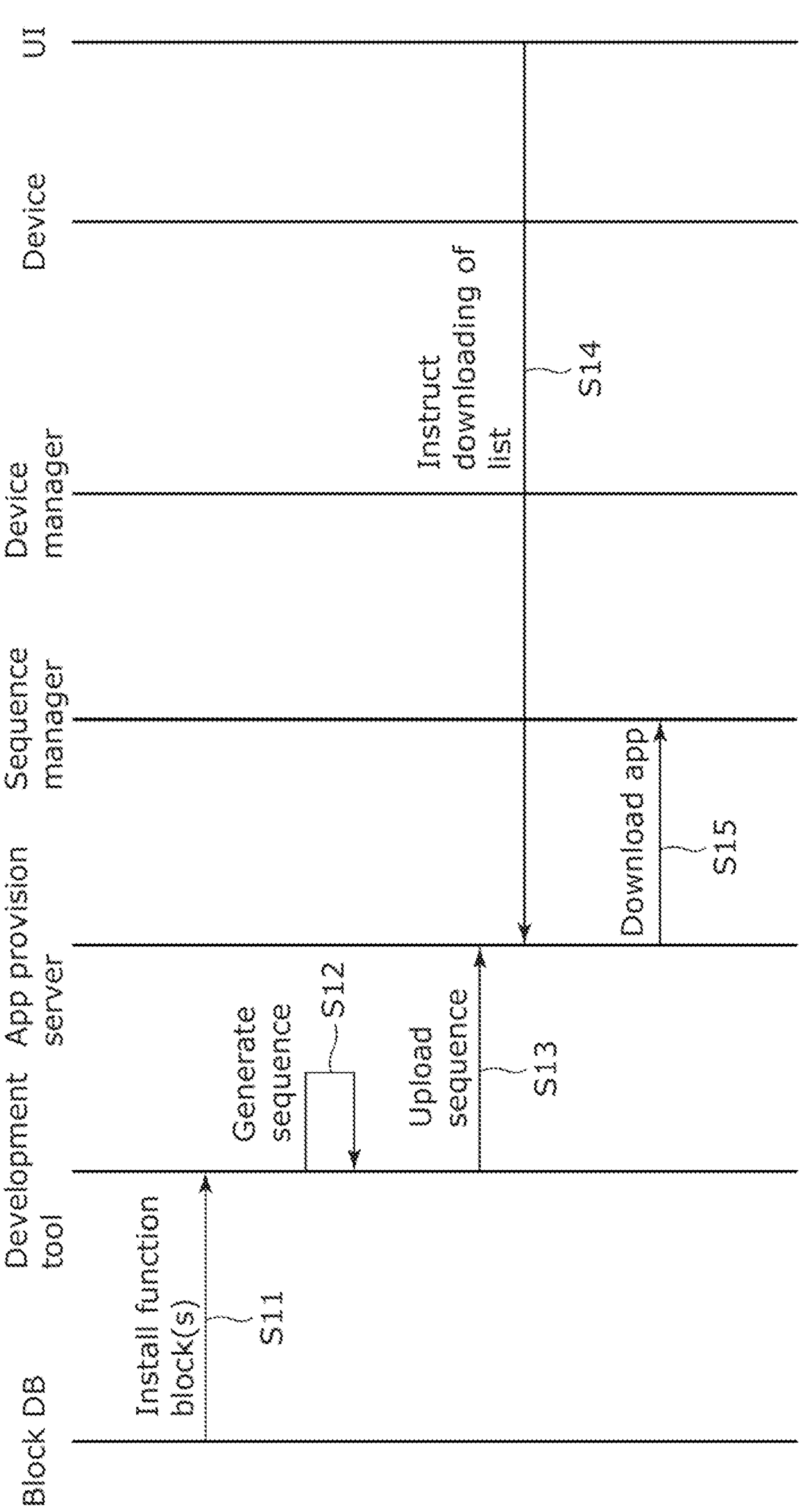
FIG. 23 is a sequence diagram of the information processing system according to Embodiment 5.

FIG. 23 is a sequence diagram of information processing system 2000.

Step S11

First, development tool 50 installs one or more function blocks. More specifically, development tool 50 downloads and obtains one or more function blocks from block database 41. For example, development tool 50 may retrieve block list 41*a* for the convection microwave oven, or only some function blocks from block list 41*a*. Development tool 50 then makes the obtained one or more function blocks available for sequence generation.

Here, each function block stored in block database 41 may be appended with device information corresponding to that function block. This device information indicates the manufacturer, type, model, or model number of, for example, apparatuses 20 driven according to the function block corresponding to that device information. Accordingly, development tool 50 may download one or more function blocks based on the device information. For example, development tool 50 may download one or more function blocks to drive each of apparatuses 20 provided by the same manufacturer, and may download one or more function blocks to drive each of apparatuses 20 used for warming food.

Step S12

Next, development tool 50 generates the sequence. More specifically, development tool 50 generates a sequence using one or more downloaded function blocks in accordance with an input operation performed on input unit 54 by the operator. The operator may be a developer of the application defined by the sequence. In the present embodiment, in this step S12, development tool 50 consults a rule described above and modifies the application based on the rule.

Step S13

Next, development tool 50 uploads the generated sequence. More specifically, development tool 50 generates transmission information for transmitting the generated sequence to app provision server 60 in accordance with an input operation performed on input unit 54 by the operator, based on the content of that sequence, and transmits the generated transmission information to app provision server 60. The transmission information may be, for example, a JavaScript Object Notation (JSON) object. This transmits the sequence to app provision server 60, where it is stored as an application on app provision server 60.

Step S14

Next, the user of terminal 30 accesses app provision server 60 by operating UI 400 of that terminal 30 and browses the list of applications stored in app provision server 60. UI 400 then selects an application from the list in accordance with the user operation, and requests app provision server 60 to download that application.

Step S15

When app provision server 60 receives a download request from UI 400, it downloads the selected application to sequence manager 100 associated with that user.

Figure 24:
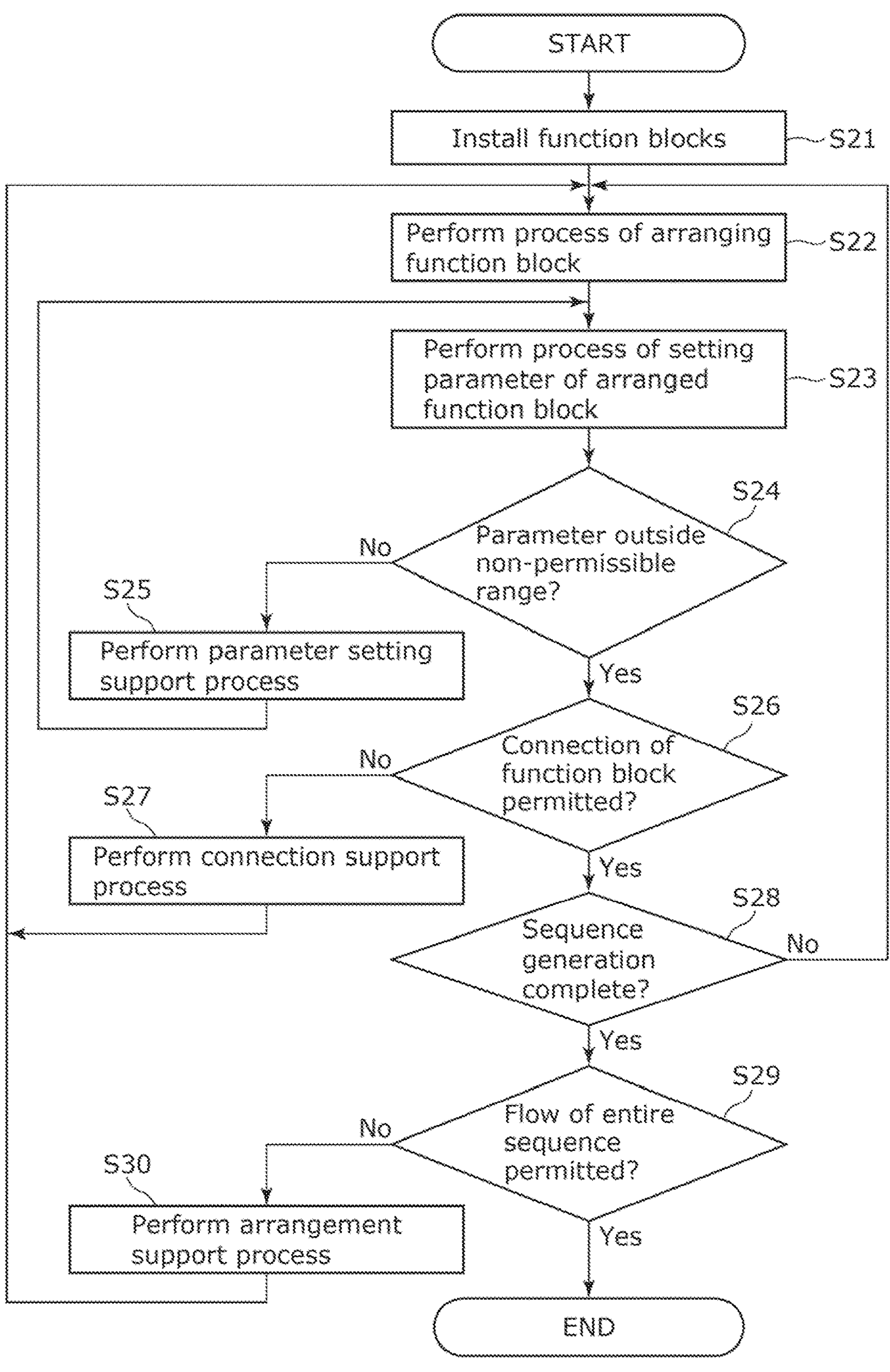
FIG. 24 is a flowchart illustrating the overall processing operations of a development tool according to Embodiment 5.

FIG. 24 is a flowchart illustrating the overall processing operations of development tool 50. More specifically, the flowchart in FIG. 24 illustrates the processing operations of steps S11 and S12 in the sequence in FIG. 23 in greater detail.

Step S21

Development tool 50 first installs a plurality of function blocks to drive apparatus 20, such as a washing machine.

Step S22

Next, development tool 50 performs a process of arranging a function block in accordance with an input operation performed on input unit 54 by the operator. Stated differently, development tool 50 displays on display 53 the plurality of function blocks installed in step S21, and selects one function block from the displayed plurality of function blocks in accordance with an input operation performed on input unit 54 by the operator. Development tool 50 then arranges the function block in the selected block area in the sequence generation screen on display 53 in accordance with the input operation performed on input unit 54 by the operator. The sequence generation screen will be described below with reference to FIG. 27. Simply stated, the operator drags and drops one of the plurality of function blocks into the selected block area.

Step S23

Next, development tool 50 performs a process of setting a parameter of the function block arranged in step S22 in accordance with an input operation performed on input unit 54 by the operator. Stated differently, development tool 50 displays, in the parameter setting area of the sequence generation screen described above, a reception image for accepting the parameter content to be used for that function block. Development tool 50 then accepts the parameter content in accordance with an input operation performed on input unit 54 by the operator, and displays the parameter content in the parameter setting area. This sets a parameter for that function block.

Step S24

Next, development tool 50 consults a rule applicable to apparatus 20, such as a washing machine, and determines whether the parameter set in step S23 is outside the parameter range indicated in that rule, i.e., outside the non-permissible range.

Step S25

If development tool 50 determines in step S24 that the parameter is not outside the non-permissible range (No in step S24), it performs a parameter setting support process. In this parameter setting support process, development tool 50 performs an error presentation process to present an error to the operator or performs an automatic parameter correction process. In the automatic parameter correction process, development tool 50 changes a function block by changing the parameter in a non-permissible range to a parameter in a permissible range. In the error presentation process, development tool 50, for example, displays, on display 53 as an error, a message indicating that the parameter set in the previous step S23 is within the non-permissible range, and prompts the operator to change that parameter. Then, after the process of step S25 is performed, development tool 50 repeats the processes from step S23.

If the processing of step S23 is performed after automatic parameter correction processing is performed in step S25, in step S23, development tool 50 displays the parameter after it has been changed by the automatic parameter correction process in the parameter setting area. On the other hand, if the processing of step S23 is performed after error presentation processing is performed in step S25, in step S23, development tool 50 again accepts the parameter content in accordance with an input operation performed on input unit 54 by the operator, as described above. This changes a parameter for that function block. In other words, this changes the function block.

Step S26

If development tool 50 determines in step S24 that the parameter is outside the non-permissible range (Yes in step S24), it further determines whether the connection of the function block arranged in step S22 is permitted. For example, in step S22, a function block is arranged immediately before or immediately after an existing block, which is another function block already arranged in the selected block area. As a result, a function blocks is arranged connected to an existing block. Stated differently, the function block is arranged so that the process performed by apparatus 20 according to the function block and the process performed apparatus 20 according to the existing block are executed consecutively. In this case, development tool 50 determines whether the connection between that function block and that existing block is permitted by consulting a connection rule applicable to apparatus 20, such as a washing machine.

Step S27

If development tool 50 determines that the connection is not permitted in step S26 (No in step S26), it performs a connection support process. In this connection support process, development tool 50 performs an error presentation process to present an error to the operator or perform an automatic connection correction process. Then, development tool 50 repeats the processes from step S22.

If the processing of step S22 is performed after automatic connection correction processing is performed in step S27, in step S22, development tool 50 displays the two or more function blocks that have been reconnected by the automatic connection correction processing in the selected block area. On the other hand, if the processing of step S22 is performed after error presentation processing is performed in step S27, in step S22, development tool 50 again rearranges the function blocks in accordance with an input operation performed on input unit 54 by the operator, as described above. If the process of step S22 is repeated from step S27, development tool 50 may skip the processes of steps S23 through S25 after step S22 because the parameters of the function block have already been set within the permissible range.

Step S28

When development tool 50 determines that the connection is permitted in step S26 (Yes in step S26), it further determines whether or not the generation of the sequence has completed in accordance with an input operation performed on input unit 54 by the operator. Here, if development tool 50 determines that the generation of the sequence has not completed (No in step S28), processing from step S22 is repeated. At this time, development tool 50 selects a new block from the plurality of blocks installed in step S21 in accordance with an input operation performed on input unit 54 by the operator, and arranges it in the selected block area described above.

Step S29

When development tool 50 determines that the generation of the sequence has completed in step S28 (Yes in step S28), it further determines whether the flow of the entire generated sequence is permitted. For example, assume the second function block is arranged before or after the first function block in the sequence, but a combination rule applicable to apparatus 20, such as a washing machine, does not permit the combination of the first and second function blocks. In such a case, development tool 50 determines that the flow of the entire generated sequence is not permitted. Alternatively, assume a combination rule applicable to apparatus 20, such as a washing machine, requires that the second function block be arranged before or after that first function block. In such a case, development tool 50 determines that the flow of the entire generated sequence is permitted.

Step S30

If development tool 50 determines that the flow of the entire sequence is not permitted in step S29 (No in step S29), it performs an arrangement support process. In this arrangement support process, development tool 50 performs an error presentation process to present an error to the operator or perform an automatic function block arrangement correction process. Then, development tool 50 repeats the processes from step S22.

If the processing of step S22 is performed after automatic connection arrangement processing is performed in step S30, in step S22, development tool 50 displays the two or more function blocks that have been rearranged by the automatic arrangement correction processing in the selected block area. If the process of step S22 is repeated from step S30, development tool 50 may skip the processes of steps S23 through S25 after step S22 because the parameters of the function block have already been set within the permissible range. Development tool 50 may skip also steps S26 and S27 because the connection of the function block is already permitted. Development tool 50 may additionally skip step S28.

Figure 25:
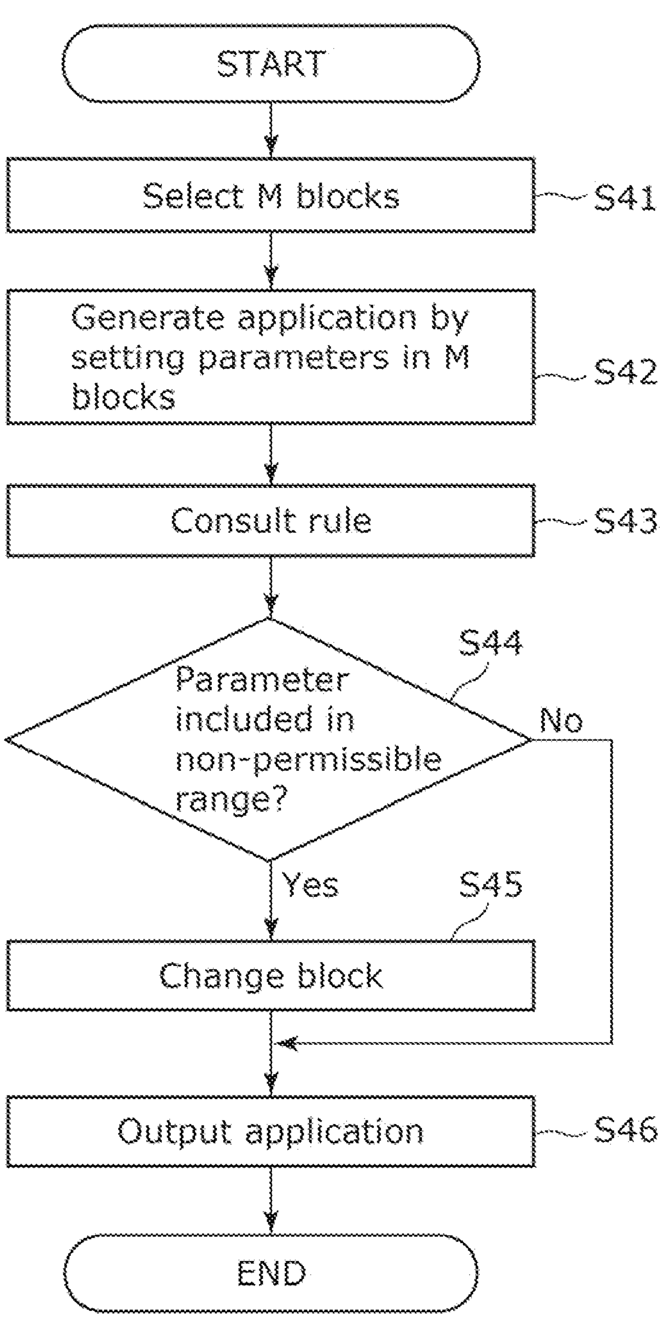
FIG. 25 is a flowchart illustrating an example of an automatic parameter correction process according to Embodiment 5.

FIG. 25 is a flowchart illustrating one example of an automatic parameter correction process.

In the example illustrated in FIG. 24, each time a single function block is selected and arranged, a decision is made and an automatic correction process is performed on the parameters of that function block. However, the present disclosure is not limited to this example; development tool 50 may perform each process according to the flowchart illustrated in FIG. 25.

Step S41

Development tool 50 selects, from among N (N is an integer greater than or equal to 2) function blocks for driving apparatus 20, such as a washing machine, M (M is an integer greater than or equal to one and less than or equal to N) function blocks, in accordance with an input operation performed on input unit 54 by the operator. Stated differently, development tool 50 selects each of the M function blocks as a selected block from among the N function blocks for driving at least one of actuator 22 or heater 23 included in apparatus 20, which is the device to be controlled, in accordance with an input operation performed on input unit 54 by the operator.

Step S42

Next, development tool 50 generates the sequence, i.e., application by setting parameters for each of the M selected function blocks. Stated differently, development tool 50 generates an application including at least the M selected blocks, by setting parameters for driving actuator 22 or heater 23 in each of the M selected blocks in accordance with an input operation performed on input unit 54 by the operator.

Step S43

Next, if each of the M function blocks is a block for driving a washing machine, development tool 50 refers to a rule that applies to a washing machine. For example, development tool 50 refers to generic rule R400 if the application generated in step S42 applies to a plurality of types of washing machines. If the application generated in step S42 is applicable to a given model of washing machine, development tool 50 consults a rule associated with that model of washing machine among dedicated rules R41 through R43. Stated differently, development tool 50 determines whether the application generated in step S42 is an application dedicated to the device to be controlled or a general-purpose application applicable to the device to be controlled and devices other than the device to be controlled. Development tool 50 then, as the above-described rule, consults a rule candidate that corresponds to the determination result of the application, from among a plurality of rule candidates that each define a parameter range within which at least one of actuator 22 or heater 23 is not permitted to be driven.

Step S44

Next, for each parameter included in the M function blocks set in step S42, development tool 50 determines whether the parameter is included in the non-permissible range indicated in the rule.

Step S45

Here, if development tool 50 determines that the parameter is within the non-permissible range (Yes in step S44), it changes the function block including that parameter. Stated differently, development tool 50 modifies the application by changing at least one of the M selected blocks by consulting a rule that defines a parameter range within which at least one of actuator 22 or heater 23 is not permitted to be driven. Here, the at least one of the M selected blocks includes a parameter included in this parameter range.

Step S46

Development tool 50 then outputs the modified application.

Figure 26:
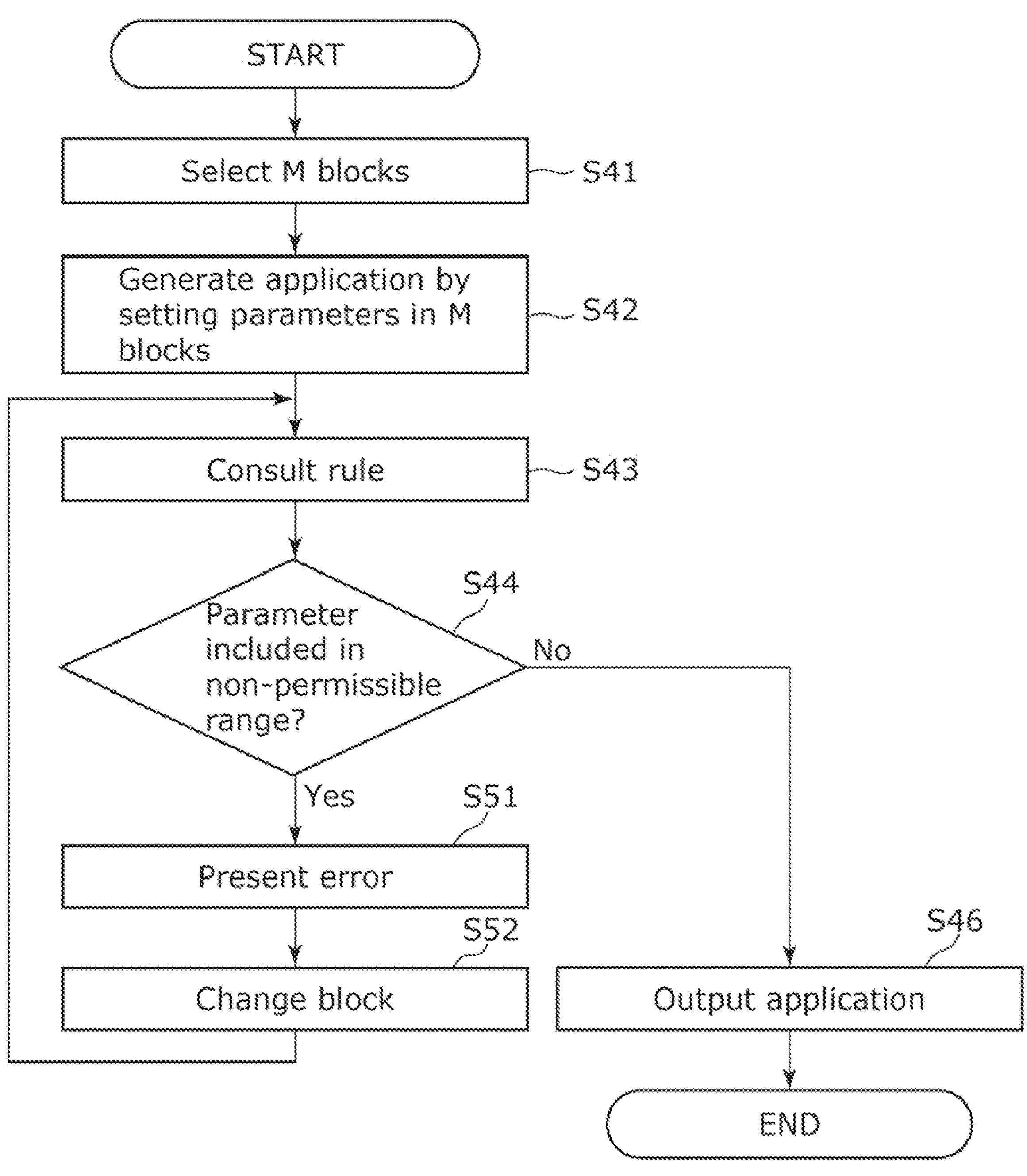
FIG. 26 is a flowchart illustrating an example of a parameter error presentation process according to Embodiment 5.

FIG. 26 is a flowchart illustrating one example of a parameter error presentation process.

In the example illustrated in FIG. 24, each time a single function block is selected and arranged, a decision is made and an error presentation process is performed on the parameters of that function block. However, the present disclosure is not limited to this example; development tool 50 may perform each process according to the flowchart illustrated in FIG. 26.

Steps S41 through S44

Development tool 50 performs steps S41 through S44, just like in the example illustrated in FIG. 25.

Step S51

If development tool 50 determines in step S44 that a parameter is within the non-permissible range (Yes in step S44), it displays an error on display 53 without automatically changing the function block including that parameter. This presents an error to the operator. Stated differently, in steps S43, S44, and S51, development tool 50 presents errors by consulting a rule. More specifically, development tool 50 consults a rule defining a parameter range within which at least one of actuator 22 or heater 23 is not permitted to be driven, and if at least one of the M selected blocks includes a parameter that is included in this parameter range, an error is presented to the operator.

In addition to presenting the error, development tool 50 may also present a plurality of solutions to the operator and prompt the operator to select a solution. In such cases, development tool 50 may present to the operator the differences in output performance for each of the plurality of solutions. In such cases, development tool 50 may also present at least two or more of the following solutions: a solution of changing the parameter, a solution of removing the selected block, and a solution including adding a block.

Step S52

The operator who sees the error changes the parameter set in step S42 by performing an input operation on input unit 54 of development tool 50. When each of the plurality of solutions is presented to the operator as a choice, the operator selects any of the solutions from among those choices by performing an input operation. As a result, development tool 50 changes the function block. Stated differently, development tool 50 modifies the application by changing at least one of the M selected blocks in accordance with an input operation performed by the operator presented with the error. Then, development tool 50 repeats the processes from step S43.

Step S46

If development tool 50 determines in step S44 that the parameter is not within the non-permissible range (No in step S44), the application is output. At this time, if the application has been modified in step S52, the modified application is output. If, however, the application has not been modified in step S52, the application generated in step S42 is output.

Here, if the process of step S51 is repeated, development tool 50 may change how the error is presented according to the number of times step S51 has been repeated. For example, if development tool 50 presents an error K or more times (K is an integer greater than or equal to 2), it may present a parameter not included in the above-described parameter range to the operator. Stated differently, if the number of times an error has been presented is K or more, development tool 50 displays on display 53 a parameter that is not included in the parameter range, i.e., a parameter not included in the non-permissible range, as a parameter candidate to be set in the function block. This presents the candidate to the operator, who is a developer of the application, for example. As a result, the operator, who is a developer of the application who has seen the candidate can easily change the parameter set in step S42 to the candidate by performing an input operation on input unit 54 of development tool 50.

Alternatively, if the number of times the error has been presented is K or more, development tool 50 may present a range of parameters to the operator that are not included in the above-described parameter range. Stated differently, if the number of times the error has been presented is K or more, development tool 50 displays a permissible range for the parameter on display 53. With this, the operator, who is a developer of the application who has seen the permissible range can easily change the parameter set in step S42 to a parameter within the permissible range by performing an input operation on input unit 54 of development tool 50.

5.3 Display Example

Figure 27:
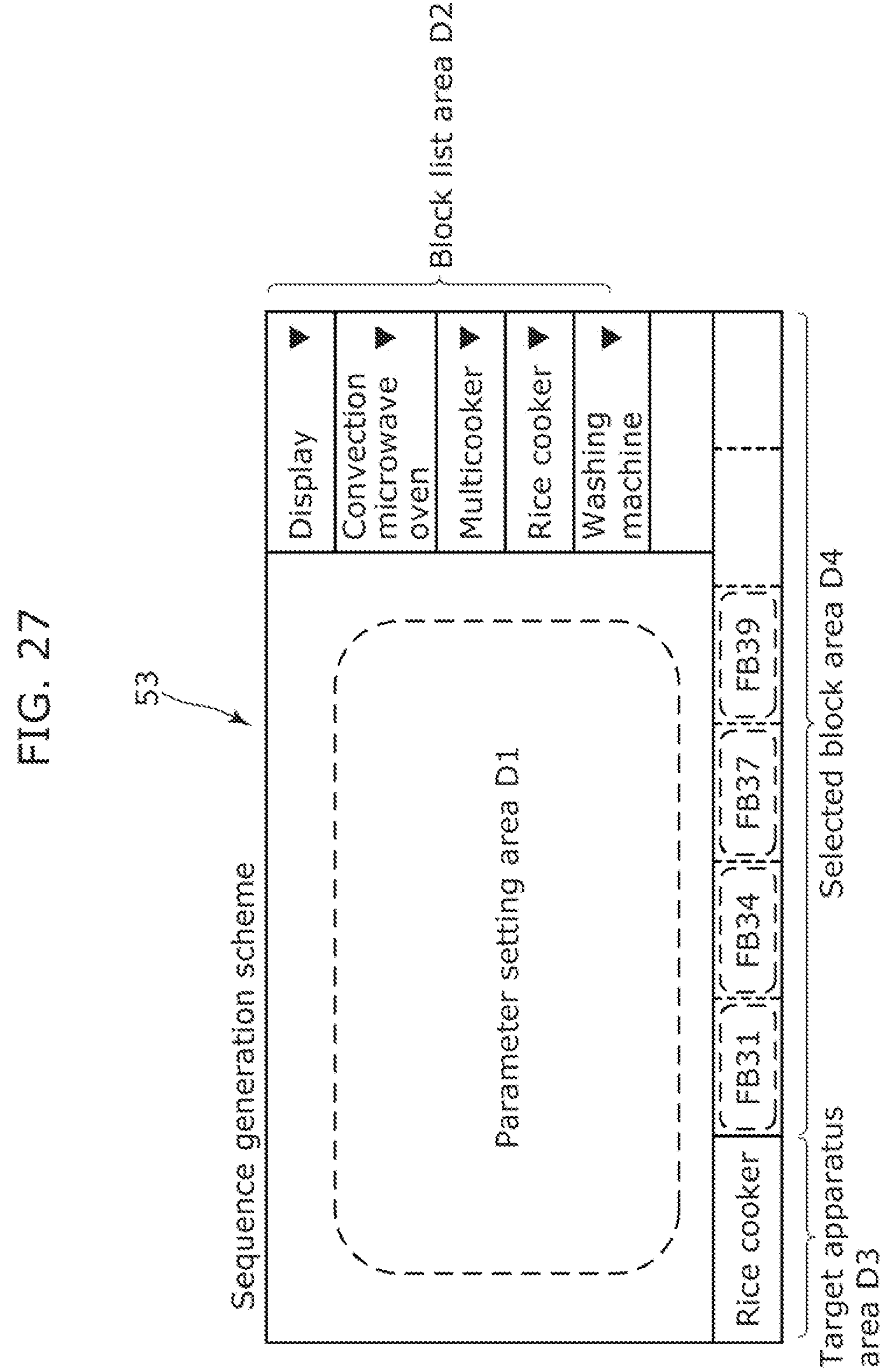
FIG. 27 illustrates one example of a sequence generation screen according to Embodiment 5.

FIG. 27 illustrates one example of a sequence generation screen.

Development tool 50 displays the sequence generation screen described above on display 53. The sequence generation screen includes parameter setting area D1, block list area D2, target apparatus area D3, and selected block area D4.

Parameter setting area D1 displays a reception image for accepting the parameter content to be used for a function block.

Block list area D2 displays a block list for each of a plurality of types of apparatuses 20. These block lists include function blocks that have been downloaded from block database 41 and installed in development tool 50.

Target apparatus area D3 displays the name of the type of apparatus 20 selected from the plurality of types of apparatuses 20.

Function blocks selected from the block lists displayed in block list area D2 are arranged and displayed in selected block area D4. The function blocks are displayed as icons, for example.

For example, the operator determines the name of the type of apparatus 20 to which the application is applicable by performing an input operation on input unit 54 of development tool 50. Development tool 50 displays the determined name of the type of apparatus 20 in target apparatus area D3. For example, "rice cooker" is displayed as the determined name of the type of apparatus 20. The operator then selects a function block for driving apparatus 20 corresponding to the determined type named "rice cooker" from the block list displayed in block list area D2 by performing an input operation. The operator then arranges the selected function block, i.e., the selected block, in selected block area D4 by performing an input operation. The selection and arrangement of this function block may be done by dragging and dropping the function block. The one or more function blocks arranged in selected block area D4 may be executed in the order in which they are arranged. For example, the function blocks are executed in sequence from left to right in FIG. 27. Stated differently, the application includes information on the order in which each of the M selected blocks arranged in selected block area D4 is to be executed and information on the timing at which each of the M selected blocks is to be executed.

When a function block is arranged in selected block area D4, development tool 50 displays a reception image of the parameters to be used for that function block in parameter setting area D1.

FIG. 28 illustrates examples of how a block list is displayed.

The operator selects the name of the type of apparatus 20 to which the application to be generated is applicable from among the names of the types of apparatuses 20 displayed in block list area D2 illustrated in FIG. 27, by performing an input operation on input unit 54. Development tool 50 displays a block list corresponding to the selected type of name of apparatus 20, as shown, for example, in (a) and (b) in FIG. 28. For example, as illustrated in (a) in FIG. 28, when a convection microwave oven is selected, development tool 50 displays a block list for the convection microwave oven. For example, the block list includes function blocks that perform the respective functions of baking, microwave heating, oven, grilling, steaming, preheating, and super-heated steam. As illustrated in (b) in FIG. 28, when a multicooker is selected, development tool 50 displays a block list for the multicooker. For example, the block list includes function blocks for preheating, keeping warm, frying, pressure cooking, cooking, steaming, stewing, mixing, and boiling, respectively.

The operator selects a function block from the block list displayed in this manner by performing an input operation on input unit 54, and arranges the selected function block in selected block area D4 illustrated in FIG. 27. Stated differently, development tool 50 performs the process of step S22 illustrated in FIG. 24, i.e., the process of arranging the function block, in accordance with such an input operation.

Figure 29:
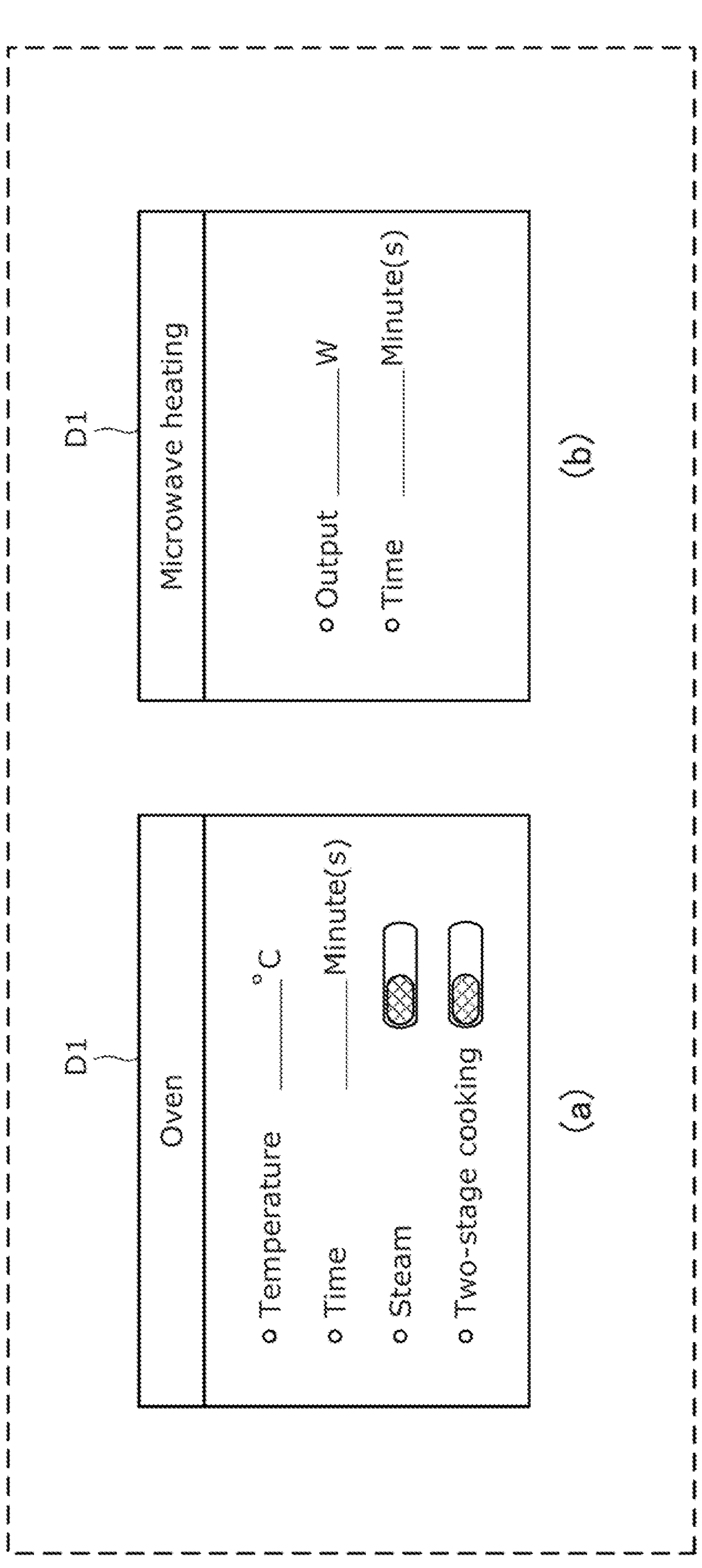
FIG. 29 illustrates examples of how a parameter setting area is displayed according to Embodiment 5.

FIG. 29 illustrates examples of how parameter setting area D1 is displayed.

As illustrated in, for example, (a) and (b) in FIG. 29, development tool 50 displays, in parameter setting area D1, a reception image for accepting the parameter content to be included in a function block for a convection microwave oven, which is apparatus 20. A function block that performs an oven function and a function block that performs a microwave heating function can be applied to the convection microwave oven.

For example, the reception image for parameter setting area D1 illustrated in (a) in FIG. 29 is an image for accepting content of a plurality of parameters included in the "oven" function block. For example, the "oven" function block includes a set temperature for the oven, a duration, steam on/off, and two-stage cooking on/off as parameters. The operator sees the reception image and inputs numerical values for the set temperature and the duration as parameter content for the set temperature and the duration, by performing input operations on input unit 54. In addition, the operator inputs either on or off for the steam and either on or off for the two-stage cooking as parameter content for the steam and the two-stage cooking parameter. Development tool 50 sets each parameter to be used for the "oven" function block by accepting the content of each input parameter.

Similarly, the reception image for parameter setting area D1 illustrated in (b) in FIG. 29 is an image for accepting content of a plurality of parameters included in the "microwave heating" function block. For example, the "microwave heating" function block includes a set power output and a duration as parameters. The operator sees the reception image and inputs numerical values for the set output and the duration as parameter content for the set output and the duration, by performing an input operation on input unit 54. Development tool 50 sets each parameter to be used for the "microwave heating" function block by accepting the content of each input parameter.

In this way, development tool 50 performs the parameter setting process in step S23 illustrated in FIG. 24 in accordance with an input operation performed by the operator.

When each parameter in the function block has been set in this manner, development tool 50 determines whether each parameter is outside the non-permissible range by consulting a rule for apparatus 20 corresponding to that function block, as in step S24 of FIG. 24.

FIG. 30A illustrates one example of the automatic function block correction process.

For example, as illustrated in (a) in FIG. 30A, the operator inputs numerical values for the set temperature and the duration in an "oven" function block by performing input operations on input unit 54. In addition, the operator inputs either on or off for the steam and either on or off for the two-stage cooking by performing input operations on input unit 54. This sets each parameter used for the "oven" function block.

Once each parameter is set in this manner, development tool 50 performs an automatic correction process for the function block. First, development tool 50 refers to a rule for a convection microwave oven that corresponds to that function block. For example, development tool 50 identifies rule group 42*a* for convection microwave ovens in rule database 42 illustrated in (b) in FIG. 21, and consults any one rule in rule group 42*a*. That rule may be generic rule R100, dedicated rule R11, etc.

If development tool 50 determines that the input parameter, i.e., the numerical value of the set temperature, for example, 350° C., is within the parameter range indicated in the rule, i.e., that the numerical value is within the non-permissible range, development tool 50 will correct the numerical value of the parameter. For example, if the parameter range is above 300° C., development tool 50 will correct the set temperature numerical value from 350° C. to 300° C., as illustrated in (b) in FIG. 30A. Here, development tool 50 may correct the duration parameter so as to lengthen the duration in order to lower the set temperature. These parameter corrections change the "oven" function block. Stated differently, these parameter corrections modify the application including that function block. This ensures the safety of the convection microwave oven.

Thus, in the present embodiment, development tool 50 consults a rule to determine whether each of the plurality of parameters in the M selected blocks is included in the parameter range, and if a parameter is determined to be included in the parameter range, the selected block including the parameter is changed. Stated differently, development tool 50 modifies the application by consulting a rule and changing parameters included in the parameter range to parameters included in a range in which at least one of actuator 22 or heater 23 is permitted to be driven.

Figure 30B:
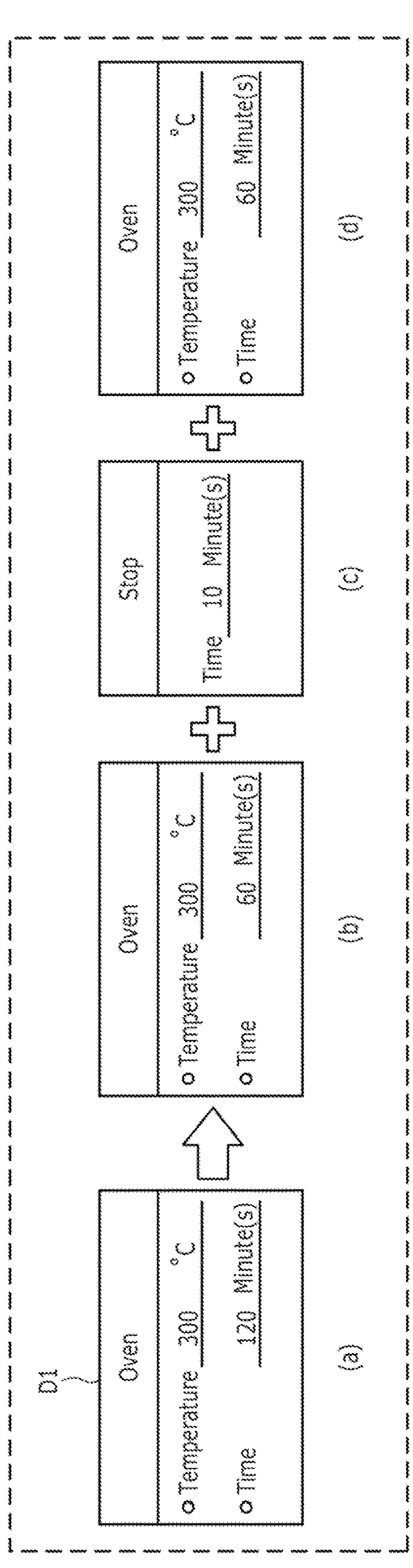
FIG. 30B illustrates another example of the automatic function block correction process according to Embodiment 5.

FIG. 30B illustrates another example of the automatic function block correction process.

In the automatic function block correction process, development tool 50 may add a new function block as well as correct parameters. For example, as illustrated in (a) in FIG. 30B, the operator inputs numerical values for the set temperature and the duration in an "oven" function block by performing input operations on input unit 54. This sets each parameter used for the "oven" function block.

If development tool 50 determines that the input numerical value of the duration parameter is within the parameter range indicated in the rule, it corrects the numerical value of the parameter. In the example in (a) in FIG. 30B, the numerical value of the duration parameter is 120 minutes. Stated differently, if development tool 50 determines that 120 minutes is included in the non-permissible range, development tool 50 will correct the value of 120 minutes. More specifically, if the parameter range is above 60 minutes, development tool 50 will correct the numerical value of the duration parameter from 120 minutes to 60 minutes, as illustrated in (b) in FIG. 30B. Here, to reduce the duration, development tool 50 adds, for example, the "stop" function block illustrated in (c) in FIG. 30B and the "oven" function block illustrated in (d) in FIG. 30B. The added "stop" function block is a block that stops operation of the convection microwave oven for 10 minutes. The added "oven" function block is to compensate for the oven duration time that will no longer be implemented due to the reduction in duration time from 120 minutes to 60 minutes as described above. Stated differently, in this example, the added "oven" function block includes a set temperature of 300° C. and a duration of 60 minutes as parameters. This ensures the safety of the convection microwave oven.

Thus, in the present embodiment, development tool 50 may modify the application by consulting a rule and changing a parameter included in the parameter range to a parameter included in a range in which at least one of actuators 22 and heater 23 is permitted to be driven and adding a new block to the M selected blocks.

Just like in Embodiments 1 through 4 above, development tool 50 may remove an "oven" function block that includes the parameter when the parameter is set, as in (a) in FIG. 30A and (a) in FIG. 30B. Stated differently, development tool 50 modifies the application by removing a selected block that includes a parameter included in the parameter range. This also ensures the safety of the convection microwave oven.

Figure 31:
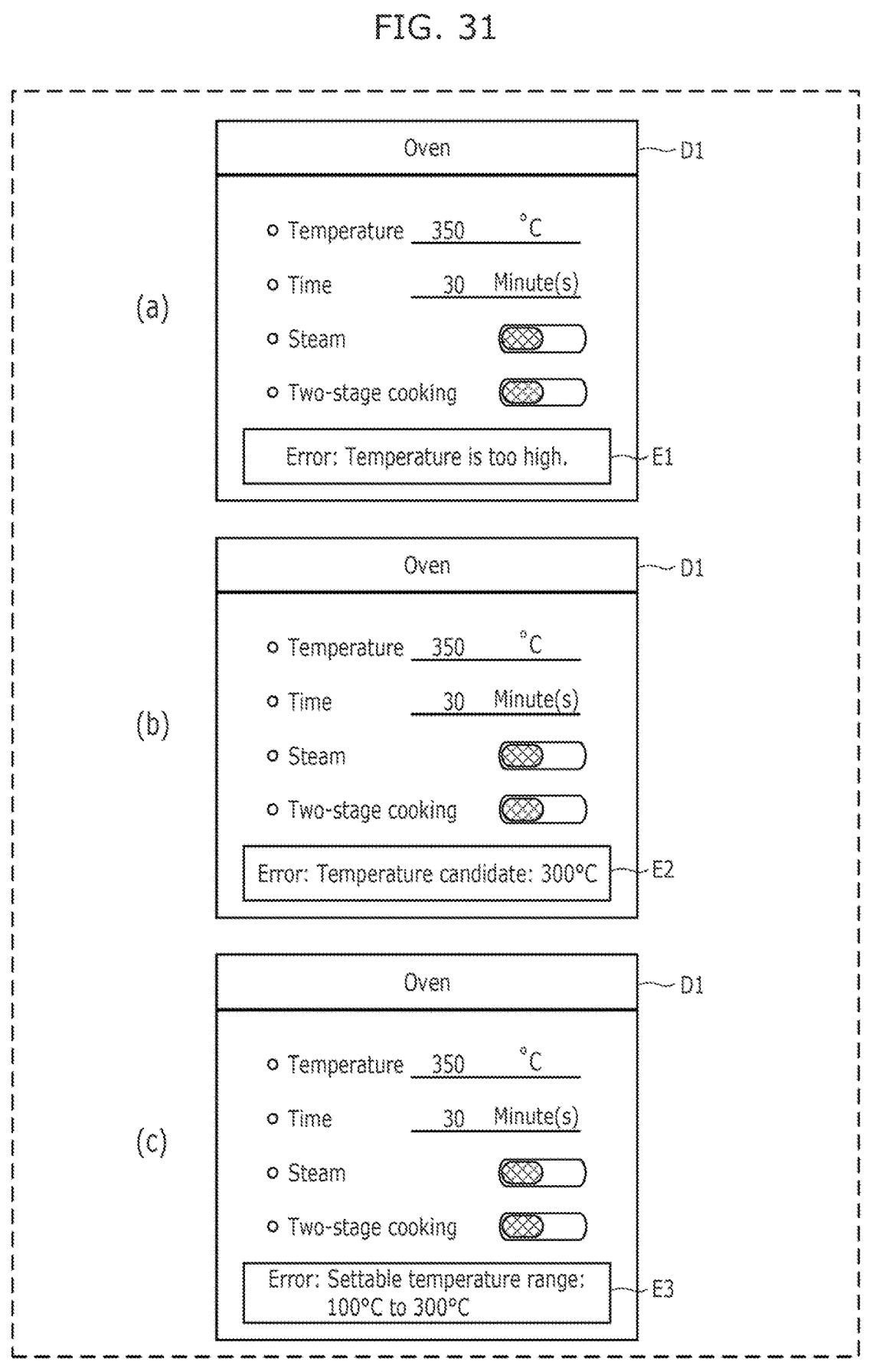

FIG. 31 illustrates one example of an error presentation process.

For example, as illustrated in (a) in FIG. 31, the operator inputs numerical values for the set temperature and the duration in an "oven" function block by performing input operations on input unit 54. This sets each parameter used for the "oven" function block.

Here, development tool 50 first consults a rule for a convection microwave oven that corresponds to that function block. If development tool 50 determines that the input numerical value of the set temperature parameter is within the parameter range indicated in the rule, it performs an error presentation process. In the example in FIG. 31, the numerical value of the set temperature parameter is 350° C. Stated differently, if development tool 50 determines that 350° C. is included in the non-permissible range, it performs the error presentation process. More specifically, development tool 50 displays error message E1 in parameter setting area D1, for example, as illustrated in (a) in FIG. 31. Here, error message E1 states that the temperature is too high. Such an error presentation process is performed, for example, in step S51 in FIG. 26.

If development tool 50 determines that the input parameter, i.e., the numerical value of the set temperature is included in the non-permissible range, development tool 50 may, for example, display error message E2 in parameter setting area D1, as illustrated in (b) in FIG. 31. Here, error message E2 includes a candidate for the set temperature, for example, 300° C. Such an error presentation process may be performed in, for example, step S51 in FIG. 26 when the error has been repeatedly presented K or more times, as described above.

If development tool 50 determines that the input parameter, i.e., the numerical value of the set temperature is included in the non-permissible range, development tool 50 may, for example, display error message E3 in parameter setting area D1, as illustrated in (c) in FIG. 31. Here, error message E3 includes a settable range for the set temperature, for example, 100° C. to 300° C. This settable range is a permissible range for a parameter such as the set temperature. Such an error presentation process may be performed in, for example, step S51 in FIG. 26 when the error has been repeatedly presented K or more times, as described above.

The presentation of such an error allows the operator, who is a developer of the application, to easily re-set a parameter in the non-permissible range to a parameter in the permissible range. This ensures the safety of the convection microwave oven.

In the above examples, error messages E1 through E3 are displayed, but how the errors are presented are not limited to these examples; the error message may be presented in any manner. For example, the error may be presented audibly.

Figure 32:
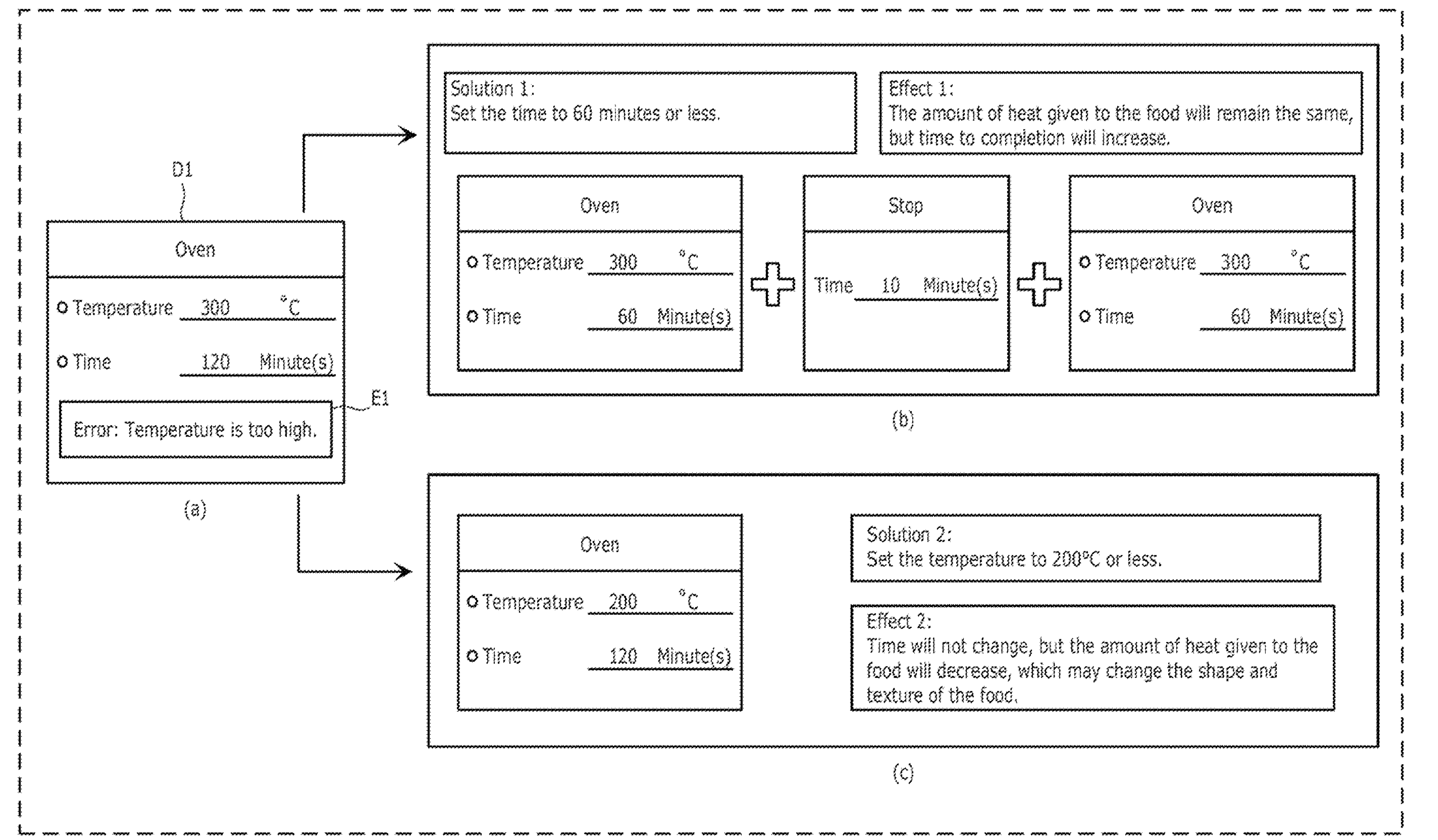
FIG. 32 illustrates one example of the presentation of an error and the presentation of a plurality of solutions.

FIG. 32 illustrates one example of the presentation of an error and the presentation of a plurality of solutions.

In the example in (a) in FIG. 32, the set temperature is 300° C. and the numerical value of the duration parameter is 120 minutes. Development tool 50 consults a rule regarding the upper limit for the duration at a set temperature of 300° C., and if development tool 50 determines that 120 minutes is included in the non-permissible range, development tool 50 presents a solution for correcting the value of 120 minutes. Stated differently, development tool 50 presents error E1 illustrated in (a) in FIG. 32, and the solutions and effects illustrated in (b) and (c) in FIG. 32. More specifically, for example, as illustrated in (b) in FIG. 32, development tool 50 presents solution 1, which changes the numerical value of the duration parameter from 120 minutes to 60 minutes and adds a block to stop operation of the convection microwave oven for 10 minutes and a block to compensate for the oven duration time that will no longer be implemented. Development tool 50 consults a rule indicating the upper limit for the set temperature at 120 minutes duration, and if development tool 50 determines that 300° C. is included in the non-permissible range, development tool 50 presents a solution to correct the value of 300° C. More specifically, for example, as illustrated in (c) in FIG. 32, development tool 50 presents solution 2, which reduces the numerical value of the set temperature parameter to 200° C.

Thus, by presenting a plurality of solutions simultaneously with the presentation of the error, it is possible to reduce the amount of time it takes the operator to change a parameter.

When presenting a plurality of solutions, development tool 50 may present the effect of the solution on the application. Alternatively, when presenting a plurality of solutions, development tool 50 may present the effect of the solution on the food heated by the oven. For example, as illustrated in (b) in FIG. 32, if solution 1 is presented, development tool 50 presents effect 1. As noted above, solution 1 is a solution that changes the numerical value of the duration parameter from 120 minutes to 60 minutes and adds a block to stop operation of the convection microwave oven for 10 minutes and a block to compensate for the oven duration time that will no longer be implemented. If such a solution 1 is presented, development tool 50 notifies the operator that the amount of heat given to the food will remain the same but the total oven time (i.e., the baking time) will increase, as effect 1 described above. If solution 2 of lowering the numerical value of the set temperature parameter to 200° C. is presented as illustrated in (c) in FIG. 32, development tool 50 notifies the operator that the amount of heat given to the food will decrease, which may change the shape and texture of the food, as effect 2 described above. Development tool 50 may present the function block illustrated in (a) in FIG. 32, i.e., may present a solution of removing the selected block including a parameter included in the non-permissible range and an effect indicating an event not implemented by the oven on the food as a result of the removal of the selected block.

Stated differently, in the present embodiment, development tool 50 presents a plurality of solutions for handling the error, and modifies the application by changing at least one of the M selected blocks described above in accordance with an input operation performed by the operator presented with the error and the plurality of solutions. More specifically, the plurality of solutions include at least two of the following: a solution of changing a parameter included in the parameter range, a solution of adding a new block to the M selected blocks, and a solution of removing a selected block including a parameter included in the parameter range. Development tool 50 further presents, for each of the plurality of solutions, the effect of the solution, when performed, on the object acted upon by the driving of actuator 22 or heater 23, or the effect of the solution, when performed, on the application. Note that the object acted upon by the driving of actuator 22 or heater 23 is, in the example of FIG. 32, the food to be heated by heater 23. Information on the error, solutions, and effects may be shown in association with the parameter range defined in the rule.

In this way, by presenting a plurality of solutions and the effects thereof on the application at the same time, the operator can intuitively select a solution in accordance with their intention of creating the application.

Note a solution of only changing a parameter or a solution of removing the selected block is likely to have no small effect on application performance, whereas a solution of a change that includes adding a block will have a relatively small effect on application performance. In this way, the effect on the application, such as the effect on application run time, is expected to vary depending on the type of solution. However, when the operator wants to minimize the effect on application performance or wants to change the application run time, it is anticipated that the operator will have various priorities that change depending on the situation.

Stated differently, in order to present solutions that are appropriate from the perspective of the operator, even in diverse situations, when presenting a plurality of solutions, it is beneficial to present at least two or more of the following: a solution of changing a parameter, a solution of removing a selected block, and a solution including adding a block. For example, as illustrated in the example in FIG. 32, it is beneficial to present both of a solution of only changing a parameter and a solution of a change that includes adding a block. With this, when the operator selects a solution, the operator can select an option that satisfies their intention of creating the application.

5.4 Advantageous Effects, Etc.

As described above, the present embodiment can provide an environment in which a wide variety of safe applications can be developed, by using an application including blocks, and a rule database. Thus, for applications freely developed in that environment, actuator 22, which physically moves, or heater 23, which outputs thermal energy, can be safely driven. As a result, for example, the development of a wide variety of applications with a high degree of freedom and the development of a rule database to ensure safety can be created in parallel, enabling the early development of a wide variety of safe applications.

If the present embodiment and any one of Embodiments 1 through 4 are combined, even after the application is provided, the rule database can be modified to make the application more secure. In addition, even if a manufacturer needs to improve a situation that was not anticipated beforehand, the rule database is defined independently from the applications, so all applications can be supported by updating the rule database, without having to change a wide variety of applications themselves.

More specifically, the information processing method according to the present embodiment is an information processing method executed by a computer system such as development tool 50. The information processing method includes: (a) selecting M blocks as M selected blocks from among N blocks for driving at least one of actuator 22 or heater 23 included in apparatus 20, which is a device to be controlled, in accordance with an input operation performed by an operator, where N is an integer greater than or equal to two, and M is an integer greater than or equal to one and less than or equal to N; (b) generating an application including at least the M selected blocks by setting, in accordance with an input operation performed by the operator, a parameter for driving actuator 22 or heater 23 in each of the M selected blocks; (c) consulting a rule defining a parameter range within which the at least one of actuator 22 or heater 23 is not permitted to be driven, and modifying the application by changing at least one of the M selected blocks, the at least one of the M selected blocks including a parameter included in the parameter range; and (d) outputting the modified application.

This allows actuator 22 and/or heater 23 to be driven based on an application defined by M blocks. It is therefore is possible to develop applications using blocks that abstract the control of apparatus 20, allowing a wide variety of applications to be developed not only by the manufacturer but also by third parties, and these applications can be easily executed on apparatus 20. Furthermore, during development, a block including a parameter included in a non-permissible parameter range can be automatically changed. Thus, it is possible to inhibit actuator 22 and/or heater 23 from being driven at a non-permissible parameter. Stated differently, even if the operator, i.e., a developer of the application mistakenly sets a non-permissible parameter for actuator 22 and/or heater 23, it is possible to inhibit generation of an application that cannot safely control apparatus 20. Thus, the application developer can ensure and improve the safety of apparatus 20 controlled by the application, even if the application is created or generated with an emphasis on suitability for the user of actuator 22 and/or heater 23.

In (c), the rule may be consulted, and the application may be modified by changing a parameter included in the parameter range to a parameter included in a range within which the at least one of actuator 22 or heater 23 is permitted to be driven.

This makes it possible to automatically change a parameter included in the non-permissible parameter range to a parameter included in the permissible range. Accordingly, for example, the operator, i.e., a developer of the application, is relatively free to generate an application in which actuator 22 and heater 23 are driven safely without being aware of the permissible range of the parameter.

In (c), the rule may be consulted, and the application may be modified by changing a parameter included in the parameter range to a parameter included in a range within which the at least one of actuator 22 or heater 23 is permitted to be driven, and adding a new block to the M selected blocks.

With this, since a parameter included in the non-permissible parameter range can be changed to a parameter included in the permissible range, actuator 22 and/or heater 23 can be prevented from being driven with non-permissible parameters. Furthermore, since a new block can be added, it is possible to supplement a function degraded by a parameter change with a new block.

In (c), the application may be modified by removing the at least one of the M selected blocks including a parameter included in the parameter range.

With this, since a block including a parameter included in the non-permissible parameter range can be removed, actuator 22 and/or heater 23 can be prevented from being driven with non-permissible parameters. For example, if actuator 22 and heater 23 are unable to execute the parameter set by the application developer in the first place, the removal allows the device to be controlled without confusion. On the other hand, the operator may be notified of the removal.

Step (c) may include: consulting the rule and determining, for each of a plurality of parameters included in the M selected blocks, whether the parameter is included in the parameter range; and when the parameter is determined to be included in the parameter range, changing a selected block including the parameter.

With this, a block including a parameter included in the non-permissible parameter range can be more reliably changed.

The application may include information on an order in which each of the M selected blocks is executed and information on timing of execution of each of the M selected blocks. The information on the timing for each of the selected blocks indicates, for example, the amount of time between the start of the selected block and the start or end of another selected block (for example, the selected block that is first in order).

This enables the application to include order and timing information, and to make decisions and execute them sequentially while checking the parameter ranges of each selected block.

The parameter range may be a range of parameters that allow the at least one of actuator 22 or heater 23 to reach a maximum withstand temperature.

This makes it possible to inhibit actuator 22 and/or heater 23 from reaching its maximum withstand temperature when the application is executed, which makes it possible to improve the safety of apparatus 20 controlled by the application.

Apparatus 20, which is the device to be controlled, may include enclosure 21 including an interior space, and the parameter range may be a range of parameters that allow the interior space to reach a maximum withstand temperature.

This makes it possible to inhibit the interior space of enclosure 21 from reaching its maximum withstand temperature when the application is executed, which makes it possible to improve the safety of apparatus 20 controlled by the application.

Step (c) may include: determining whether the application generated is an application dedicated to the device to be controlled or a general-purpose application applicable to the device to be controlled and a device other than the device to be controlled; and consulting, as the rule, a rule candidate that corresponds to a result of the determining of the application, from among a plurality of rule candidates that each define a parameter range within which the at least one of actuator 22 or heater 23 is not permitted to be driven.

This allows for more variation in applications, such as dedicated and general-purpose applications. Furthermore, since rules appropriate for those variations are consulted, in each of those variations, the application can be modified appropriately.

The information processing method according to the present embodiment may be an information processing method executed by a computer system such as development tool 50, and may present a an error. The information processing method includes: (a) selecting M blocks as M selected blocks from among N blocks for driving at least one of actuator 22 or heater 23 included in apparatus 20, which is a device to be controlled, in accordance with an input operation performed by an operator, where N is an integer greater than or equal to two, and M is an integer greater than or equal to one and less than or equal to N; (b) generating an application including at least the M selected blocks by setting, in accordance with an input operation performed by the operator, a parameter for driving actuator 22 or heater 23 in each of the M selected blocks; (c) consulting a rule defining a parameter range within which the at least one of actuator 22 or heater 23 is not permitted to be driven, and when at least one of the M selected blocks includes a parameter included in the parameter range, presenting an error to the operator; (d) modifying the application by changing the at least one of the M selected blocks in accordance with an input operation performed by the operator presented with the error; and (e) outputting the modified application.

With this, even if the operator, i.e., a developer of the application mistakenly sets a non-permissible parameter for actuator 22 and/or heater 23, since an error is presented, it is possible to inhibit generation of an application that cannot safely control apparatus 20. Stated differently, the same advantageous effect can be achieved as when the application is automatically changed as described above.

The information processing method according to the present embodiment may be an information processing method executed by a computer system such as development tool 50, and may present a plurality of solutions at the same time as presenting the error.

This reduces the time and effort required for the operator who has seen the presentation of the error to change the parameter.

The information processing method according to the present embodiment may be an information processing method executed by a computer system such as development tool 50, and may present a solution for handling the error and simultaneously present an effect that implementing the solution has on the application.

This allows the operator to intuitively select a solution in accordance with their intention of creating the application.

The information processing method according to the present embodiment may be an information processing method executed by a computer system such as development tool 50, and when presenting a solution for handling the error, may present at least two of the following solutions: a solution of changing a parameter, a solution of removing a selected block, and a solution including adding a block.

With this, when the operator selects a solution, the operator can select an option that satisfies their intention of creating the application.

In the information processing method, after (d), execution of (c) and (d) may be repeated. The information processing method may further include (f) presenting a parameter not included in the parameter range to the operator when the error has been presented K or more times, where K is an integer greater than or equal to two.

With this, when the error is presented repeatedly, a parameter not included in the parameter range can be presented to the operator as a candidate for an appropriate parameter. As a result, the operator can easily generate a safe application by easily changing the parameter included in the parameter range to a parameter not included in the parameter range.

In the information processing method, after (d), execution of (c) and (d) may be repeated. The information processing method may further include (f) presenting a range of parameters not included in the parameter range to the operator when the error has been presented K or more times, where K is an integer greater than or equal to two.

With this, when the error is presented repeatedly, a range of parameters not included in the parameter range is presented to the operator. As a result, the operator can easily generate a safe application by easily changing the parameter included in the parameter range to a parameter not included in the parameter range.

Embodiment 6

In Embodiments 1 through 4, a block (i.e., a parameter, etc.) in the application is changed. In the present embodiment, the application is modified by changing the order, combination, etc., of the blocks in the application. Stated differently, the mode of change in the present embodiment differs from the mode of change in Embodiments 1 through 4. Hereinafter, the present embodiment will be described in detail with a focus on the points of difference from Embodiments 1 through 4. Excluding the mode of change, the present embodiment may be the same as Embodiments 1 through 4. Elements in the present embodiment that are the same as those in Embodiments 1 through 4 are given the same reference signs as in Embodiments 1 through 4, and repeated detailed description thereof will be omitted.

The hardware configuration, functional configuration, and basic processing of system 1 according to the present embodiment are the same as the configuration and processing illustrated in FIG. 1 through FIG. 10 in Embodiment 1.

Figure 33:
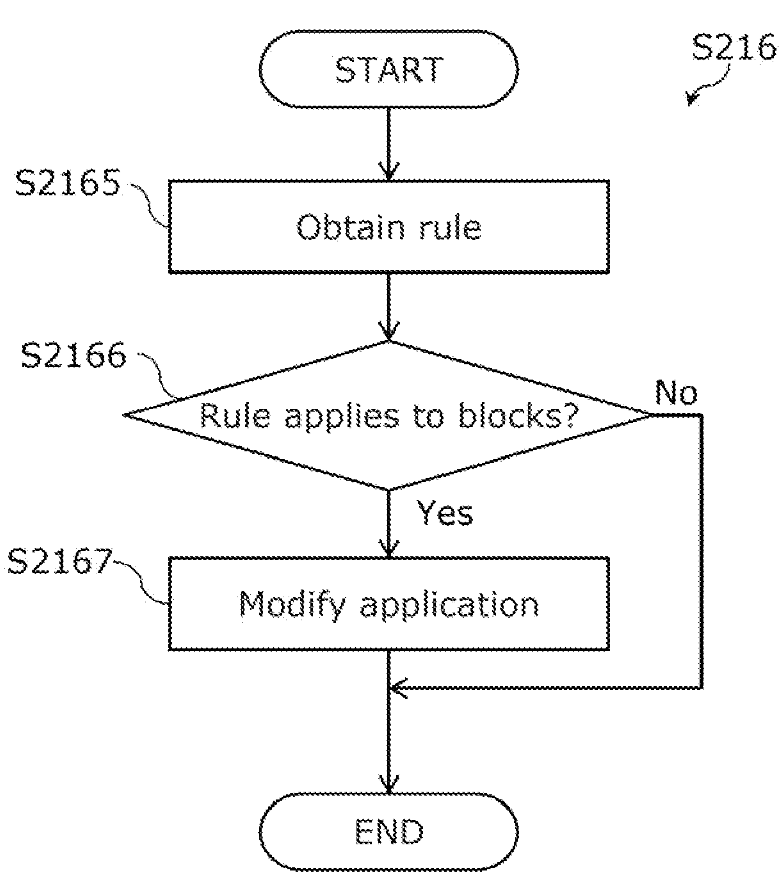
FIG. 33 illustrates a flowchart of the pre-execution check process according to Embodiment 6.

This pre-execution check process according to the present embodiment will be described in greater detail with reference to FIG. 33. FIG. 33 illustrates a flowchart of the pre-execution check process according to Embodiment 6. Note that the pre-execution check process is the processing of step S216 illustrated in FIG. 8.

Step S2165

Device 300 obtains a rule corresponding to the application. Here, the rule states that when one block among two or more given blocks is executed, at least one of the remaining blocks among the two or more given blocks is prohibited from not being executed. For example, device 300 consults the rule database to obtain the combination of the two or more given blocks. For example, the rule database may be included in device 300, and may be included in sequence manager 100 or device manager 200.

For example, a rule that prohibits the first block from not being executed before the second block is executed can be used. More specifically, a rule that prohibits the first block from not being executed in a period from the start of the application to before the second block is executed can be used. For example, a block for establishing an executable environment for the second block can be used as such a first block. More specifically, a drain block can be used as the first block to achieve a water-prohibited environment before the second block (for example, a spin block) is executed.

For example, a rule that prohibits a third block from not being executed after the second block is executed can also be used. More specifically, a rule that prohibits the third block from not being executed in a period from after the second block is executed to the end of the application can be used. For example, a block for restoring the environment changed by the execution of the second block to the environment before the execution of the second block can be used as such a third block. More specifically, an airflow block can be used as the third block to return the temperature increased by the execution of the second block (for example, a dry block) to the temperature before the execution of the second block.

FIG. 34 illustrates one example of a rule database according to Embodiment 6. Rules 1301 and 1302 are registered in rule database 1300 in FIG. 34. Each of rules 1301 and 1302 includes information on the combination of the two or more given blocks. For example, rule 1301 indicates that the drain block is prohibited from not being executed before the spin block is executed. For example, rule 1302 indicates that the airflow block is prohibited from not being executed after the dry block.

For example, a combination of blocks for preventing the interior space of enclosure 21, preventing actuator 22, or preventing heater 23 from reaching its maximum withstand temperature is predetermined as such a combination of the two or more given blocks. A maximum withstand temperature refers to the rated temperature and indicates the maximum tolerable temperature. Therefore, if actuator 22 or heater 23 is driven with the combination of the two or more given blocks, the temperature of the interior space of enclosure 21, the temperature of actuator 22, or the temperature of heater 23 will not reach an unacceptable temperature. Stated differently, the rule ensures that two or more given blocks are executed in combination to prevent the interior space of enclosure 21, prevent actuator 22, or prevent heater 23 from reaching its maximum withstand temperature.

In FIG. 34, each of rules 1301 and 1302 indicates a combination of two blocks, but the rules are not limited to this example. For example, a rule may indicate a range of parameters for at least one of the two blocks in addition to the combination of the two blocks. Furthermore, the rules are defined such that a wide range of blocks can be used for the development of a wide variety of applications.

For example, the rules by which actuator 22 or heater 23 can be safely driven may vary depending on the environment of device 300, such as the interior space of enclosure 21, and the rules may not depend solely on the performance of actuator 22 or heater 23 itself. Therefore, in order to ensure safe driving in any environment, the rules are heavily weighted in favor of safety, which reduces the freedom for development of a wide variety of applications. The rules may therefore be independent of the application and may be associated with information on, for example, device 300. The use of such rules allows for both safety and the development of a wide variety of applications.

The rules relate to the range within which actuator 22 or heater 23 can be safely driven. The range within which actuator 22 or heater 23 can be safely driven may be a range that takes into account the start condition or the end condition of the block. Consider an example including a first block and a second block that is executed after the first block. A rule could be set for a case in which the first block is to be executed until the start condition of the second block is reached, whereby actuator 22 or heater 23 is loaded with a load that affects safety. Stated differently, the rules depend on the performance of actuator 22 or heater 23, the start condition or the end condition of the block, Etc.

Each of rules 1301 and 1302 further includes the type and the manufacturer name. This allows device 300 to obtain, from rule database 1300, rules corresponding to actuator 22 or heater 23 that is driven by the block. For example, device 300 consults rule database 1300 in FIG. 34, and obtains rules 1301 and 1302 for WM-0001.

Step S2166

Device 300 determines whether a rule applies to the plurality of blocks in the application.

For example, if the rule prohibits the first block from not being executed before the second block is executed, when the application includes the second block and does not include the first block before the second block, device 300 determines that the rule applies to the plurality of blocks in the application. Specifically, when the application includes the second block and does not include the first block, device 300 determines that the rule applies to the plurality of blocks in the application. When the application includes the second block and includes the first block only after the second block, device 300 determines that the rule applies to the plurality of blocks in the application. However, when the application includes the second block and includes the first block before the second block, device 300 determines that the rule does not apply to the plurality of blocks in the application. When the application does not include either the first or the second block, device 300 determines that the rule does not apply to the plurality of blocks in the application. When the application includes the first block and does not include the second block, device 300 determines that the rule does not apply to the plurality of blocks in the application.

For example, if the rule prohibits the third block from not being executed after the second block is executed, when the application includes the second block and does not include the third block after the second block, device 300 determines that the rule applies to the plurality of blocks in the application. Specifically, when the application includes the second block and does not include the third block, device 300 determines that the rule applies to the plurality of blocks in the application. When the application includes the second block and includes the third block only before the second block, device 300 determines that the rule applies to the plurality of blocks in the application. However, when the application includes the second block and includes the third block after the second block, device 300 determines that the rule does not apply to the plurality of blocks in the application. When the application does not include either the second or the third block, device 300 determines that the rule does not apply to the plurality of blocks in the application. When the application includes the third block and does not include the second block, device 300 determines that the rule does not apply to the plurality of blocks in the application.

If device 300 determines that the rule does not apply to the plurality of blocks (No in S2166), device 300 skips the subsequent step S2167 and ends the pre-execution check process. However, if device 300 determines that the rule does apply to the plurality of blocks (Yes in S2166), device 300 proceeds to the next step S2167.

Step S2167

Device 300 modifies the application and ends the pre-execution check process. Modifying the application means (i) adding a new block to the plurality of blocks, (ii) changing an order of the plurality of blocks, (iii) removing any of the plurality of blocks, or (iv) any combination thereof. How the application is modified may be defined in a rule.

Specific examples of such modification of the application will be described with reference to FIG. 35 and FIG. 36.

Figure 35:
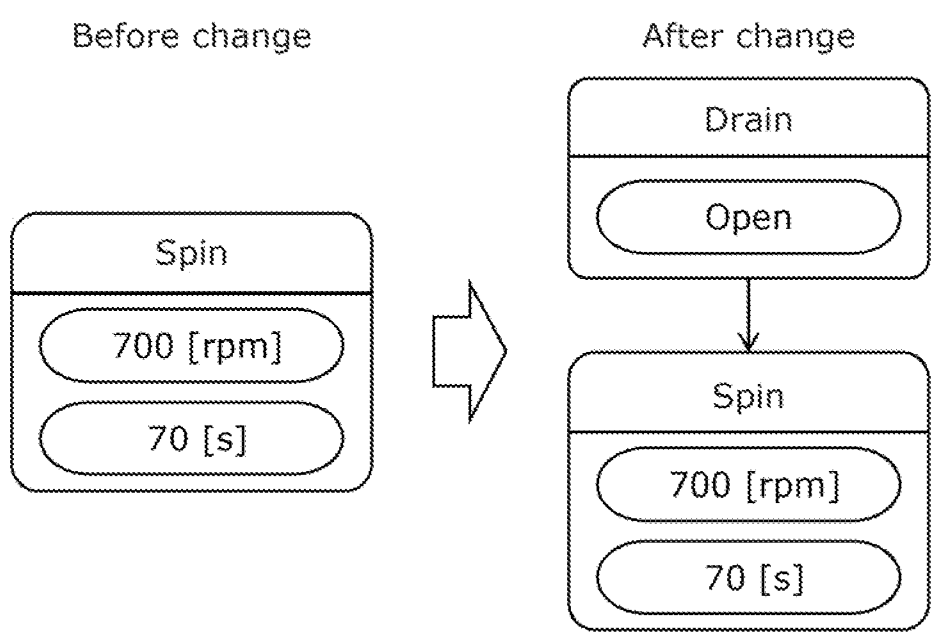
FIG. 35 illustrates one example of modifying the application according to Embodiment 6.

FIG. 35 illustrates one example of modifying the application according to Embodiment 6. In FIG. 35, a drain block (the first block) is added before the spin block (the second block). This allows water to be drained from the washing machine before the spin block is executed, ensuring safe driving of actuator 22 during the spin operation.

Figure 36:
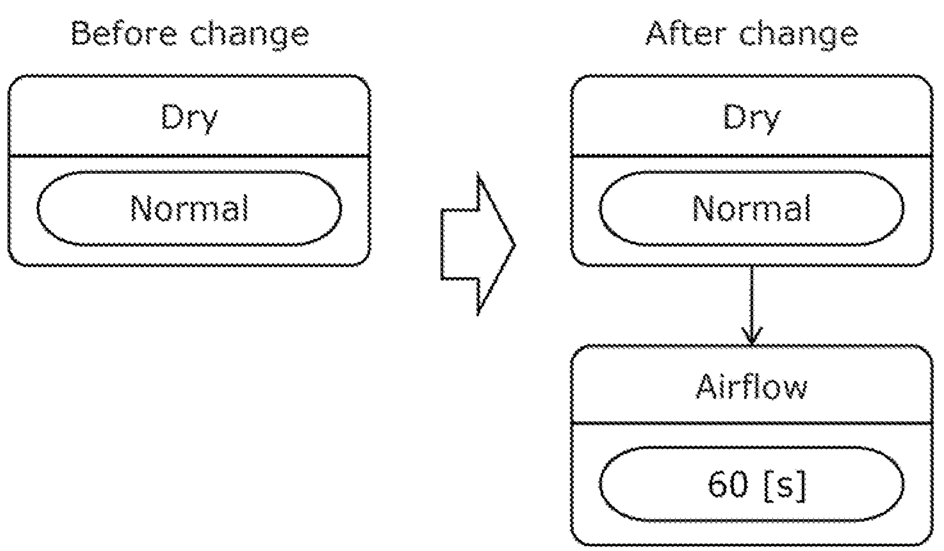
FIG. 36 illustrates one example of modifying the application according to Embodiment 6.

FIG. 36 illustrates one example of modifying the application according to Embodiment 6. In FIG. 36, an airflow block (the third block) is added after the dry block (the second block). This allows the temperature of the washing machine to be lowered by airflow after the temperature of the washing machine has been increased by drying, thereby inhibiting users from getting burned by the washing machine and improving the safety of the washing machine.

Although the modification of an application for a washing machine is described here, an application for other apparatuses can be modified in the same manner as well.

For example, if an application for a rice cooker includes a steam block (the second block) that utilizes the steam function and does not include a steam warming block (the first block) before the steam block, then 10 minutes before the steam block is executed, a steam warming block may be added before the corresponding block. This allows the steam heater to be warmed up before the execution of the steam block, which makes it possible to smoothly emit steam when the steam block is executed.

For example, if an application for a microwave oven includes a steam block (the second block) and does not include a steam warming block (the first block) before the steam block, then 10 minutes before the steam block is executed, a steam warming block may be added before the corresponding block. This allows the steam heater to be warmed up before the execution of the steam block, which makes it possible to smoothly emit steam when the steam block is executed. If the application for a microwave oven includes an oven block (the second block) and does not include an airflow block (the third block) after the oven block, an airflow block may be added after the oven block. This allows the inside of the oven, which has become very hot due to the execution of the oven block, to be cooled by the execution of the airflow block, thereby speeding up the execution of the next block.

After the application is changed, system 1 according to the present embodiment performs step S217 and subsequent processes illustrated in FIG. 8, just as in Embodiment 1.

6. Advantageous Effects, Etc.

As described above, the application including one or more blocks and the rule database provide an environment in which a wide variety of applications can be developed, and for applications freely developed in that environment, actuator 22 that physically moves or heater 23 that outputs thermal energy can be safely driven. Stated differently, the application including one or more blocks and the rule database can provide an environment in which applications can be freely developed, while at the same time providing functions to ensure safety independent of the application. As a result, for example, the development of a wide variety of applications with a high degree of freedom and the development of a rule database to ensure safety can be created in parallel, enabling the early development of a wide variety of applications.

Even after the application is provided, the rule database can be modified to make the application more secure. In addition, even if a manufacturer needs to improve a situation that was not anticipated beforehand, the rule database is defined independently from the applications, so all applications can be supported by updating the rule database, without having to change a wide variety of applications themselves.

One conceivable measure is to store a rule database for error handling by detecting the state of the application when it is executed, without modifying the application itself. However, this measure invariably means dealing with the error condition after it has occurred, allowing a situation where the home appliance is overloaded or a situation where safety cannot be guaranteed. It is therefore possible to include a rule database independent of the applications, and to guarantee safety by modifying the application content by consulting the rule data.

Apparatus 20 according to the present embodiment includes at least one of actuator 22 or heater 23, and controller 24 that controls the at least one of actuator 22 or heater 23. Controller 24: obtains an application defined by a plurality of blocks that drive at least one of actuator 22 or heater 23; consults a rule that when one block included in two or more given blocks is executed, prohibits at least one of remaining blocks included in the two or more given blocks from not being executed, and modifies the application when the rule applies to the plurality of blocks included in the application; and drives at least one of actuator 22 or heater 23 based on the modified application.

This allows actuator 22 and/or heater 23 to be driven based on an application defined by a plurality of blocks. It is therefore is possible to develop applications using blocks that abstract the control of apparatus 20, allowing a wide variety of applications to be developed not only by the manufacturer but also by third parties, and these applications can be easily executed on apparatus 20. Furthermore, when a rule that specifies when one block included in two or more given blocks is executed, at least one of remaining blocks included in the two or more given blocks is prohibited from not being executed applies to the application, the application can be modified before actuator 22 and/or heater 23 is driven based on the application. Thus, it can be ensured that one of the two or more given blocks is executed in combination with at least one of the remaining of the two or more given blocks. Stated differently, if an application developer mistakenly instructs the independent execution of a block not allowed to be independently executed, it is still possible to inhibit the execution of an application that cannot safely control apparatus 20. Thus, the application developer can improve the safety of apparatus 20 controlled by the application, even if the application is created with an emphasis on suitability for the user rather than ensuring the safety of actuator 22 and/or heater 23.

For example, in apparatus 20 according to the present embodiment, controller 24 may modify the application by (a) adding a new block to the plurality of blocks, (b) changing the order of the plurality of blocks, or (c) removing any block included in the plurality of blocks.

More specifically, for example, in apparatus 20 according to the present embodiment, when the application includes information on the order in which each of the plurality of blocks is executed, the two or more given blocks include a first block and a second block, and a rule prohibits the first block from not being executed before the second block is executed, controller 24 may modify the application by adding the first block before the second block when the application includes the second block and does not include the first block before the second block.

For example, in apparatus 20 according to the present embodiment, when the application includes information on the order in which each of the plurality of blocks is executed, the two or more given blocks include a first block and a second block, and a rule prohibits the first block from not being executed before the second block is executed, controller 24 may modify the application by changing the order of the first block to achieve an order in which the first block comes before the second block in order when the application includes the first block and the second block and does not include the first block before the second block.

For example, in apparatus 20 according to the present embodiment, when the application includes information on the order in which each of the plurality of blocks is executed, the two or more given blocks include a first block and a second block, and a rule prohibits the first block from not being executed before the second block is executed, controller 24 may modify the application by removing the second block when the application includes the second block and does not include the first block before the second block.

With these, it is possible to ensure that the first block is executed before the second block by adding a new block, changing the order of the blocks, or removing a block before the application is executed. Accordingly, the application developer can lower the priority that takes into consideration the safe driving of actuator 22 and heater 23 to more freely develop the application. Furthermore, the developer of the software that is incorporated in apparatus 20 that controls actuator 22 and heater 23 can allow the execution of blocks without having to check the safety of each and every application every time.

For example, in apparatus 20 according to the present embodiment, when the application includes information on the order in which each of the plurality of blocks is executed, the two or more given blocks include a second block and a third block, and a rule prohibits the third block from not being executed after the second block is executed, controller 24 may modify the application by adding the third block after the second block when the application includes the second block and does not include the third block after the second block.

For example, in apparatus 20 according to the present embodiment, when the application includes information on the order in which each of the plurality of blocks is executed, the two or more given blocks include a second block and a third block, and a rule prohibits the third block from not being executed after the second block is executed, controller 24 may modify the application by changing the order of the third block to achieve an order in which the third block comes after the second block in order when the application includes the second block and the third block and does not include the third block after the second block.

For example, in apparatus 20 according to the present embodiment, when the application includes information on the order in which each of the plurality of blocks is executed, the two or more given blocks include a second block and a third block, and a rule prohibits the third block from not being executed after the second block is executed, controller 24 may modify the application by removing the second block when the application includes the second block and does not include the third block after the second block.

With these, it is possible to ensure that the third block is executed after the second block by adding a new block, changing the order of the blocks, or removing a block before the application is executed. Accordingly, the application developer can lower the priority that takes into consideration the safe driving of actuator 22 and heater 23 to more freely develop the application. Furthermore, the developer of the software that is incorporated in apparatus 20 that controls actuator 22 and heater 23 can allow the execution of blocks without having to check the safety of each and every application every time.

For example, in apparatus 20 according to the present embodiment, the rule may be for ensuring that two or more given blocks are executed in combination to prevent the at least one of actuator 22 or heater 23 from reaching its maximum withstand temperature.

This makes it possible to inhibit actuator 22 and/or heater 23 from reaching its maximum withstand temperature when the application is executed, which makes it possible to improve the safety of apparatus 20 controlled by the application.

For example, apparatus 20 according to the present embodiment may further include enclosure 21 including an interior space, and the first rule may be for ensuring that two or more given blocks are executed in combination to prevent the interior space from reaching its maximum withstand temperature.

This makes it possible to inhibit the interior space of enclosure 21 from reaching its maximum withstand temperature when the application is executed, which makes it possible to improve the safety of apparatus 20 controlled by the application.

Embodiment 7

Next, Embodiment 7 will be described. The present embodiment differs from Embodiment 6 primarily in that the pre-execution check is skipped when the application is authenticated. Hereinafter, the present embodiment will be described with a focus on the points of difference from Embodiment 6.

The hardware and functional configurations of system 1 according to the present embodiment are the same as in Embodiment 6. Accordingly, repeated illustration in the figures and explanation in the description are omitted.

7.1 Processes

In the present embodiment, the processes are the same as in Embodiment 6 except that step S216 of the pre-execution check in Embodiment 6 is replaced with step S216A. Step S216A of the pre-execution check process will therefore be described with reference to FIG. 37.

Figure 37:
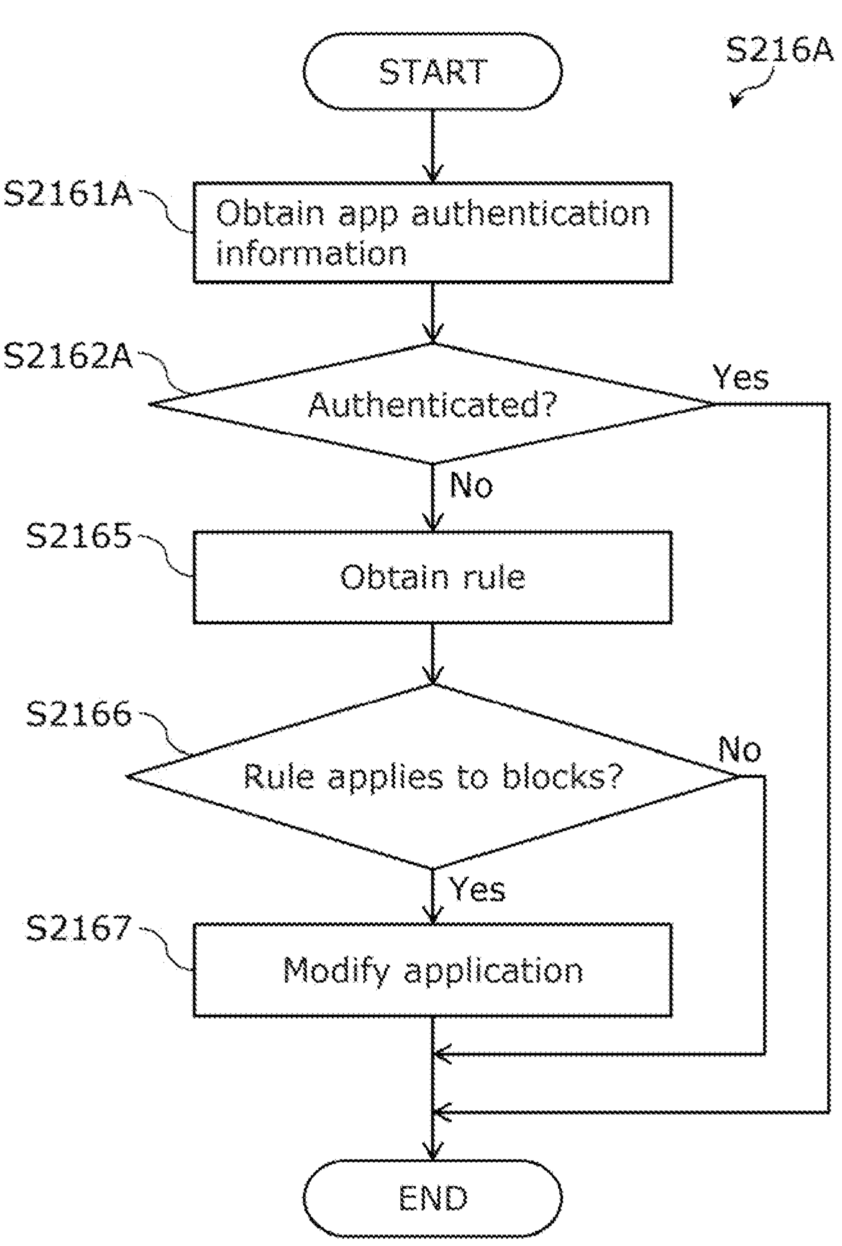
FIG. 37 illustrates a flowchart of the pre-execution check process according to Embodiment 7.

FIG. 37 illustrates a flowchart of the pre-execution check process according to Embodiment 7.

Step S2161A

Device 300 obtains app authentication information. If the application has been authenticated, the app authentication information includes information indicating that the application has been authenticated.

Application authentication is a mechanism for guaranteeing the quality of an application, for example, by enabling confirmation of the application's security and/or identity (i.e., that it has not been tampered with). Next, one example of an application granted with authentication information will be given. If the change history of the application's code indicates that no changes were made to parameter ranges, information indicating that the application has been authenticated is associated with the application.

Step S2162A

Device 300 determines whether the application is authenticated or not based on the retrieved app information. Here, if the application is determined to be authenticated (Yes in S2162A), device 300 skips the subsequent steps S2165 to S2167 and terminates the pre-execution check process. If, however, it is determined that the application is not authenticated (No in S2162A), device 300 proceeds to the next step S2165.

7.2 Advantageous Effects, Etc.

As described above, apparatus 20 according to the present embodiment includes: at least one of actuator 22 or heater 23, and controller 24 that controls the at least one of actuator 22 or heater 23. Controller 24 obtains an application that is defined by a plurality of blocks that drive the at least one of actuator 22 or heater 23 and includes information indicating whether the application has been authenticated. When the application does not include information indicating that the application has been authenticated, controller 24 consults a rule indicating that two or more given blocks are to be executed in combination, and when the rule applies to the plurality of blocks included in the application, modifies the application and drives the at least one of actuator 22 or heater 23 based on the modified application.

This achieves the same advantageous effects as Embodiment 6. Furthermore, when the application is not authenticated, processes that involve application modifications can be performed, which reduces the processing load when the application is authenticated. It is therefore not necessary to perform the determination process for the combination of the blocks for all applications, and management through authentication reduces the processing load and facilitates design standards for the combination of blocks, making it easier and safer for application developers to design.

For example, in apparatus 20 according to the present embodiment, when the application includes information indicating that the application has been authenticated, controller 24 may not consult the first rule and may not modify the application.

This allows the process for changing the blocks to be skipped if the application has already been authenticated, thus reducing the processing load.

Embodiment 8

Next, Embodiment 8 will be described. The present embodiment differs from Embodiment 6 above primarily in that the pre-execution check is skipped when the creator of the application and the producer of the apparatus are the same. Hereinafter, the present embodiment will be described with a focus on the points of difference from Embodiment 6.

The hardware and functional configurations of system 1 according to the present embodiment are the same as in Embodiment 6. Accordingly, repeated illustration in the figures and explanation in the description are omitted.

8.1 Processes

In the present embodiment, the processes are the same as in Embodiment 6 except that step S216 of the pre-execution check in Embodiment 6 above is replaced with step S216B. Step S216B of the pre-execution check process will therefore be described with reference to FIG. 38.

Figure 38:
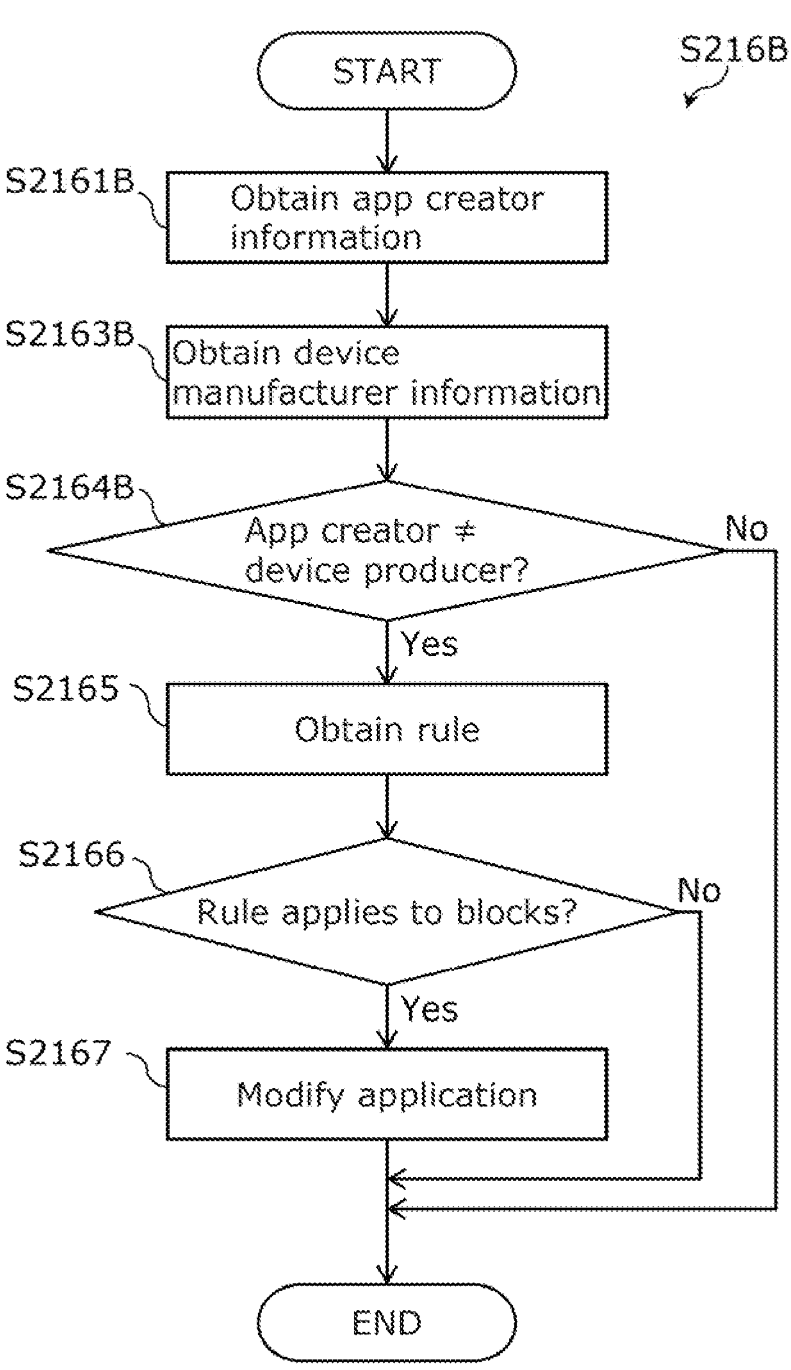
FIG. 38 illustrates a flowchart of the pre-execution check process according to Embodiment 8.

FIG. 38 illustrates a flowchart of the pre-execution check process according to Embodiment 8.

Step S2161B

Device 300 obtains app creator information. The app creator information indicates the creator of the application. Here, "creator" means, for example, the company, individual, or organization that created the application, and may also be referred to as "developer" or "author".

Step S2163B

Device 300 obtains device manufacturer information. The device manufacturer information indicates the producer of the device. Here, "producer" means, for example, the company, individual, or organization that produced device 300 (i.e., apparatus 20), and may also be referred to as "manufacturer".

Step S2164B

Device 300 determines whether the creator of the application is different from the producer of device 300. If the creator of the application is an individual and the producer of device 300 is a company, device 300 may determine that the creator of the application and the producer of device 300 are the same if the company to which the creator of the application belongs and the producer of device 300 match. Device 300 may also determine that the creator of the application and the producer of device 300 are the same if the creator of the application is a development contractor contracted by the producer of device 300.

Here, if the creator of the application and the producer of device 300 are the same (No in S2164B), device 300 skips the subsequent steps S2165 to S2167 and ends the pre-execution check process. If, however, the creator of the application and the producer of device 300 are different (Yes in S2164B), device 300 proceeds to the next step S2165.

8.2 Advantageous Effects, Etc.

As described above, apparatus 20 according to the present embodiment includes at least one of actuator 22 or heater 23, and controller 24 that controls the at least one of actuator 22 or heater 23. Controller 24 obtains an application that is defined by a plurality of blocks that drive the at least one of actuator 22 or heater 23 and includes information indicating a creator of the application, obtains information indicating a producer of apparatus 20, and when the creator of the application and the producer of apparatus 20 are different, consults a rule indicating that two or more given blocks are to be executed in combination, and when the rule does not apply to a plurality of blocks included in the application, modifies the application, and drives the at least one of actuator 22 or heater 23 based on the modified application.

This achieves the same advantageous effects as Embodiment 6. Furthermore, when the creator of the application and the manufacturer of apparatus 20 are different, processes that involve application modifications can be performed, which reduces the processing load when the creator of the application and the manufacturer of apparatus 20 are the same.

Embodiment 9

Next, Embodiment 9 will be described. The present embodiment differs from Embodiment 6 primarily in that pre-execution check is performed using a rule corresponding to the degradation level of the apparatus. Hereinafter, the present embodiment will be described with a focus on the points of difference from Embodiment 6.

The hardware and functional configurations of system 1 according to the present embodiment are the same as in Embodiment 6. Accordingly, repeated illustration in the figures and explanation in the description are omitted.

9.1 Processes

In the present embodiment, the processes are the same as in Embodiment 6 except that step S216 of the pre-execution check in Embodiment 6 above is replaced with step S216C. Step S216C of the pre-execution check process will therefore be described with reference to FIG. 39.

Figure 39:
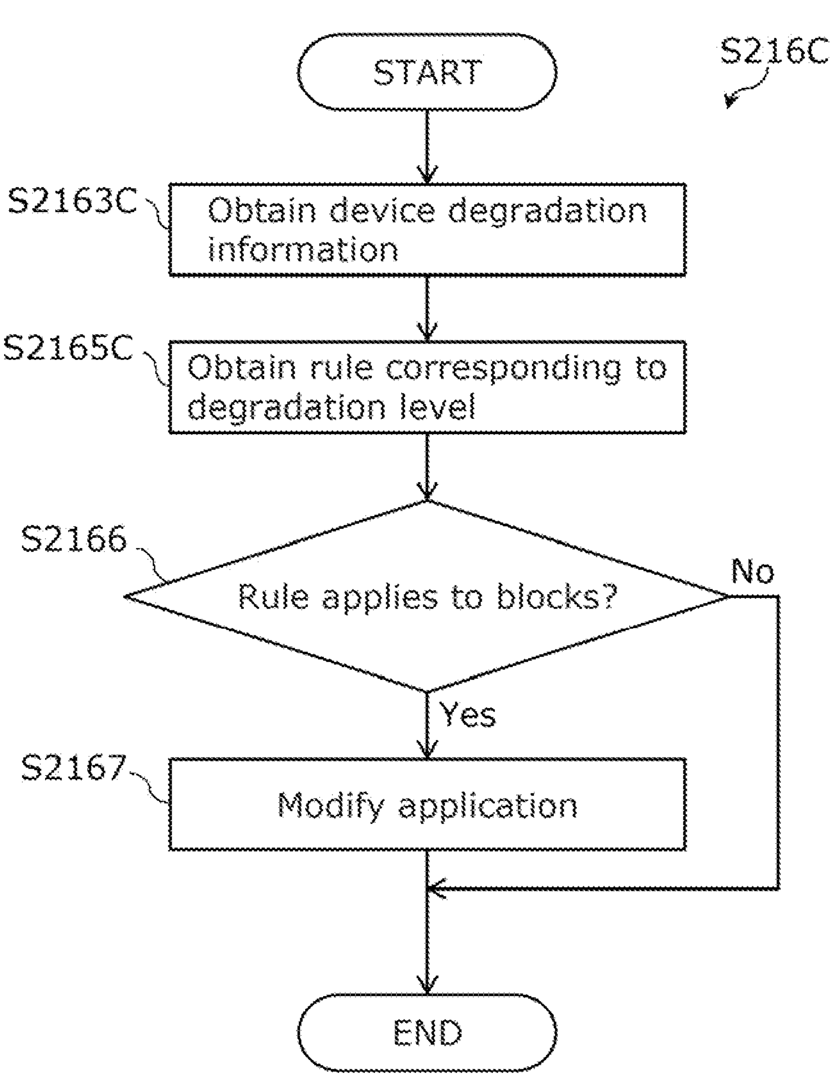
FIG. 39 illustrates a flowchart of the pre-execution check process according to Embodiment 9.

FIG. 39 illustrates a flowchart of the pre-execution check process according to Embodiment 9.

Step S2163C

Device 300 obtains device degradation information. The device degradation information indicates the degradation level of actuator 22 and/or heater 23 included in apparatus 20. The method of detecting the degradation level is not limited, and can be detected using a sensor, for example.

Step S2165C

Device 300 obtains a rule corresponding to the degradation level. For example, device 300 consults the rule database to obtain a rule corresponding to the degradation level of actuator 22 or heater 23 that the block drives.

An item that determines the degradation level is, for example, the number of times actuator 22 and/or heater 23 included in device 300 has been used, the hours of use, or the number of days used from the start of operation to the present. These items are assumed to increase in an approximately proportional relationship to use by a user. Thus, the rule is defined so that the degradation level increases with each increase in the value corresponding to the item.

Another item that determines the degradation level is, for example, an added value of the temperature of heater 23 or the degree of reproducibility of the input and output of actuator 22 and/or heater 23. The added value of the temperature of heater 23 is the added value of the temperature when heater 23 is driven. For example, the average, intermediate, or maximum temperature of heater 23 during execution of the block is used. The temperature of heater 23 may be the ratio of the execution temperature to the limit temperature of heater 23, or the difference of the execution temperature to the limit temperature of heater 23.

The degree of reproducibility of the input and output of actuator 22 and/or heater 23 is calculated with reference to the relationship between the input value to drive actuator 22 and/or heater 23 and the output of actuator 22 and/or heater 23. The ratio of the actual output value for a given input to the output value specified by the relationship is used.

9.2 Advantageous Effects, Etc.

As described above, apparatus 20 according to the present embodiment includes at least one of actuator 22 or heater 23, and controller 24 that controls the at least one of actuator 22 or heater 23. Controller 24 obtains an application defined by a plurality of blocks that drive the at least one of actuator 22 or heater 23, obtains degradation information indicating whether the at least one of actuator 22 or heater 23 has degraded, consults a rule that corresponds to the degradation information and indicates that two or more given blocks are to be executed in combination, and when the rule applies to the plurality of blocks included in the application, modifies the application and drives the at least one of actuator 22 or heater 23 based on the modified application.

This achieves the same advantageous effects as Embodiment 6. Furthermore, a rule corresponding to the degradation information of apparatus 20 can be used, and the block can be used to execute drive instructions from the application side to actuator 22 and/or heater 23 while taking into account the performance of the device as it degrades over time, and apparatus 20 controlled by the application can therefore be made more secure.

Embodiment 10

In Embodiments 6 through 9, a block included in an application that has already been delivered is changed before the application is executed. In the present embodiment, the application is modified is before the application is delivered, i.e., in the development or production stage of the application. In this respect to timing, the present embodiment differs from Embodiments 6 through 9. Hereinafter, the present embodiment will be described in detail with a focus on the points of difference from Embodiments 6 through 9. Excluding the timing of the modification of the application, the present embodiment may be the same as Embodiments 6 through 9. Elements in the present embodiment that are the same as those in Embodiments 6 through 9 are given the same reference signs as in Embodiments 6 through 9, and repeated detailed description thereof will be omitted.

The basic configuration of the hardware, block database, and rule database of information processing system 2000 according to the present embodiment is the same as the basic configuration illustrated in FIG. 20 and FIG. 21 in Embodiment 5.

FIG. 40 illustrates examples of a generic rule included in rule database 42 according to the present embodiment.

Rule group **42*d* for washing machines stored in rule database 42 includes, for example, generic rule R400 shown in (a) of FIG. 40. This generic rule R400 is applicable to each of a plurality of types of washing machines, and is a rule that when one block included in two or more given blocks is executed, prohibits at least one of remaining blocks included in the two or more given blocks from not being executed. Stated differently, the rule indicates a requirement for a combination of two or more given blocks, just as in Embodiments 6 through 9. Hereafter, a combination of two or more given blocks is also referred to simply as a "combination", and a requirement for that combination is also referred to as a "combination rule". Generic rule R400 may indicate a plurality of combination rules. For example, generic rule R400** indicates a first combination rule and a second combination rule. The first combination rule is a requirement for a "drain" function block, which is the first block, and a "spin" function block, which is the second block. In other words, the first combination rule indicates that the drain block is prohibited from not being executed before the spin block is executed. The second combination rule is a requirement for a "dry" function block, which is the second block, and an "airflow" function block, which is the third block. In other words, the second combination rule indicates that the airflow block is prohibited from not being executed after the dry block.

The drain block is a function block that causes the washing machine to perform a drain operation as a function, and the spin block is a function block that causes the washing machine to perform a spin operation as a function. Similarly, the dry block is a function block that causes the washing machine to perform a drying operation as a function, and the airflow block is a function block that causes the washing machine to perform an airflow operation as a function block.

The plurality of types of washing machines to which generic rule R400 applies include washing machines from a plurality of manufacturers. If each manufacturer offers more than one model of washing machine, the plurality of types of washing machines include those plurality of models of washing machines. Stated differently, the combination indicated in generic rule R400 applies to any washing machine, regardless of manufacturer and model.

Generic rule R400 for washing machines may also indicate a combination rule that applies to each washing machine from a plurality of manufacturers, as illustrated in (b) of FIG. 40. For example, generic rule R400 indicates the combination rule applicable to the plurality of models of washing machines provided by the manufacturer "company A", the combination rule applicable to the plurality of models of washing machines provided by the manufacturer "company B", and so on.

Thus, just as in Embodiment 6 through 9, the rule according to the present embodiment is a rule that when one block included in two or more given blocks is executed, prohibits at least one of remaining blocks included in the two or more given blocks from not being executed. The two or more given blocks include a first block and a second block, and the rule prohibits the first block from not being executed before the second block is executed. In other words, the rule prohibits the first block from not being executed in a period from a start of the application to before the second block is executed. Such a first block is a block for establishing an executable environment for the second block, just as in Embodiments 6 though 9.

Alternatively, the two or more given blocks include a second block and a third block, and the rule prohibits the third block from not being executed after the second block is executed. In other words, the rule prohibits the third block from not being executed in a period from after the second block is executed to the end of the application. For example, the third block is a block for restoring the environment changed by the execution of the second block to the environment before the execution of the second block, just as in Embodiments 6 through 9.

Note that just as in Embodiments 6 through 9, the rule according to the present embodiment may be a rule for ensuring that two or more given blocks are executed in combination in order to prevent, for example, the interior space of enclosure 21, prevent actuator 22, or prevent heater 23 from reaching its maximum withstand temperature.

The sequence of information processing system 200 and the overall processing operation of development tool 50 according to the present embodiment are the same as the sequence and processing operation illustrated in FIG. 23 and FIG. 24 in Embodiment 5.

Development tool 50 consults a rule applicable to apparatus 20, such as a washing machine, and determines whether rule applies to the sequence generated in step S28, i.e., the plurality of function blocks included in the application. If the rule applies to the plurality of function blocks, development tool 50 determines that the entire flow of the sequence generated in step S28 is not permitted. However, if the rule does not apply to the plurality of function blocks, development tool 50 determines that the entire flow of the sequence generated in step S28 is permitted. The rule consulted in step S29 is the generic rule or dedicated rule described above that applies to apparatus 20, or more specifically, the combination rule included in the rule. The method of determining whether the rule applies or not is the same as in Embodiments 6 through 9.

Figure 41:
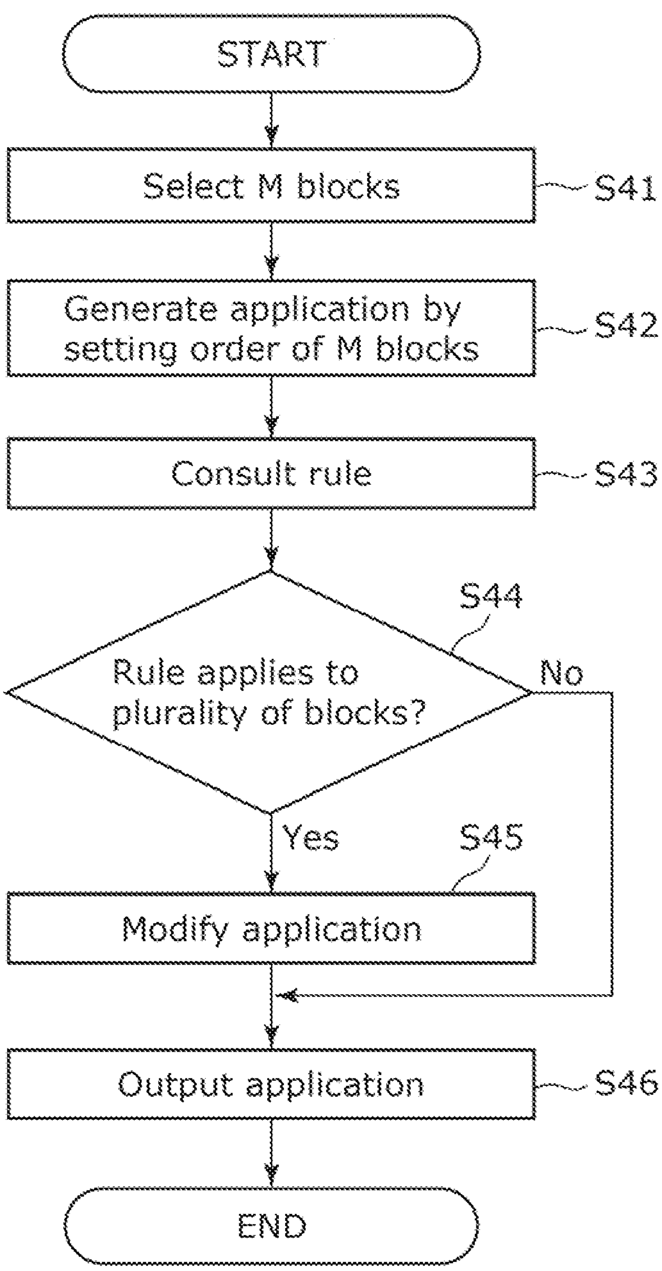
FIG. 41 is a flowchart illustrating an example of an automatic arrangement correction process according to Embodiment 10.

FIG. 41 is a flowchart illustrating an example of the automatic arrangement correction process in step S30 in FIG. 24.

Step S41

Development tool 50 selects, from among N (N is an integer greater than or equal to 2) function blocks for driving apparatus 20, such as a washing machine, M (M is an integer greater than or equal to 2 and less than or equal to N) function blocks, in accordance with an input operation performed on input unit 54 by the operator. Stated differently, development tool 50 selects each of the M function blocks as a selected block from among the N function blocks for driving at least one of actuator 22 or heater 23 included in apparatus 20, which is the device to be controlled, in accordance with an input operation performed on input unit 54 by the operator.

Step S42

Next, development tool 50 generates the sequence, i.e., the application by arranging the M selected function blocks in order in the selected block area described above. Stated differently, development tool 50 sets the order in which each of the at least M selected blocks is executed in accordance with an input operation performed on input unit 54 by the operator, thereby generating an application that includes at least the M selected blocks. Each of the M selected blocks in this application may include a parameter for driving at least one of actuator 22 or heater 23.

Step S43

Next, if each of the M function blocks is a block for driving a washing machine, development tool 50 refers to a rule that applies to a washing machine. For example, development tool 50 refers to generic rule R400 if the application generated in step S42 applies to a plurality of types of washing machines. If the application generated in step S42 is applicable to a given model of washing machine, development tool 50 consults a rule associated with that model of washing machine among dedicated rules R41 through R43. Stated differently, development tool 50 determines whether the application generated in step S42 is an application dedicated to the device to be controlled or a general-purpose application applicable to the device to be controlled and devices other than the device to be controlled. Development tool 50 then, as the above-described rule, consults a rule candidate that corresponds to the determination result of the application, from among a plurality of rule candidates that when one block included in two or more given blocks is executed, prohibits at least one of remaining blocks included in the two or more given blocks from not being executed.

Step S44

Next, development tool 50 determines whether the above-described rule applies to the M function blocks set in step S42. Stated differently, development tool 50 determines whether the combination rule included in that rule applies to the M function blocks included in the application.

Step S45

Here, if development tool 50 determines that the rule applies to the M function blocks (Yes in step S44), development tool 50 modifies the application. Stated differently, development tool 50 consults a rule that when one block included in two or more given blocks is executed, prohibits at least one of remaining blocks included in the two or more given blocks from not being executed, and if the rule applies to the M selected blocks included in the application, modifies the application. More specifically, development tool 50 modifies the application by (1) adding a new blocks to the M selected blocks, (2) changing the order of the M selected blocks, or (3) removing any of the M selected blocks. How the application is modified may be defined in a rule.

Step S46

Development tool 50 then outputs the modified application.

Figure 42:
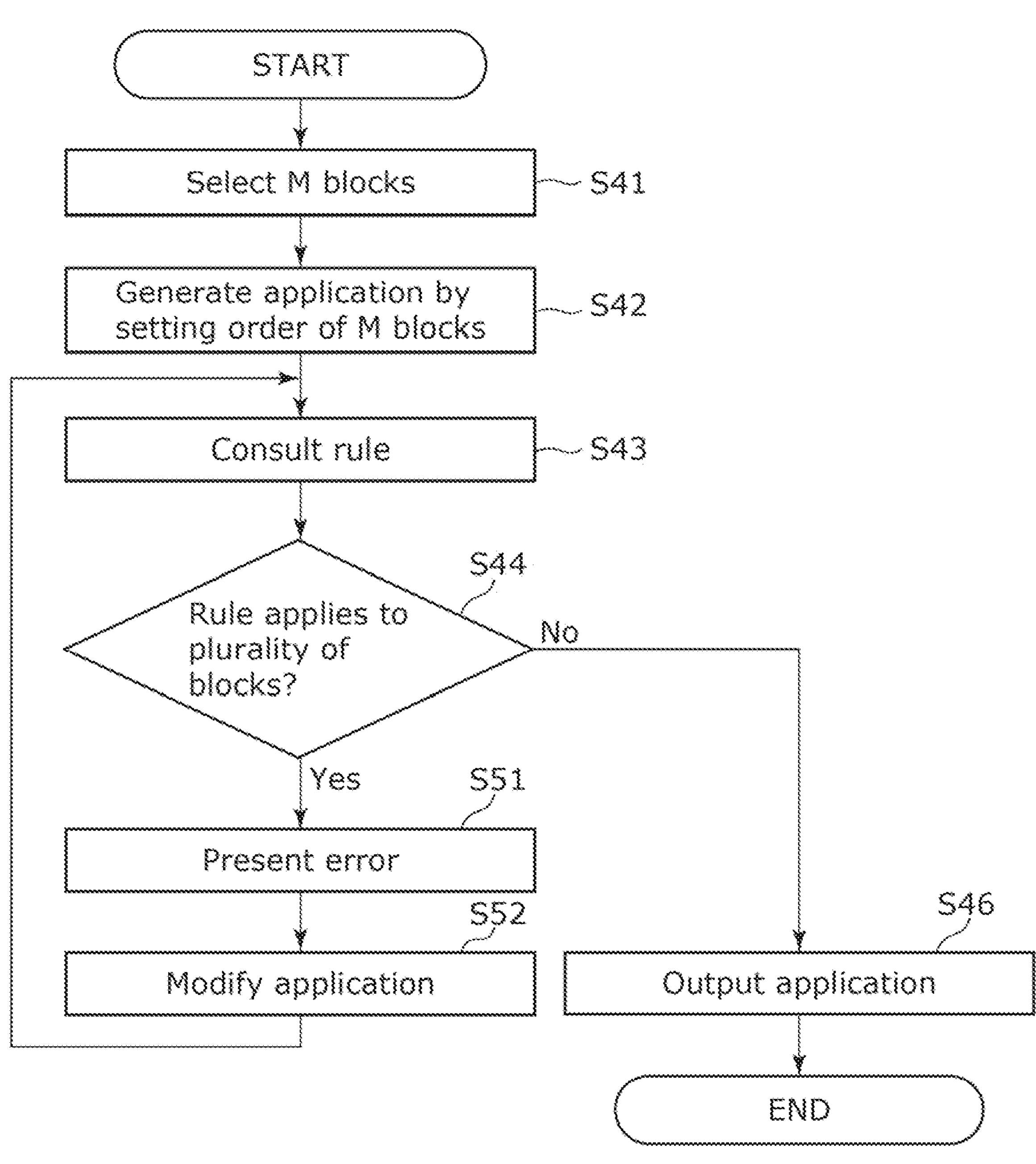
FIG. 42 is a flowchart illustrating an example of an arrangement error presentation process according to Embodiment 10.

FIG. 42 is a flowchart illustrating one example of the arrangement error presentation process in step S30 of FIG. 24.

Steps S41 through S44

Development tool 50 performs steps S41 through S44, just like in the example illustrated in FIG. 41.

Step S51

If development tool 50 determines that the rule applies to the M function blocks in step S44 (Yes in step S44), development tool 50 displays an error on display 53 without automatically modifying the application. This presents an error to the operator. Stated differently, in steps S43, S44, and S51, development tool 50 presents errors by consulting a rule. More specifically, development tool 50 consults a rule that when one block included in two or more given blocks is executed, prohibits at least one of remaining blocks included in the two or more given blocks from not being executed, and if the rule applies to the M selected blocks included in the application, presents an error to the operator.

In addition to presenting the error, development tool 50 may also present a plurality of solutions to the operator and prompt the operator to select a solution. In such cases, development tool 50 may present to the operator the differences in output performance for each of the plurality of solutions. In such cases, development tool 50 may also present at least two or more of the following solutions: a first solution of adding a new function block, a second solution of changing the order of the M selected blocks, and a third solution of removing any function block. This presents the solutions to the operator, who is a developer of the application, for example. As a result, the operator, who is a developer of the application who has seen those solutions can easily modify the application generated in step S42, based on those solutions, by performing an input operation on input unit 54 of development tool 50.

Step S52

The operator who sees the error modifies the application generated in step S42 by performing an input operation on input unit 54 of development tool 50. When each of the plurality of solutions is presented to the operator as a choice, the operator selects any of the solutions from among those choices by performing an input operation. As a result, development tool 50 modifies the application. Stated differently, development tool 50 modifies the application in accordance with an input operation performed by the operator presented with the error. Then, development tool 50 repeats the processes from step S43.

Step S46

If development tool 50 determines in step S44 that the rule does not apply to the M function blocks (No in step S44), the application is output. At this time, if the application has been modified in step S52, the modified application is output. If, however, the application has not been modified in step S52, the application generated in step S42 is output.

When the process of step S51 is repeated, development tool 50 may present a solution for handling the error based on the number of times step S51 has been repeated. For example, if development tool 50 presents an error K or more times (K is an integer greater than or equal to 2), it may present a plurality of solutions for handling the error. Stated differently, if the number of times the error has been presented is K or more, development tool 50 presents at least two solutions to the operator from among the first, second, and third solutions described above.

Figure 43A:
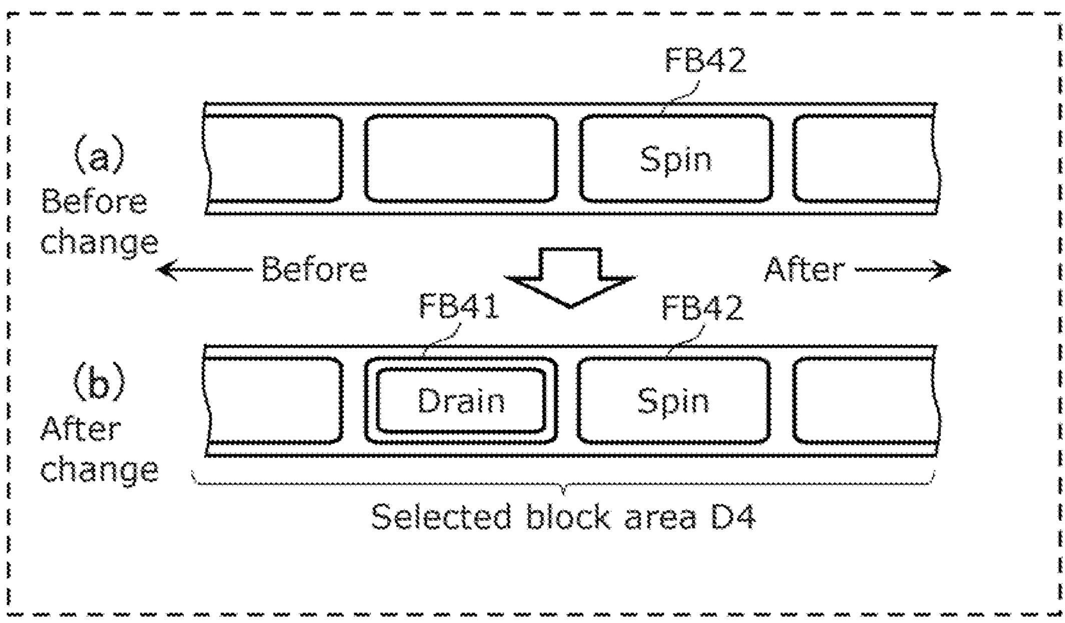
FIG. 43A illustrates one example of the process of arranging a function block and the automatic arrangement correction process according to Embodiment 10.

FIG. 43A illustrates one example of the process of arranging a function block and the automatic function block correction process.

Development tool 50 displays the function blocks dragged and dropped from the block list and arranged in selected block area D4 as icons, for example, as illustrated in (a) in FIG. 43A. More specifically, development tool 50 arranges M function blocks including the "spin" function block FB42 in selected block region D4, in accordance with an input operation performed on input unit 54 by the operator. In this way, development tool 50 performs the process of arranging a function block in step S22 illustrated in FIG. 24 in accordance with an input operation performed by the operator.

Once the application is generated as a result of the process of arranging a function block, development tool 50 determines whether the flow of the entire application is permitted, as in step S29 in FIG. 24. Stated differently, development tool 50 uses a rule to make a decision regarding the M function blocks arranged in selected block area D4. Development tool 50 then performs the automatic arrangement correction process.

More specifically, development tool 50 first consults a washing machine rule corresponding to the M function blocks. For example, development tool 50 identifies rule group 42*d* for washing machines in rule database 42 illustrated in (b) in FIG. 21, and consults any one rule in that rule group 42*d*. That rule may be generic rule R400, dedicated rule R41, etc. For example, the rule includes a combination rule that prohibits the "drain" function block FB41, which is the first block, from not being executed before the "spin" function block FB42, which is the second block, is executed.

If development tool 50 determines that the rule applies to the M arranged function blocks, development tool 50 modifies the application. For example, development tool 50 modifies the application for the washing machine by adding the "drain" function block FB41 before function block FB42, as illustrated in (b) in FIG. 43A.

Thus, in the present embodiment, when the application includes a second block and does not include a first block before the second block, development tool 50 modifies the application by adding a first block before the second block. This change results in the rule no longer applying to the M function blocks.

When the process of arranging a function block results in the "drain" function block FB41, which is the first block, being arranged after the "spin" function block FB42, which is the second block, development tool 50 may move the "drain" function block FB41 up in order. Stated differently, when the application includes a first block and a second block and does not include the first block before the second block, development tool 50 modifies the application by changing the order of the first block to achieve an order in which the first block comes before the second block in order. This change also results in the rule no longer applying to the M function blocks.

Development tool 50 may remove the "spin" function block FB42, which is the second block. Stated differently, when the application includes a second block and does not include a first block before the second block, development tool 50 modifies the application by removing the second block. This change also results in the rule no longer applying to the M function blocks.

Figure 43B:
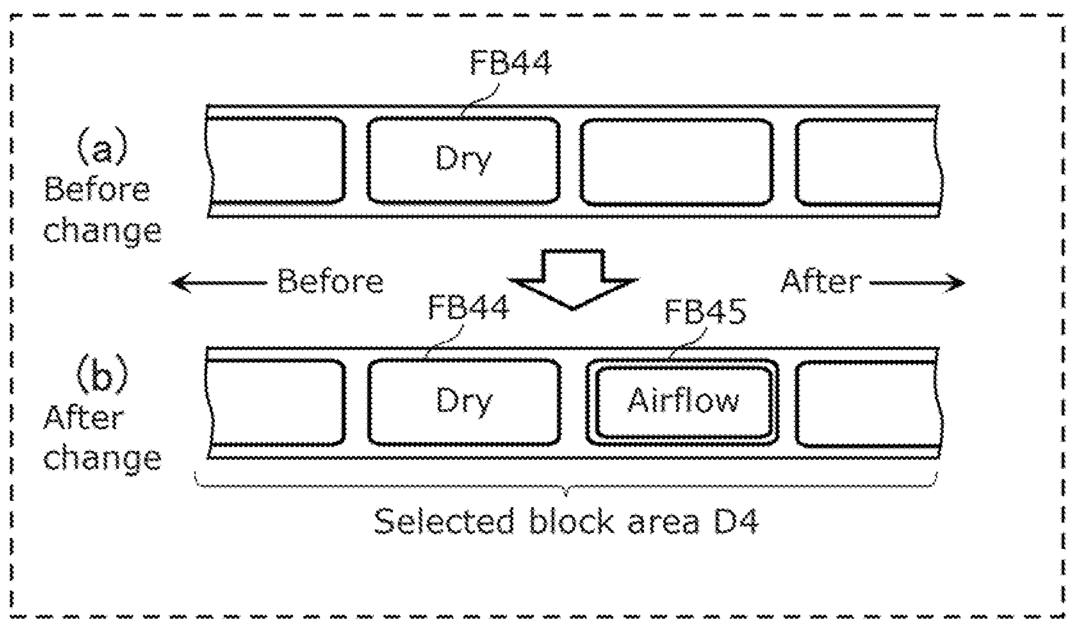
FIG. 43B illustrates another example of the process of arranging a function block and the automatic arrangement correction process according to Embodiment 10.

FIG. 43B illustrates another example of the process of arranging a function block and the automatic function block correction process.

Development tool 50 displays the function blocks dragged and dropped from the block list and arranged in selected block area D4 as icons, for example, as illustrated in (a) in FIG. 43B. More specifically, development tool 50 arranges M function blocks including the "dry" function block FB44 in selected block region D4, in accordance with an input operation performed on input unit 54 by the operator. In this way, development tool 50 performs the process of arranging a function block in step S22 illustrated in FIG. 24 in accordance with an input operation performed by the operator.

Once the application is generated as a result of the process of arranging a function block, development tool 50 determines whether the flow of the entire application is permitted, as in step S29 in FIG. 24. Stated differently, development tool 50 uses a rule to make a decision regarding the M function blocks arranged in selected block area D4. Development tool 50 then performs the automatic arrangement correction process.

More specifically, development tool 50 first consults a washing machine rule corresponding to the M function blocks. For example, development tool 50 identifies rule group 42*d* for washing machines in rule database 42 illustrated in (b) in FIG. 21, and consults any one rule in that rule group 42*d*. That rule may be generic rule R400, dedicated rule R41, etc. For example, the rule includes a combination rule that prohibits the "airflow" function block FB45, which is the third block, from not being executed before the "dry" function block FB44, which is the second block, is executed.

If development tool 50 determines that the rule applies to the M arranged function blocks, development tool 50 modifies the application. For example, development tool 50 modifies the application for the washing machine by adding the "airflow" function block FB45 after function block FB44, as illustrated in (b) in FIG. 43B.

Thus, in the present embodiment, when the application includes a second block and does not include a third block after the second block, development tool 50 modifies the application by adding a third block after the second block. This change results in the rule no longer applying to the M function blocks.

When the process of arranging a function block results in the "airflow" function block FB45, which is the third block, being arranged before the "dry" function block FB44, which is the second block, development tool 50 may move the "airflow" function block FB45 down in order. Stated differently, when the application includes a second block and a third block and does not include the third block after the second block, development tool 50 modifies the application by changing the order of the third block to achieve an order in which the third block comes after the second block in order. This change also results in the rule no longer applying to the M function blocks.

Development tool 50 may remove the "dry" function block FB44, which is the second block. Stated differently, when the application includes a second block and does not include a third block after the second block, development tool 50 modifies the application by removing the second block. This change also results in the rule no longer applying to the M function blocks.

As in FIG. 43A and FIG. 43B, in the present embodiment, the automatic arrangement correction process is performed. Therefore, if an operator, i.e., a developer of the application mistakenly arranges M function blocks in a manner that consequently corresponds to a rule, those M function blocks will be automatically rearranged so that they do not correspond to a rule. This can ensure safe operation of the washing machine.

Figure 44:
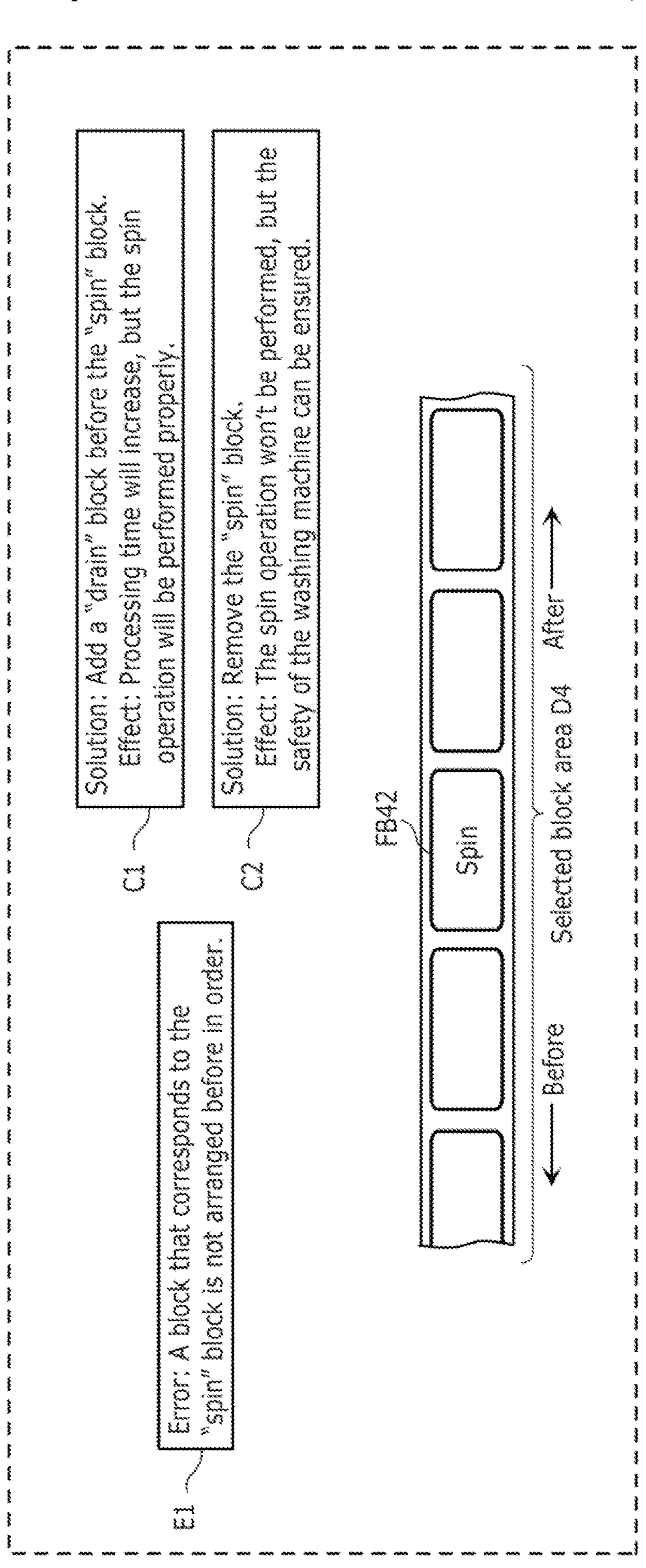
FIG. 44 illustrates one example of the arrangement error presentation process according to Embodiment 10.

FIG. 44 illustrates one example of an arrangement error presentation process.

Similar to the example in FIG. 43A, development tool 50 arranges the M function blocks which include the "spin" function block FB42 in selected block area D4, as illustrated in FIG. 44. When the application is generated as a result of this arrangement, development tool 50 determines whether the flow of the entire application is permitted, as in step S29 in FIG. 24. Stated differently, development tool 50 uses a rule to make a decision regarding the M function blocks arranged in selected block area D4. For example, the rule includes a combination rule that prohibits the "drain" function block FB41, which is the first block, from not being executed before the "spin" function block FB42, which is the second block, is executed.

If development tool 50 determines that the rule applies to the M function blocks, development tool 50 performs an error presentation process. More specifically, development tool 50 displays error message E1 as an error, as illustrated in FIG. 44. This error message E1 states that a function block that corresponds to the "spin" function block FB42 has not been arranged before in order. Stated differently, this error message E1 notifies that the M function blocks correspond to a rule that prohibits the "drain" function block FB41, which is the first block, from not being executed before the "spin" function block FB42, which is the second block, is executed. Such an error presentation process is performed, for example, in step S51 in FIG. 42.

In this way, in the present embodiment, development tool 50 consults a rule that when one block included in two or more given blocks is executed, prohibits at least one of remaining blocks included in the two or more given blocks from not being executed, and if the rule applies to the M selected blocks included in the application, presents an error to the operator. Development tool 50 modifies the application by changing the order in which each of the M selected blocks is executed in accordance with an input operation performed by the operator presented with the error.

By presenting such an error, the operator, who is a developer of the application, can easily rearrange the M function blocks to which the rule applies to an arrangement to which the rule does not apply. This can ensure safe operation of the washing machine.

In the error presentation process, development tool 50 may further display solutions C1 and C2 for handling the error indicated by error message E1. This solution C1 states that the error can be resolved by adding a "drain" function block before the "spin" function block. Stated differently, solution C1 is the first solution described above of adding a new block to the M selected blocks. Development tool 50 may further display the effect of implementing solution C1 along with the display of solution C1. For example, development tool 50 may display, as an effect, that although the processing time for the entire washing process will increase, the spin operation will be performed properly.

Solution C2 states that the error can be resolved by removing the "spin" function block. Stated differently, solution C2 is the third solution of removing any on the M selected blocks. Development tool 50 may further display the effect of implementing solution C2 along with the display of solution C2. For example, development tool 50 may display, as an effect, that although the spin operation cannot be performed, the safety of the washing machine can be ensured.

Figure 45:
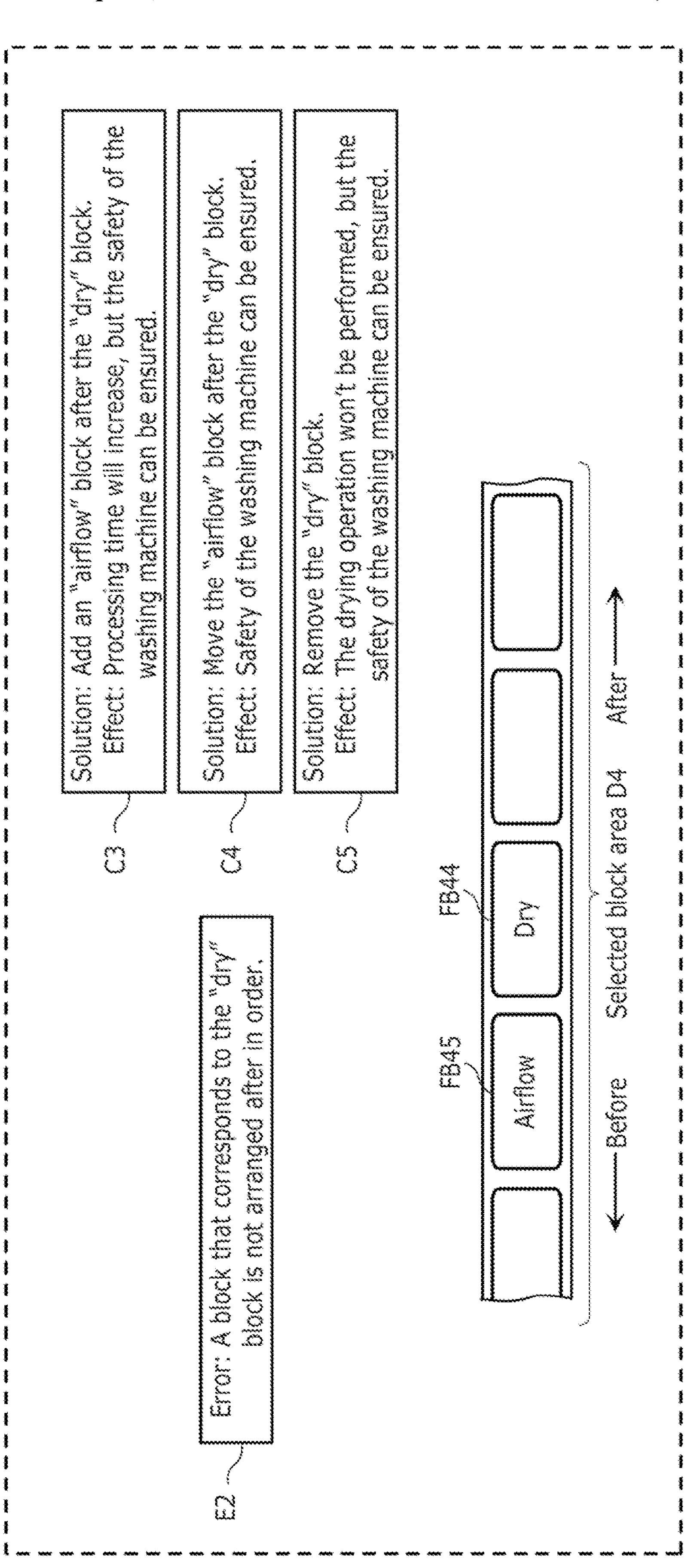
FIG. 45 illustrates another example of the connection error presentation process according to Embodiment 10.

FIG. 45 illustrates another example of a connection error presentation process.

Similar to the example in FIG. 43B, development tool 50 arranges the M function blocks which include the "dry" function block FB44 in selected block area D4, as illustrated in FIG. 45. When the application is generated as a result of this arrangement, development tool 50 determines whether the flow of the entire application is permitted, as in step S29 in FIG. 24. Stated differently, development tool 50 uses a rule to make a decision regarding the M function blocks arranged in selected block area D4. For example, the rule includes a combination rule that prohibits the "airflow" function block FB45, which is the third block, from not being executed before the "dry" function block FB44, which is the second block, is executed.

If development tool 50 determines that the rule applies to the M function blocks, development tool 50 performs an error presentation process. More specifically, development tool 50 displays error message E2 as an error, as illustrated in FIG. 45. This error message E2 states that a function block that corresponds to the "dry" function block FB44 has not been arranged after in order. Stated differently, this error message E2 notifies that the M function blocks correspond to a rule that prohibits the "airflow" function block FB45, which is the third block, from not being executed after the "dry" function block FB44, which is the second block, is executed. Such an error presentation process is performed, for example, in step S51 in FIG. 42.

By presenting such an error, the operator, who is a developer of the application, can easily rearrange the M function blocks to which the rule applies to an arrangement to which the rule does not apply. This can ensure safe operation of the washing machine.

In the error presentation process, development tool 50 may further display solutions C3 through C5 for handling the error indicated by error message E2. This solution C3 states that the error can be resolved by adding an "airflow" function block after the "dry" function block. Stated differently, solution C3 is the first solution described above of adding a new block to the M selected blocks. Development tool 50 may further display the effect of implementing solution C3 along with the display of solution C3. For example, development tool 50 may display, as an effect, that although the processing time for the entire washing process will increase, the safety of the washing machine can be ensured.

Solution C4 states that the error can be resolved by moving the "airflow" function block arranged before the "dry" function block to a position after the "dry" function block. Stated differently, solution C4 is the second solution described above of adding a new block to the M selected blocks. Development tool 50 may further display the effect of implementing solution C4 along with the display of solution C4. For example, development tool 50 may display, as an effect, that the safety of the washing machine can be ensured.

Solution C5 states that the error can be resolved by removing the "dry" function block. Stated differently, solution C5 is the third solution of removing any on the M selected blocks. Development tool 50 may further display the effect of implementing solution C5 along with the display of solution C5. For example, development tool 50 may display, as an effect, that although the drying operation cannot be performed, the safety of the washing machine can be ensured.

Thus, in the present embodiment, development tool 50 presents a plurality of solutions to handle errors. Development tool 50 modifies the application in accordance with an input operation performed by the operator presented with the error and the plurality of solutions.

For example, the plurality of solutions include at least two of the first, second, and third solutions described above. In the present embodiment, development tool 50 further presents, for each of the plurality of solutions, the effect of the solution, when performed, on the object acted upon by the driving of actuator 22 or heater 23, or the effect of the solution, when performed, on the application.

By presenting such solutions and the effects of the solutions, the operator, who is a developer of the application, can more easily rearrange the M function blocks to which the rule applies to an arrangement to which the rule does not apply. This can ensure safe operation of the washing machine.

Error messages E1 and E2 and solutions C1 through C5 may be displayed in any area of the sequence generation screen. Moreover, error messages E1 and E2 and solutions C1 through C5 may be shown respectively in association with a combination rule. In the above example, error messages E1 and E2 and solutions C1 through C5 are displayed, but how they are presented is not limited to these examples; error messages E1 and E2 and solutions C1 through C3 may be presented in any manner. For example, the error or other information may be presented audibly.

If development tool 50 presents an error K or more times (K is an integer greater than or equal to 2), it may present a plurality of solutions to the operator for handling the error. Stated differently, if the process of step S51 illustrated in FIG. 42 is repeated, development tool 50 may change how the error is presented according to the number of times step S51 has been repeated. More specifically, if the number of times an error is presented is less than K times, development tool 50 presents the error and does not present a solution, and if the number of times the error is presented is K or more, a solution is also displayed with the error.

Figure 46:
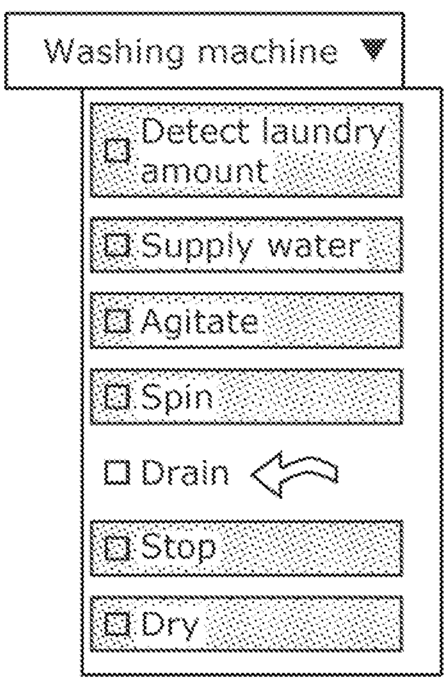
FIG. 46 illustrates another presentation example of a solution according to Embodiment 10.

FIG. 46 illustrates another presentation example of a solution.

Figure 47:
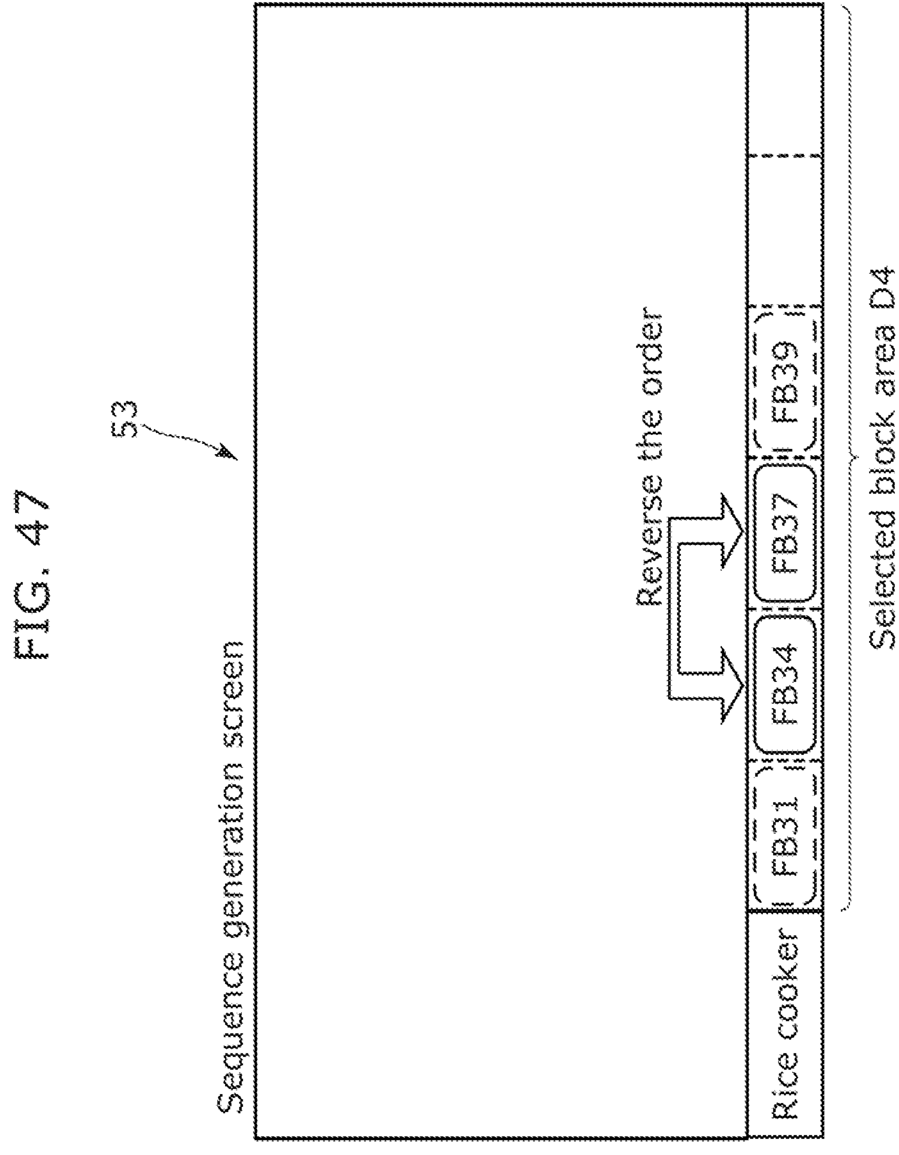
FIG. 47 illustrates yet another presentation example of a solution according to Embodiment 10.

In the example above, the solution is presented as a message, but development tool 50 may present the solution in other ways, as illustrated in FIG. 46. For example, development tool 50 presents the solution in such a way that the function block that should be added to avoid the error can be easily selected from the block list. Stated differently, if development tool 50 determines that the first block is not arranged before the second block indicated in the combination rule, it displays a block list, as illustrated in FIG. 47. In this block list, only the function block that is the first block to be arranged before that second block is displayed in a different manner than the other function blocks in that block list. More specifically, in the block list for the washing machine, only the "drain" function block that should be added before the "spin" function block is shown brightly, while the other function blocks are shaded. This makes it easier for the operator, i.e., a developer of the application to select the "drain" function block and add it to selected block area D4, enhancing the operability of modifying the application.

FIG. 47 illustrates yet another presentation example of a solution.

In the example above, the solution is presented only via a message, but development tool 50 may present the solution using an object such as an arrow, as illustrated in FIG. 47. For example, if development tool 50 determines that a rule applies to function blocks FB34 and FB37, development tool 50 will present the second solution of reversing the order of those function blocks in the form of a message and arrows. This makes it easier for the operator, i.e., a developer of the application to avoid an error by reversing the order of the function blocks, enhancing the operability of modifying the application.

10. Advantageous Effects, Etc.

As described above, the present embodiment can provide an environment in which a wide variety of safe applications can be developed, by using an application including blocks, and a rule database. Thus, for applications freely developed in that environment, actuator 22, which physically moves, or heater 23, which outputs thermal energy, can be safely driven. As a result, for example, the development of a wide variety of applications with a high degree of freedom and the development of a rule database to ensure safety can be created in parallel, enabling the early development of a wide variety of safe applications.

If the present embodiment and any one of Embodiments 6 through 9 are combined, even after the application is provided, the rule database can be modified to make the application more secure. In addition, even if a manufacturer needs to improve a situation that was not anticipated beforehand, the rule database is defined independently from the applications, so all applications can be supported by updating the rule database, without having to change a wide variety of applications themselves.

More specifically, the information processing method according to the present embodiment is an information processing method executed by a computer system such as development tool 50. The information processing method includes: (a) selecting M blocks as M selected blocks from among N blocks for driving at least one of actuator 22 or heater 23 included in apparatus 20, which is a device to be controlled, in accordance with an input operation performed by an operator, where N is an integer greater than or equal to two, and M is an integer greater than or equal to one and less than or equal to N; (b) generating an application including at least the M selected blocks by setting the order in which each of the at least M selected blocks is executed in accordance with an input operation performed by an operator; (c) consulting a rule that when one block included in two or more given blocks is executed, prohibits at least one of remaining blocks included in the two or more given blocks from not being executed, and when the rule applies to the M selected blocks included in the application, modifying the application; and (d) outputting the modified application.

This allows actuator 22 and/or heater 23 to be driven based on an application defined by M blocks. It is therefore is possible to develop applications using blocks that abstract the control of apparatus 20, allowing a wide variety of applications to be developed not only by the manufacturer but also by third parties, and these applications can be easily executed on apparatus 20. Furthermore, during development, an application including M selected blocks that apply to the rule described above is automatically modified. As a result, the application can be automatically modified to an application including M selected blocks that do apply to the rule. Thus, it can be ensured that one of the two or more given blocks is executed in combination with at least one of the remaining blocks. Stated differently, if the operator, i.e., a developer of the application mistakenly generates an application in which a block that is not permitted to be executed alone is executed alone, it is possible to inhibit the generation of such an application that cannot safely control apparatus 20. Thus, the application developer can ensure and improve the safety of apparatus 20 controlled by the application, even if the application is created or generated with an emphasis on suitability for the user of actuator 22 and/or heater 23.

In (c), the application may be modified by (1) adding a new block to the M selected blocks, (2) changing the order of the M selected blocks, or (3) removing any block included in the M selected blocks.

More specifically, the two or more given blocks include a first block and a second block, and the rule prohibits the first block from not being executed before the second block is executed. In (c), when the application includes a second block and does not include a first block before the second block, the application may be modified by adding a first block before the second block.

In (c), when the application includes a first block and a second block and does not include the first block before the second block, the application may be modified by changing the order of the first block to achieve an order in which the first block comes before the second block in order.

In (c), when the application includes a second block and does not include a first block before the second block, the application may be modified by removing the second block.

With these, during development of the application, it is possible to ensure that the first block is executed before the second block by adding a new block, changing the order of the blocks, or removing a block. Accordingly, a developer of the application or a developer of the software that is incorporated in apparatus 20 that controls actuator 22 and heater 23 can ensure the safety of apparatus 20 without having to check the safety of each and every application every time.

More specifically, the rule may prohibit the first block from not being executed in a period from a start of the application to before the second block is executed. Furthermore, the first block may be for establishing an executable environment for the second block.

The two or more given blocks may include a second block and a third block, and the rule may prohibit the third block from not being executed after the second block is executed. In such cases, in (c), when the application includes a second block and does not include a third block before the second block, the application may be modified by adding a third block before the second block.

In (c), when the application includes a second block and a third block and does not include the third block after the second block, the application may be modified by changing the order of the third block to achieve an order in which the third block comes after the second block in order.

In (c), when the application includes a second block and does not include a third block after the second block, the application may be modified by removing the second block.

With these, during development of the application, it is possible to ensure that the third block is executed after the second block by adding a new block, changing the order of the blocks, or removing a block. Accordingly, a developer of the application or a developer of the software that is incorporated in apparatus 20 that controls actuator 22 and heater 23 can ensure the safety of apparatus 20 without having to check the safety of each and every application every time.

More specifically, the rule may prohibit the third block from not being executed in a period from after the second block is executed to the end of the application. The third block may be for restoring an environment changed by execution of the second block to an environment before the execution of the second block.

For example, the rule may be for ensuring that the two or more given blocks are executed in combination to prevent the at least one of actuator 22 or heater 23 from reaching its maximum withstand temperature.

This makes it possible to inhibit actuator 22 and/or heater 23 from reaching its maximum withstand temperature when the application is executed, which makes it possible to improve the safety of apparatus 20 controlled by the application.

Apparatus 20, which is the device to be controlled, may include enclosure 21 including an interior space, and the rule may be for ensuring that the two or more given blocks are executed in combination to prevent the interior space from reaching its maximum withstand temperature.

This makes it possible to inhibit the interior space of enclosure 21 from reaching its maximum withstand temperature when the application is executed, which makes it possible to improve the safety of apparatus 20 controlled by the application.

Step (c) may include: determining whether the application generated is an application dedicated to the device to be controlled or a general-purpose application applicable to the device to be controlled and a device other than the device to be controlled; and consulting, as the rule, a rule candidate that corresponds to the result of the determining of the application, from among a plurality of rule candidates that when one block included in two or more given blocks is executed, prohibits at least one of remaining blocks included in the two or more given blocks from not being executed.

This allows for more variation in applications, such as dedicated and general-purpose applications. Furthermore, since rules appropriate for those variations are consulted, in each of those variations, the application can be modified appropriately.

The information processing method according to the present embodiment may be an information processing method executed by a computer system such as development tool 50, and may present a an error. The information processing method includes: (a) selecting M blocks as M selected blocks from among N blocks for driving at least one of actuator 22 or heater 23 included in apparatus 20, which is a device to be controlled, in accordance with an input operation performed by an operator, where N is an integer greater than or equal to two, and M is an integer greater than or equal to two and less than or equal to N; (b) generating an application including at least the M selected blocks by setting the order in which each of the at least M selected blocks is executed in accordance with an input operation performed by an operator; (c) consulting a rule that when one block included in two or more given blocks is executed, prohibits at least one of remaining blocks included in the two or more given blocks from not being executed, and when the rule applies to the M selected blocks included in the application, presenting an error to the operator; (d) modifying the application in accordance with an input operation performed by the operator presented with the error; and (e) outputs the modified application.

With this, if the operator, i.e., a developer of the application mistakenly generates an application in which a block that is not permitted to be executed alone is executed alone, since an error is presented, it is possible to inhibit the generation of such an application that cannot safely control apparatus 20. Stated differently, the same advantageous effect can be achieved as when the application is automatically changed as described above.

Step (c) may further include presenting a plurality of solutions for handling the error, and in (d), the application may be modified by changing the order in which each of the M selected blocks is executed, in accordance with an input operation performed by the operator presented with the error and the plurality of solutions. Stated differently, the information processing method according to the present embodiment may be an information processing method executed by a computer system such as development tool 50, and may present a plurality of solutions at the same time as presenting the error.

This reduces the time and effort required for the operator who has seen the presentation of the error to modify the application.

The plurality of solutions may include at least two of the following: a first solution of adding a new block to the M selected blocks, a second solution of changing the order of the M selected blocks, and a third solution of removing any block included in the M selected blocks.

This allows the operator to modify the application while appropriately avoiding errors, according to any one of a plurality of solutions. In addition, when the operator selects a solution, the operator can select an option (i.e., a solution) that satisfies their intention of creating the application.

Step (c) may further include presenting, for each of the plurality of solutions, the effect of the solution, when performed, on the object acted upon by the driving of actuator 22 or heater 23, or the effect of the solution, when performed, on the application. Stated differently, the information processing method according to the present embodiment may be an information processing method executed by a computer system such as development tool 50, and may present a solution for handling the error and simultaneously present an effect that implementing the solution has on the application.

This allows the operator to intuitively select a solution in accordance with their intention of creating the application.

In the information processing method, after (d), execution of (c) and (d) may be repeated, and the plurality of solutions for handling the error may be presented to the operator when the error has been presented K or more times, where K is an integer greater than or equal to two.

With this, since a plurality of solutions are presented if an error is repeatedly presented, the operator can easily change the order in which each of the M selected blocks is executed according to the solutions, making it easier to generate a safe application.

Variations of Embodiment 10

Whether or not the hardware of apparatus 20 is safely operated by the application depends on the environmental conditions of that hardware. Therefore, the rules for the application should be tailored to the most severe environmental conditions. Therefore, under certain environmental conditions, the hardware may not be able to operate at its full potential.

Therefore, when the app creator and the device manufacturer are one in the same, development tool 50 according to the present variation carries out development and creation of applications to be used for apparatus 20 manufactured by the app creator, without using rules. The reason for this is that the app creator understands the environmental conditions for the safe operation of apparatus 20 manufactured by the app creator. Note that the app creator is a person, organization, or company that develops or creates the application, also referred to as the application developer. The device manufacturer is a person, organization, or company that makes or manufactures devices such as apparatus 20, also referred to as the producer or manufacturer of apparatus 20.

Stated differently, when the app creator and the device manufacturer are different, development tool 50 according to the present variation develops applications using rules, and when the app creator and the device manufacturer are one in the same, development tool 50 according to the present variation develops applications without using rules.

More specifically, in Embodiment 10, the application is modified according to a rule during the development or production phase of the application, as described above. In the present variation, when the app creator and the device manufacturer are one in the same, the modification of the application is skipped at this stage, as in Embodiment 8.

Figure 48:
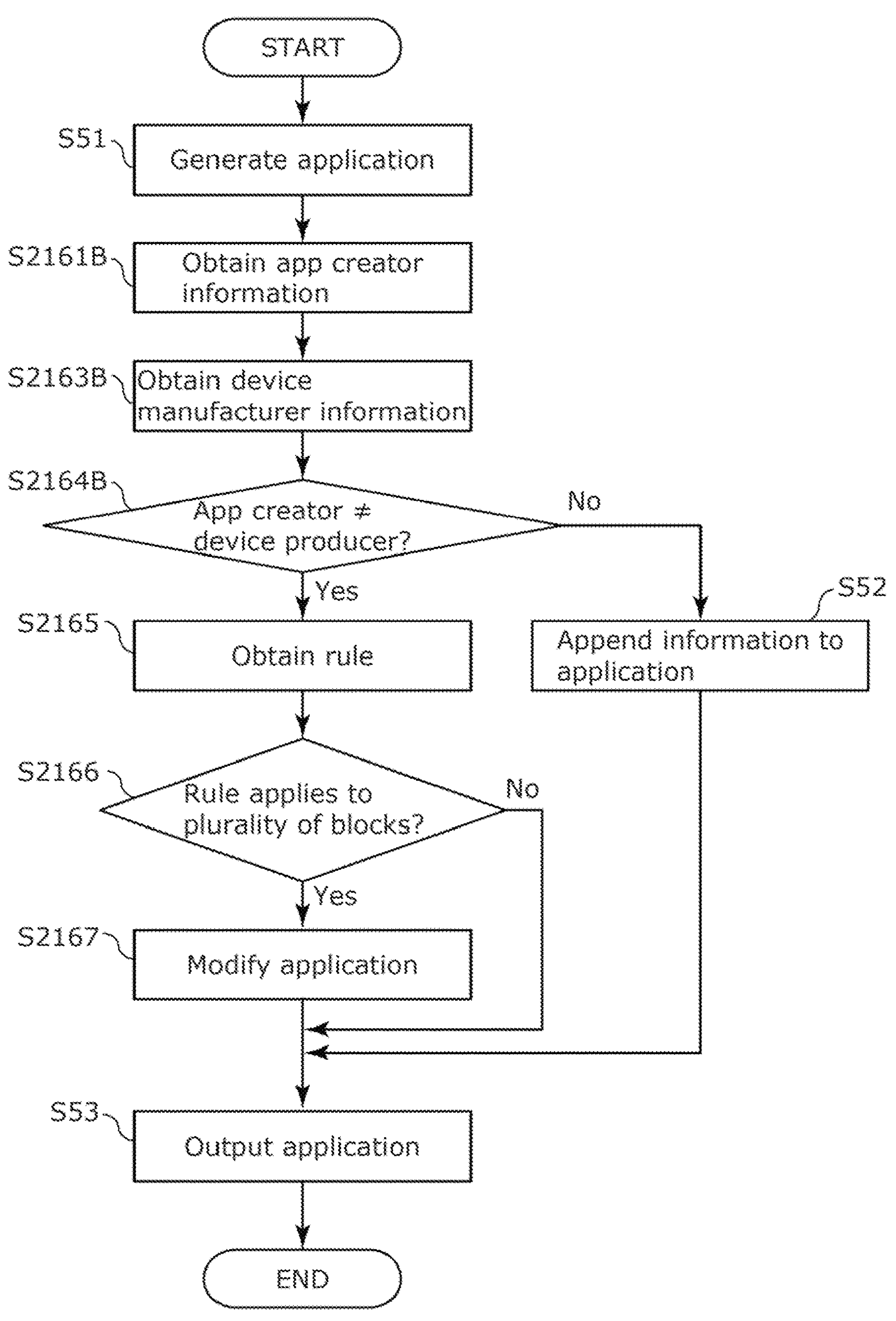
FIG. 48 is a flowchart illustrating the processing operations of a development tool according to a variation of Embodiment 10.

FIG. 48 is a flowchart illustrating the processing operations of development tool 50 according to the present variation.

Step S51

First, development tool 50 generates the application by performing the process for arranging a function block and the parameter setting process. Stated differently, development tool 50 generates an application that includes one or more function blocks for driving at least one of the actuator or the heater included in apparatus 20, which is the device to be controlled. For example, in step S51, development tool 50 performs step S21 through 23 illustrated in FIG. 24.

Development tool 50 then executes steps S2161B, S2163B, S2164B, S2165, S2166, and S2167, just as in Embodiment 8. More specifically, development tool 50 performs the following operations.

Step S2161B

Development tool 50 identifies the creator of the application (i.e., the app creator) by obtaining app creator information.

Step S2163B

Development tool 50 identifies the manufacturer of apparatus 20 (i.e., device manufacturer), which is the device to be controlled, by obtaining device manufacturer information.

Step S2164B

Development tool 50 determines whether the app creator and the device manufacturer are different. Stated differently, development tool 50 determines whether the creator of the application and the manufacturer of the device to be controlled described above are the same.

Step S2165

If the app creator and the device manufacturer are not the same (Yes in step S2164B), development tool 50 obtains a rule related to one or more blocks included in the application.

Step S2166

Development tool 50 determines whether the rule applies to one or more function blocks included in the application.

Step S2167

If development tool 50 determines that the rule applies to the one or more function blocks (Yes in step S2166), development tool 50 modifies the application according to the rule.

Step S52

If the app creator and the device manufacturer are the same (No in step S2164B), development tool 50 performs an appending process of appending information to the application. In the appending process, development tool 50 appends first append information and at least one of second append information or third append information to the application. First append information is information indicating that a rule has not been applied to the application. Second append information is information indicating when the application was generated. For example, the second append information indicates the date the application was generated. This date is hereinafter also referred to as the "app creation date". The third append information is manufacturer identification information for identifying the manufacturer when the app creator and the device manufacturer are one in the same.

Step S53

After the process of step S2167, development tool 50 outputs the modified application. In contrast, after the process of step S52, development tool 50 outputs the application after the appending process has been performed thereon. Stated differently, if the app creator and the device manufacturer are the same (No in step S2164B), development tool 50 outputs the application appended with the information, without applying the rule to the application.

Thus, the information processing method according to the present variation is an information processing method executed by a computer system such as development tool 50. The information processing method includes: generating an application including one or more blocks for driving at least one of an actuator or a heater included in a device to be controlled; identifying a creator of the application; identifying a manufacturer of the device to be controlled; determining whether the creator of the application and the manufacturer of the device to be controlled match; and (a) when the creator of the application and the manufacturer of the device to be controlled do not match, obtaining a rule related to one or more blocks included in the application, modifying the application according to the rule, and outputting the modified application; and (b) when the creator of the application and the manufacturer of the device to be controlled do match, outputting the application without applying the rule to the application.

Accordingly, in the present variation, when the app creator and the device manufacturer are different, the application is modified by applying a rule to the application, and as such, the same advantageous effects as in Embodiment 10 can be achieved. When the app creator and the device manufacturer are the same, just as in Embodiment 8, the application of the rule and the modification of the application are omitted, so processing load can be reduced. Furthermore, in this case, since the hardware of apparatus 20, which is the device to be controlled, operates according to an application to which a rule has not been applied, the functions of the hardware can be effectively utilized.

In the information processing method according to the present variation, step (b) further includes an appending process of appending, to the application, first append information and at least one of second append information or third append information. In the output of the application, the application after the appending process has been performed thereon is output. The first append information is information indicating that a rule has not been applied to the application, and the second append information is information indicating when the application was generated. The third append information is information for identifying the manufacturer when the creator of the application and the manufacturer of the device are one in the same.

Accordingly, in the present variation, if no rule is applied to the application, device 300 of apparatus 20, which is the device to be controlled, obtains the application appended with information.

For example, if an application is appended with first append information and second append information, device 300 can determine whether or not to apply a rule to that application because the first append information is appended to the application. More specifically, device 300 can properly determine whether to apply a rule based on the second append information appended to the application. For example, device 300 may identify an update date of the rule and determine that the rule is not applicable to the application if the update date is before the app creation date indicated by the second append information. As a result, device 300 can omit applying the rule and modifying the application. Stated differently, just like development tool 50, device 300 can also reduce the processing load.

On the other hand, if the update date is later than the app creation date, device 300 can determine to apply the updated rule to the application. Stated differently, if the generated application is old, it may be difficult to ensure the safety of apparatus 20 if apparatus 20 is operated by the old application. However, in such cases, the second append information will cause the rule to be applied to that old application and the application will be modified. This can ensure safe operation of apparatus 20.

For example, if the first append information and the third append information are appended to an application, device 300 can determine whether or not to apply the rule to that application because the first append information is appended to the application. More specifically, device 300 can properly determine whether to apply a rule based on the third append information appended to the application. For example, device 300 determines whether the manufacturer of apparatus 20 including device 300 matches the manufacturer identified by the manufacturer identification information, which is the third append information. If device 300 determines that the manufacturers match, device 300 can then determine to not apply a rule to the application. As a result, device 300 can omit applying the rule and modifying the application. Stated differently, just like development tool 50, device 300 can also reduce the processing load.

In contrast, if device 300 determines that the manufacturers do not match, device 300 can then determine to apply a rule to the application. For example, the generated application may be used not only for apparatus 20, i.e., the device to be controlled, which is manufactured by the app creator, but also for apparatuses 20 manufactured by other device manufacturers. It can be difficult to ensure the safety of apparatus 20 manufactured by another device manufacturer when it is operated by that application. However, in such cases, the third append information will cause the rule to be applied to that application and the application will be modified. This can ensure safe operation of apparatus 20 manufactured by another device manufacturer.

Note that in the example above, device 300 applies a rule and modifies the application based on the information appended to the application. However, as in Embodiments 6 through 9, instead of device 300, device manager 200 or the like may apply a rule based on information appended to the application and modify the application.

Other Embodiments

Hereinbefore, a system according to one or more aspects of the present disclosure has been described based on exemplary embodiments, but the present disclosure is not limited to the above exemplary embodiments. Those skilled in the art will readily appreciate that many modifications are possible in the exemplary embodiments without materially departing from the novel teachings and advantages of the present disclosure. Accordingly, all such modifications are intended to be included within one or more aspects of the present disclosure.

In the above exemplary embodiments, sequence manager 100 and device manager 200 are described as, but not limited to, being included in cloud server 10. Sequence manager 100 and/or device manager 200 may be included in apparatus 20. Similarly, although UI 400 is described as being included in terminal 30, UI 400 may be included in apparatus 20.

In the above exemplary embodiments, the application may be modified based on the degradation information. For example, device 300 may consult parameter conversion information that associates a plurality of degradation levels with a plurality of parameter conversion methods, obtain the conversion method corresponding to the degradation level, and convert a parameter included in the block using the obtained conversion method. The conversion method may be defined, for example, by the value after conversion or by the coefficients applied to the value before conversion.

In Embodiments 1 through 4, a block is changed in the pre-execution check when an included parameter is in a non-permissible range, and thereafter the block is executed, but this example is non-limiting. For example, if a parameter is in the non-permissible range, when the state of device 300 is different than expected, the block may not be executed and device manager 200 and/or sequence manager 100 may be notified of the aborted execution (error).

In Embodiments 6 through 10, the application is described as, but not limited to, being modified in the pre-execution check and then executed. For example, when the state of device 300 is different than expected, the application may not be modified and device manager 200 and/or sequence manager 100 may be notified of the aborted execution (error).

INDUSTRIAL APPLICABILITY

The present disclosure can be used in home appliances or other products that can execute an application defined by a plurality of function blocks, and in apparatuses or the like that can generate the application.

The invention claimed is:

1. An information processing method executed by a computer system, the information processing method comprising:

(a) selecting M blocks as M selected blocks from among N blocks for driving at least one of an actuator or a heater included in a device to be controlled, in accordance with an input operation performed by an operator, where N is an integer greater than or equal to two, and Mis an integer greater than or equal to one and less than or equal to N;

(b) generating an application including at least the M selected blocks by setting, in accordance with an input operation performed by the operator, a parameter for driving the actuator or the heater in each of the M selected blocks;

(c) consulting a rule defining a parameter range within which the at least one of the actuator or the heater is not permitted to be driven, and modifying the application by changing at least one of the M selected blocks, the at least one of the M selected blocks including a parameter included in the parameter range; and (d) driving the at least one of the actuator or the heater based on the modified application.

2. The information processing method according to claim 1, wherein in (c), the rule is consulted, and the application is modified by changing a parameter included in the parameter range to a parameter included in a range within which the at least one of the actuator or the heater is permitted to be driven.

3. The information processing method according to claim 1, wherein in (c), the rule is consulted, and the application is modified by changing a parameter included in the parameter range to a parameter included in a range within which the at least one of the actuator or the heater is permitted to be driven, and adding a new block to the M selected blocks.

4. The information processing method according to claim 1, wherein in (c), the application is modified by removing the at least one of the M selected blocks including a parameter included in the parameter range.

5. The information processing method according to claim 1, wherein (c) includes:

consulting the rule and determining, for each of a plurality of parameters included in the M selected blocks, whether the parameter is included in the parameter range; and when the parameter is determined to be included in the parameter range, changing a selected block including the parameter.

6. The information processing method according to claim 1, wherein
the application includes information on an order in which each of the M selected blocks is executed and information on timing of execution of each of the M selected blocks.

7. The information processing method according to claim 1, wherein
the parameter range is a range of parameters that allow the at least one of the actuator or the heater to reach a maximum withstand temperature.

8. The information processing method according to claim 1, wherein
the device to be controlled includes an enclosure including an interior space, and
the parameter range is a range of parameters that allow the interior space to reach a maximum withstand temperature.

9. The information processing method according to claim 1, wherein
(c) includes:
determining whether the application generated is an application dedicated to the device to be controlled or a general-purpose application applicable to the device to be controlled and a device other than the device to be controlled; and
consulting, as the rule, a rule candidate that corresponds to a result of the determining of the application, from among a plurality of rule candidates that each define a parameter range within which the at least one of the actuator or the heater is not permitted to be driven.

10. The information processing method according to claim 1, wherein
the rule prohibits the at least one of the actuator or the heater from being in a situation where safe driving of the at least one of the actuator or the heater is difficult due to increased load or elevated temperature.

11. An information processing method executed by a computer system, the information processing method comprising:
(a) selecting M blocks as M selected blocks from among N blocks for driving at least one of an actuator or a heater included in a device to be controlled, in accordance with an input operation performed by an operator, where N is an integer greater than or equal to two, and Mis an integer greater than or equal to one and less than or equal to N;
(b) generating an application including at least the M selected blocks by setting, in accordance with an input operation performed by the operator, a parameter for driving the actuator or the heater in each of the M selected blocks;
(c) consulting a rule defining a parameter range within which the at least one of the actuator or the heater is not permitted to be driven, and when at least one of the M selected blocks includes a parameter included in the parameter range, presenting an error to the operator;
(d) modifying the application by changing the at least one of the M selected blocks in accordance with an input operation performed by the operator presented with the error; and
(e) driving the at least one of the actuator or the heater based on the modified application.

12. The information processing method according to claim 11, wherein
after (d), execution of (c) and (d) is repeated, and
the information processing method further comprises (f) presenting a parameter not included in the parameter range to the operator when the error has been presented K or more times, where K is an integer greater than or equal to two.

13. The information processing method according to claim 11, wherein
after (d), execution of (c) and (d) is repeated, and
the information processing method further comprises (f) presenting a range of parameters not included in the parameter range to the operator when the error has been presented K or more times, where K is an integer greater than or equal to two.

14. The information processing method according to claim 11, wherein
(c) further includes presenting a plurality of solutions for handling the error, and
in (d), the application is modified by changing the at least one of the M selected blocks, in accordance with an input operation performed by the operator presented with the error and the plurality of solutions.

15. The information processing method according to claim 14, wherein
the plurality of solutions include at least two of the following:
a solution of changing a parameter included in the parameter range;
a solution of adding a new block to the M selected blocks; and
a solution of removing a selected block including a parameter included in the parameter range.

16. The information processing method according to claim 11, wherein
the rule prohibits the at least one of the actuator or the heater from being in a situation where safe driving of the at least one of the actuator or the heater is difficult due to increased load or elevated temperature.

17. The information processing method according to claim 14, wherein
(c) further includes presenting, for each of the plurality of solutions, an effect of the solution, when performed, on an object acted upon by driving of the actuator or the heater, or an effect of the solution, when performed, on the application.

18. An information processing apparatus comprising:
a processor; and
memory coupled to the processor, wherein
using the memory, the processor executes:
(a) selecting M blocks as M selected blocks from among N blocks for driving at least one of an actuator or a heater included in a device to be controlled, in accordance with an input operation performed by an operator, where N is an integer greater than or equal to two, and M is an integer greater than or equal to one and less than or equal to N;
(b) generating an application including at least the M selected blocks by setting, in accordance with an input operation performed by the operator, a parameter for driving the actuator or the heater in each of the M selected blocks;
(c) consulting a rule defining a parameter range within which the at least one of the actuator or the heater is not permitted to be driven, and modifying the application by changing at least one of the M selected blocks, the at least one of the M selected blocks including a parameter included in the parameter range; and (d) driving the at least one of the actuator or the heater based on the modified application.

19. An information processing apparatus comprising:

a processor; and memory coupled to the processor, wherein using the memory, the processor executes:

(a) selecting M blocks as M selected blocks from among N blocks for driving at least one of an actuator or a heater included in a device to be controlled, in accordance with an input operation performed by an operator, where N is an integer greater than or equal to two, and M is an integer greater than or equal to one and less than or equal to N;

(b) generating an application including at least the M selected blocks by setting, in accordance with an input operation performed by the operator, a parameter for driving the actuator or the heater in each of the M selected blocks;

(c) consulting a rule defining a parameter range within which the at least one of the actuator or the heater is not permitted to be driven, and when at least one of the M selected blocks includes a parameter included in the parameter range, presenting an error to the operator;

(d) modifying the application by changing the at least one of the M selected blocks in accordance with an input operation performed by the operator presented with the error; and (e) driving the at least one of the actuator or the heater based on the modified application.

20. The information processing method according to claim 11, wherein (c) further includes presenting a parameter or a range of parameters not included in the parameter range to the operator.

* * * * *